(12) United States Patent
Weindling

(10) Patent No.: US 11,049,075 B2
(45) Date of Patent: Jun. 29, 2021

(54) VICTIM REPORTING AND NOTIFICATION SYSTEM AND ALERT MECHANISM FOR ORGANIZATIONS

(71) Applicant: Ariel D. Weindling, Los Angeles, CA (US)

(72) Inventor: Ariel D. Weindling, Los Angeles, CA (US)

( * ) Notice: Subject to any disclaimer, the term of this patent is extended or adjusted under 35 U.S.C. 154(b) by 262 days.

(21) Appl. No.: 16/180,988

(22) Filed: Nov. 5, 2018

(65) Prior Publication Data

US 2019/0180245 A1 Jun. 13, 2019

Related U.S. Application Data

(60) Provisional application No. 62/665,653, filed on May 2, 2018, provisional application No. 62/639,706, filed on Mar. 7, 2018, provisional application No. 62/598,085, filed on Dec. 13, 2017.

(51) Int. Cl.
| | |
|---|---|
| *G06Q 10/00* | (2012.01) |
| *G06Q 10/10* | (2012.01) |
| *G06F 3/0484* | (2013.01) |
| *G06F 3/0482* | (2013.01) |

(52) U.S. Cl.
CPC ......... *G06Q 10/105* (2013.01); *G06F 3/0484* (2013.01); *G06F 3/0482* (2013.01)

(58) Field of Classification Search
CPC .... G06Q 10/105; G06F 3/0484; G06F 3/0482
See application file for complete search history.

(56) References Cited

U.S. PATENT DOCUMENTS

| | | | |
|---|---|---|---|
| 8,776,168 B1 | 7/2014 | Gibson et al. | |
| 2009/0235084 A1* | 9/2009 | Ferraro | G06Q 10/10 713/182 |
| 2011/0258200 A1* | 10/2011 | Drummond | G06Q 50/01 707/748 |
| 2012/0291087 A1 | 11/2012 | Agrawal | |
| 2015/0234837 A1* | 8/2015 | Rowe | H04W 4/90 707/769 |
| 2016/0314552 A1* | 10/2016 | Schobel | G06Q 50/01 |
| 2017/0039274 A1* | 2/2017 | Kaleta | G06F 16/337 |
| 2018/0033279 A1* | 2/2018 | Chong | G06Q 10/0633 |

OTHER PUBLICATIONS

A. Clancy, Kathryn B. H. • Nelson, Robin G. • Rutherford, Julienne N. • Hinde, Katie. "Survey of Academic Field Experiences (SAFE): Trainees Report Harassment and Assault". Jul. 16, 2014. https://doi.org/10.1371/journal.pone.0102172.*

(Continued)

*Primary Examiner* — Gabrielle A McCormick
(74) *Attorney, Agent, or Firm* — Aleksandr Gilshteyn; Lansing Lights LLC

(57) ABSTRACT

A method and system for victim notification functions by receiving a report from an accuser regarding conduct of an accused that is believed to constitute harassment, bullying and/or discrimination, the reporting being composed of structured data. The severity of conduct in the report is scored and ranked and the pervasiveness of conduct in the report is scored and ranked by comparing the reported conduct against prior reports regarding the accused. Other reports by the accuser are also analyzed.

8 Claims, 62 Drawing Sheets

(56) References Cited

OTHER PUBLICATIONS

Can an app get victims to anonymously report workplace harassment? Bloomberg News. Jun. 20, 2017 (retrieved at: https://financialpost.com/executive/careers/can-apps-get-victims-to-report-workplace-harassment).*
Rajan et al.,Callisto: A Cryptographic Approach to Detect Serial Predators of Sexual Misconduct, pp. 1-10, www.projectcallisto,org, Mar. 29, 2018.
All Voices web site www.allvoices.com.
StopIt! web site www.stopitsolutions.com.
Tequitable web site www.tequitable.com.
JDoe web site www.jdoe.io.
Vault Platform website www.vaultplatform.com, pub date unknown.
Spot web site www.talktospot.com, pub date unknown.

* cited by examiner

📶 AT&T 📶　　　　　11:39　　　　🌙 ✱ 69% 🔋

< #NotMe Journal

Report ID: #128

Status: Done

Date: Aug 16, 2018

John

Are you reporting on your behalf or as a witness?

( Self )

Are you reporting about behaviors that took place at your current or former employer?

( Current )

Please provide us with the name of the employer you are reporting about.

( Employer )

Please provide us with the full name of your last supervisor.

( Didier )

Please provide us with the address (or work location)

FIG. 44A

‹ #NotMe Journal ( Didier )

Please provide us with the address (or work location) of the employer you are reporting about.

```
                Bakersfield
                    o

📍
                Los Angeles
                    o
                      o Anaheim San Diego
                    o
```

Please provide us with the full name of the HR representative with responsibility for you ( HR )

WHAT

Select the actions you are reporting.

( Shared sexually inappropriate images or videos with co-workers )

Does the behavior you are reporting have anything to

FIG. 44B

< #NotMe Journal

Does the behavior you are reporting have anything to do with any of your:

( Sexual orientation )

Did you previously report any of the behaviors? If so, to whom did you report?

( HR )  ( Hotline )

WHERE

Indicate the location(s) where the incident(s) happened.

○ Anaheim
San Diego ○
○
Tijuana  Mexicali
Pheonix
○ ○
Mesa
Tucson
○
Nogales
○
BASSE-CALIFORNIE If the behavior(s) occurred in the office, please indicate where.

( Elevator )

FIG. 44C ( Over social media )  ( Bathroom )

WHEN

Indicate the time and date of when the incident(s) occurred.

( Aug 16, 2018 )  ( Aug 16, 2018 )

Is the behavior you are reporting still ongoing?

( Yes )

WHO

Please provide us with the name of the alleged harasser.

( Didier )

Please provide us with his / her job title / position.

( CFO )

Do you report directly / indirectly to him / her?

Is he / she your supervisor?

[ Yes ]

Did anyone witness any of the inciden(s) you are reporting?

[ Yes ]

Was / were the witness(es) an employee(s)?

[ Yes ]

If the witness(es) was / were an employees, what is his / her / their job title(s) / position(s)?

[ N/A ]

Please provide us with the name(s) of the witness(es).

[ Will ]

Please provide us with the contact information (phone number and email address if you have them)

FIG. 44E

NotMe Journal

Yes

Was / were the witness(es) an employee(s)?

Yes

If the witness(es) was / were an employees, what is his / her / their job title(s) / postion(s)?

N/A

Please provide us with the name(s) of the witness(es).

Will

Please provide us with the contact information (phone number and email address if you have them) of the witness(es).

315-111-1111

SUBMIT REPORT

FIG. 44F

VICTIM REPORTING AND NOTIFICATION SYSTEM AND ALERT MECHANISM FOR ORGANIZATIONS

CROSS REFERENCE TO RELATED APPLICATIONS

This application claims the benefit of U.S. Provisional Application Ser. Nos. 62/598,085, entitled "VICTIM REPORTING SYSTEM," filed Dec. 13, 2017, 62/639,706, entitled "VICTIM REPORTING SYSTEM," filed Mar. 7, 2018, 62/665,653, entitled "VICTIM REPORTING SYSTEM," filed May 2, 2018.

BACKGROUND OF THE INVENTION

1. Field of the Invention

The present invention relates to a reporting system. More particularly, the present invention relates to a victim reporting and notification system and alert mechanism for organizations providing a mechanism whereby victims of harassment, discrimination, bullying or other unwanted behaviors and/or inappropriate and/or unlawful conduct can report them safely, privately and easily to their employers or to any other organizations. The present invention provides employees and employers with tools enabling them to eliminate harassment and/or discrimination from the workplace and to comply with their legal obligations. In addition, the reporting system enables the reporter to be connected to counseling and representation to assist them in dealing with the unlawful conduct.

2. Description of the Related Art

Unlawful sexual harassment, long a problem in the workplace, has become the most visible employment issue in corporate America. In 2016, more than 13,000 administrative EEOC (Equal Employment Opportunity Commission) charges alleged sex-based harassment. 1 in 4 women will be the victim of sexual harassment in the workplace. The EEOC also estimates that 75% of those who are victims of these hostile work environments do not report their harassment.

Ultimately, very few instances of harassment are reported. It is believed the limited reporting is a result of the fact that employees don't know who is to blame, employees worry about immediate repercussions and consequences, PTSD ("Post-Traumatic Stress Disorder") and trauma, and employees do not necessarily know they are being harassed. The bottom line is that reporting instances of harassment is not easy for victims.

As such, an easy, safe, convenient, and un-shameful mechanism for reporting instances of harassment is needed.

Additionally, reporters of unlawful conduct need in certain cases to be connected with counseling (psychologists, lawyers, etc.) and representation to understand their rights and deal with such conduct.

Conversely, employers need to know right away when a report of harassment and/or discrimination or other conducts or behaviors they do not want to see in their workforce has happened so that they can act, protect the victim, investigate and comply with their legal obligations.

BRIEF DESCRIPTION OF THE DRAWINGS

FIGS. 2A-45 are screenshots showing operation of the reporting app of the victim reporting and notification system.

DESCRIPTION OF THE PREFERRED EMBODIMENT

Figure 1:
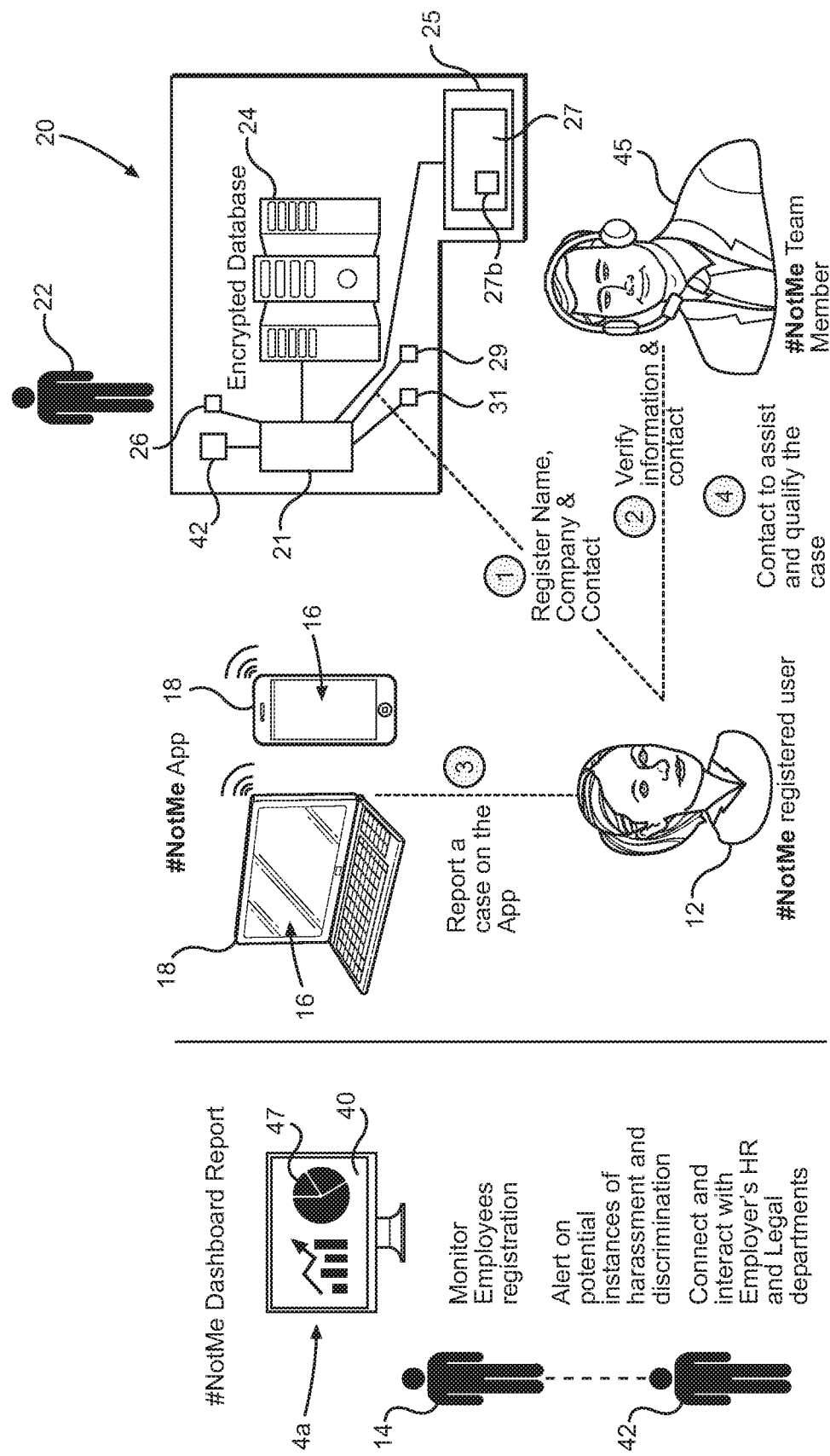
FIG. 1 is a schematic of the present victim reporting and notification system.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 49, and as will be explained below in greater detail, a victim reporting and notification system 10 in accordance with the present invention provides a mechanism whereby one can safely, easily and anonymously (or not) report conduct that is believed to constitute harassment, bullying and/or discrimination. As the drawings accompanying the present disclosure show, the victim reporting and notification system 10 is operating under the name #NotMe™, and this term is used on various drawings. While the victim reporting and notification system 10 offers many tools applicable to workplace harassment and/or discrimination as a mechanism for protecting employees 12 who are the victims of workplace harassment and/or discrimination and assisting employers 14 in protecting their employees, it is fully appreciated harassment and/or discrimination occur in a wide variety of environments, for example, nursing homes, clubs and organizations, homes, etc., and the victim reporting and notification system 10 is equally applicable to these environments. The victim reporting and notification system 10 goes beyond the scope of employment and can be used in other settings and environment for people to easily report through the #NotMe™ app other behaviors or instances they would like to prevent from happening, avoid or see stop.

The victim reporting and notification system 10 also helps individuals and organizations tangentially affected by harassment and/or discrimination and protects employees as well as it empowers them to report and facilitate the reporting. As explained above, the workplace is a regular site for harassment and/or discrimination. As such, and in addition to employees 12 who are the victim of harassment and/or discrimination, employers 14 (and others running organization of various types) and others associated with the employers or organizations are deeply affected by actions of the perpetrators of harassment and/or discrimination. As such, the victim reporting and notification system 10 has been developed with tools providing employers 14 (and others running organization of various types) the ability to eliminate harassment and/or discrimination. By reporting questionable or inappropriate conduct, employees 12 who are the victims of harassment and/or discrimination, as well as those associated with the victims, are empowered to help employers 14 monitor and properly address inappropriate behavior.

As noted above, the victim reporting and notification system 10 is highly applicable to the workplace and the following description describes the victim reporting and notification system 10 in this context. However, and despite the fact the terms "employee(s)" and "employer(s)" are used throughout the present disclosure as a mechanism to fully disclose the victim reporting and notification system 10, the present invention is applicable to anyone who is a victim of harassment and/or discrimination or of other unwanted/ undesirable behaviors/conducts, a witness to harassment and/or discrimination or of other unwanted/undesirable behaviors/conducts (wherein both victims and witnesses who report such action are considered "accusers" in accordance with the present invention), and/or those running organizations where such unlawful and/or inappropriate conduct occurs.

The victim notification system 10 employs a computer-based reporting application ("reporting app") 16 used by an employee 12 via a smartphone, tablet, laptop, or other computer device 18 to safely, easily and (if desired) anonymously report conduct that is believed to constitute harassment and/or discrimination or that should not happen in the workplace. The reporting app 16 empowers employees 12 to report inappropriate and/or unlawful conduct to an independent company and to their employer 14 to the extent it subscribes to the victim notification system. The reporting app 16 of the victim notification system 10 is a powerful tool provided by an employer 14 to help the employees 12 in its effort to eliminate workplace harassment and discrimination. By having employers 14 adopt the victim notification system 10 and making reporting so easy, the perpetrators of workplace harassment and/or discrimination will be deterred from further conduct. While the present disclosure focuses upon the ability of the employee 12 to report workplace harassment and/or discrimination, it is appreciated the victim notification system 10 has been developed so as to allow for witnesses (and other people) to similarly report workplace harassment and/or discrimination and/or other behavior and situations.

The victim notification system 10 includes a central operational facility 20 operated by a system administrator(s) 22. Users of the victim notification system 10, whether they be employees 12, employers 14, or others working in conjunction with the victim notification system 10, communicate with the victim notification system 10 via a global communication network using various computing devices well known to those skilled in the art. The central operational facility 20 includes a central server 21 with a central server database 24, a notification system 26, and data analysis system 25 with a scoring system 27 having a scoring system database 27b. The central operational facility 20 may also include other hardware and software based elements that are well known for use in the implementation of such a computer based communication network.

In accordance with a preferred embodiment, both the central server database 24 and the scoring system database 27a store information in an encrypted manner such that the stored information can only be accessed by authorized users, wherein authorization is given by the system administrator(s) 22. The data storage is fully encrypted and decrypted "on-the-fly" when read. Access to both the central server database 24 and the scoring system database 27a is done either through HTTPS (SSL encryption) or through an SSH (Secure Shell) access restricted by private keys.

It is appreciated the elements of the central operational facility 20 need not be found at a single location, but may constitute distributed elements located at various locations and connected via network connections in a manner well known to those skilled in the art. The central operational facility 20 is designed to be accessed by employers 14, employees 12, the system administrator 22, third-party law enforcement agencies 28, and other stakeholders desiring to eradicate and address occurrences of the harassment and/or discrimination or other behaviors such as for example mass shooting In accordance with a preferred embodiment, and as will be appreciated based upon the following disclosure, the victim notification system 10 operates to provide objective assessments of reported behavior. This is achieved by receiving reports regarding harassing, bullying and/or discriminatory type behavior, wherein the reports are composed of structured data limited to a predetermined list of specific conducts, behaviors, locations, etc. Thereafter, the severity and pervasiveness of the harassing or discriminatory behavior is ranked using the previously mentioned scoring system 27 of the data analysis system 25. The severity and pervasiveness of the reported harassing or discriminatory behavior is then analyzed and recommendations are generated. In accordance with the recommendations, appropriate action (for example, notifying employers, initiating investigations, etc.) is then taken.

The employees 12 access the central operational facility 20, in particular, the central server database 24, via the reporting app 16. The reporting app 16 is designed to be free to employees 12 and simply downloaded in a well-known manner. Once the reporting app 16 is downloaded, the employee 12 registers their device and creates an account. Thereafter, the employee 12 may report instances of harassment, discrimination and/or bullying.

In particular, and with reference to FIGS. 2 to 45, the employee 12 first downloads the reporting app 16 to his or her smart phone or other computer device 18. As explained above, and as presented in the introductory screen shots of the reporting app 16) the reporting app 16 allows an employee 12 to discreetly and easily report questionable or inappropriate conduct such as harassment, discrimination or bullying. By reporting questionable, unlawful and/or inappropriate conduct, the employee 12 is empowered to help their employer 14 monitor and properly address inappropriate behavior. See FIGS. 2A-D.

Once the employee 12 downloads the reporting app 16, and where an employee 12 is new to the victim notification system 10, he or she is asked to sign up for an account (see FIGS. 3, 4, 5, 6, 7A, and 7D). During the sign up process, the employee 12 is asked to provide the following information: first name, last name, email, birthdate, phone number, and is asked to create a password. The employee 12 is also asked to review and approve of the terms of use and the privacy policy. Finally, the employee 12 confirms their email address and cell phone number via a confirmation mechanism known to those skilled in the art.

Upon registration each employee 12 is provided a unique token that is hashed and stored in the central server database 24. When an employee 12 logs in, the token and sent through the public API 31 so each employee 12 can be differentiated. When an employee 12 logs in on the victim notification system 10, a public API 31 (used by the reporting app 16) allows access to each employee's information, but prevents employees from accessing other user's information.

Figure 9:
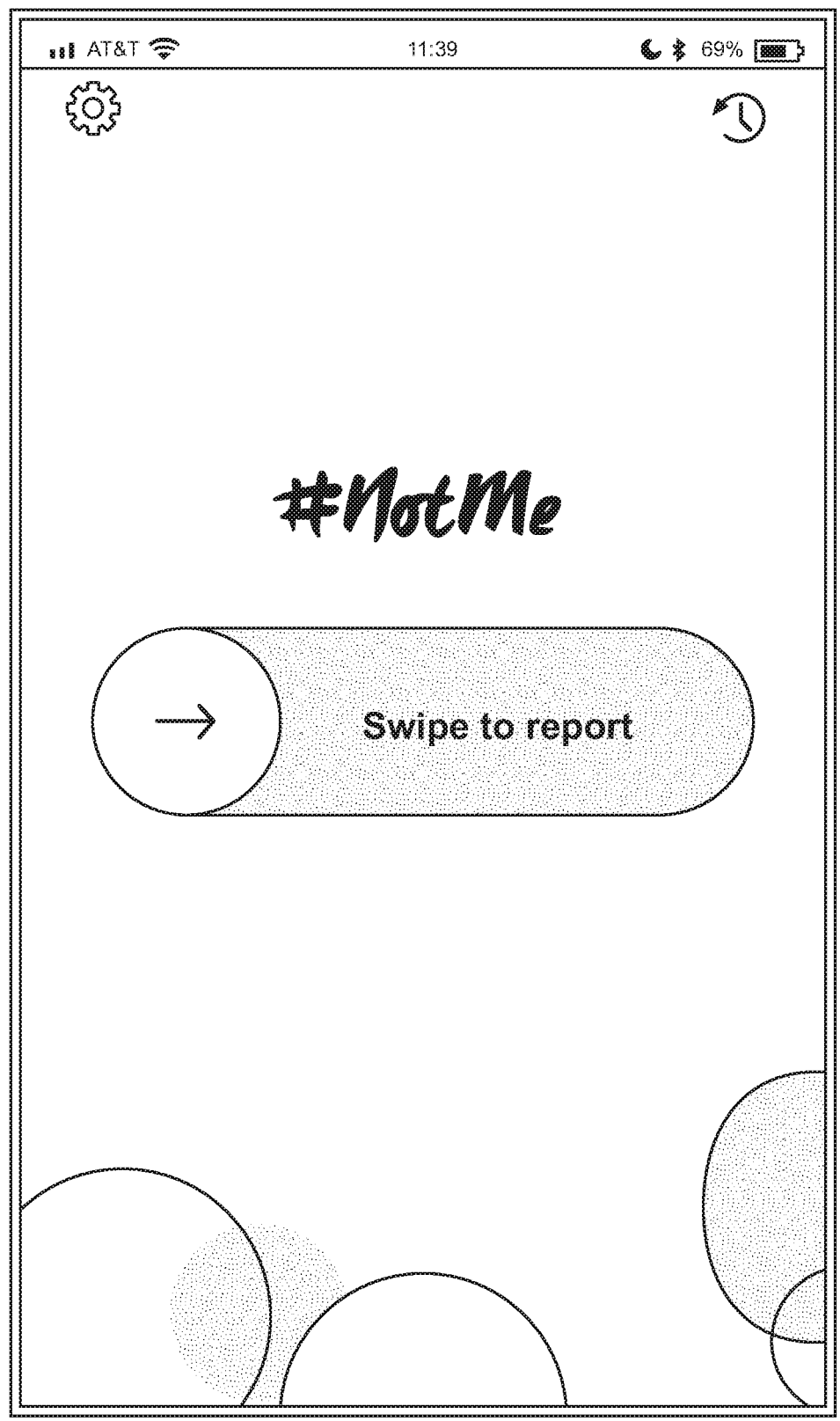
Figure 10:
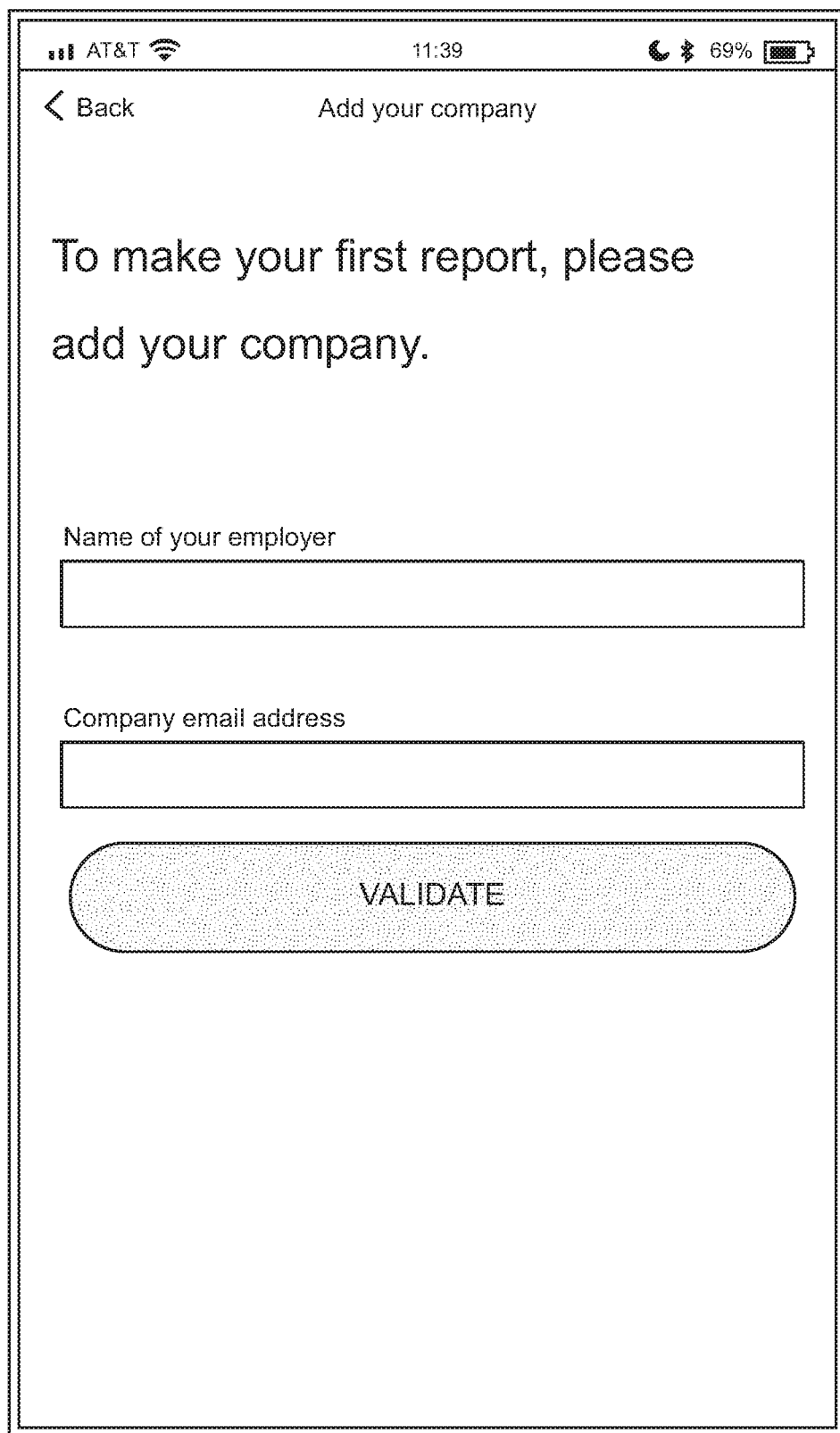
Figure 11:
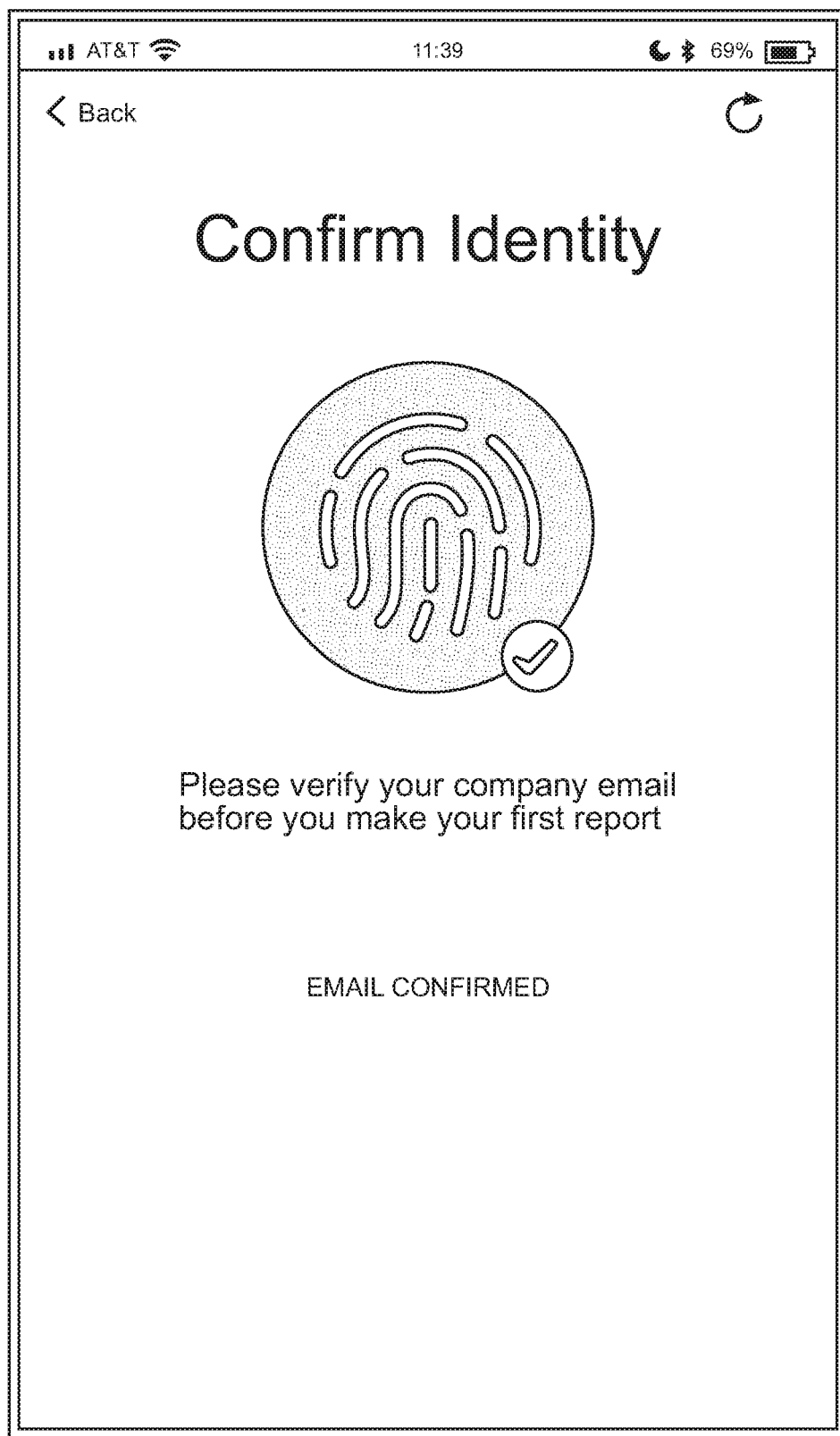
Figure 12:
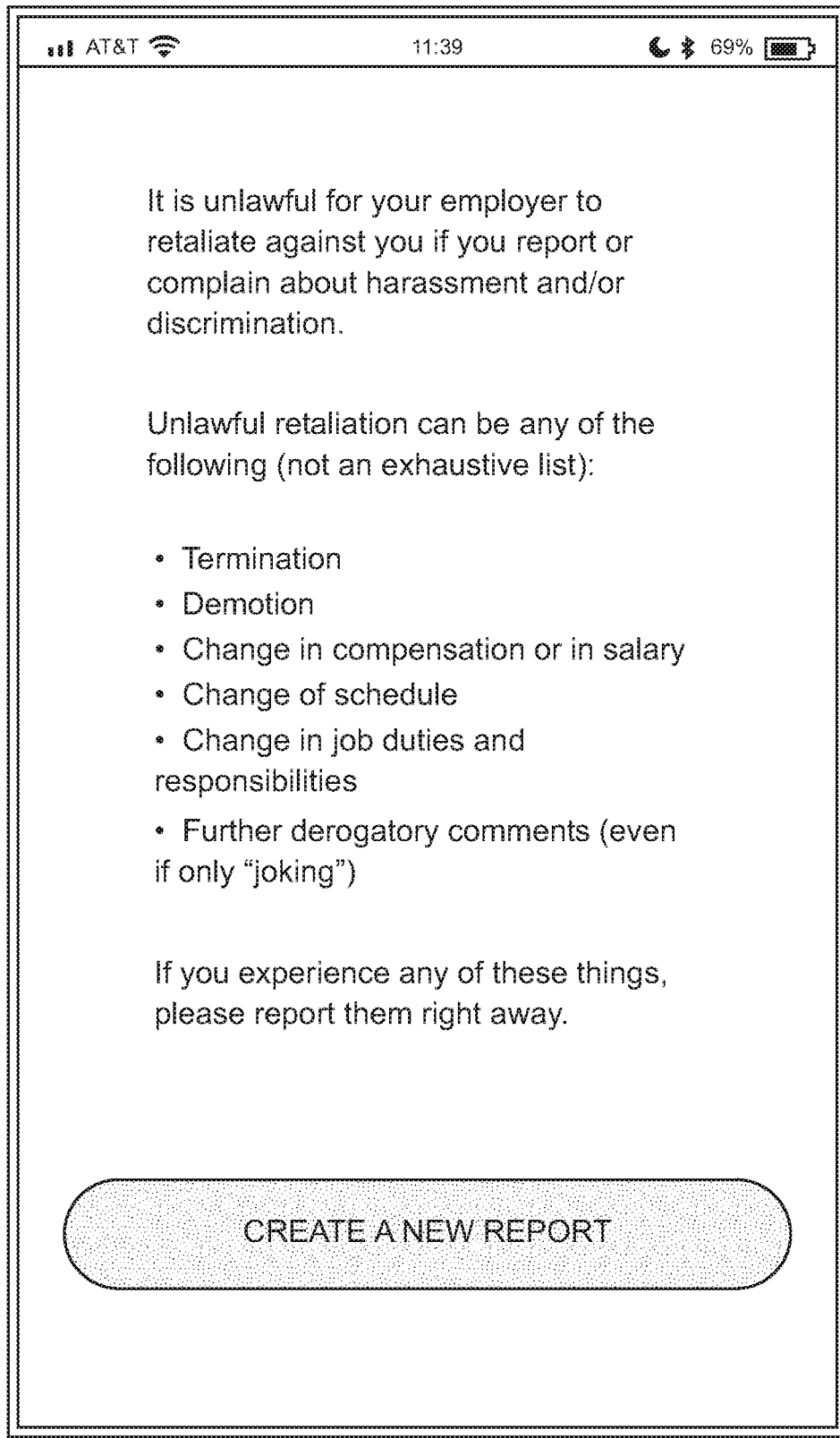
Figure 13:
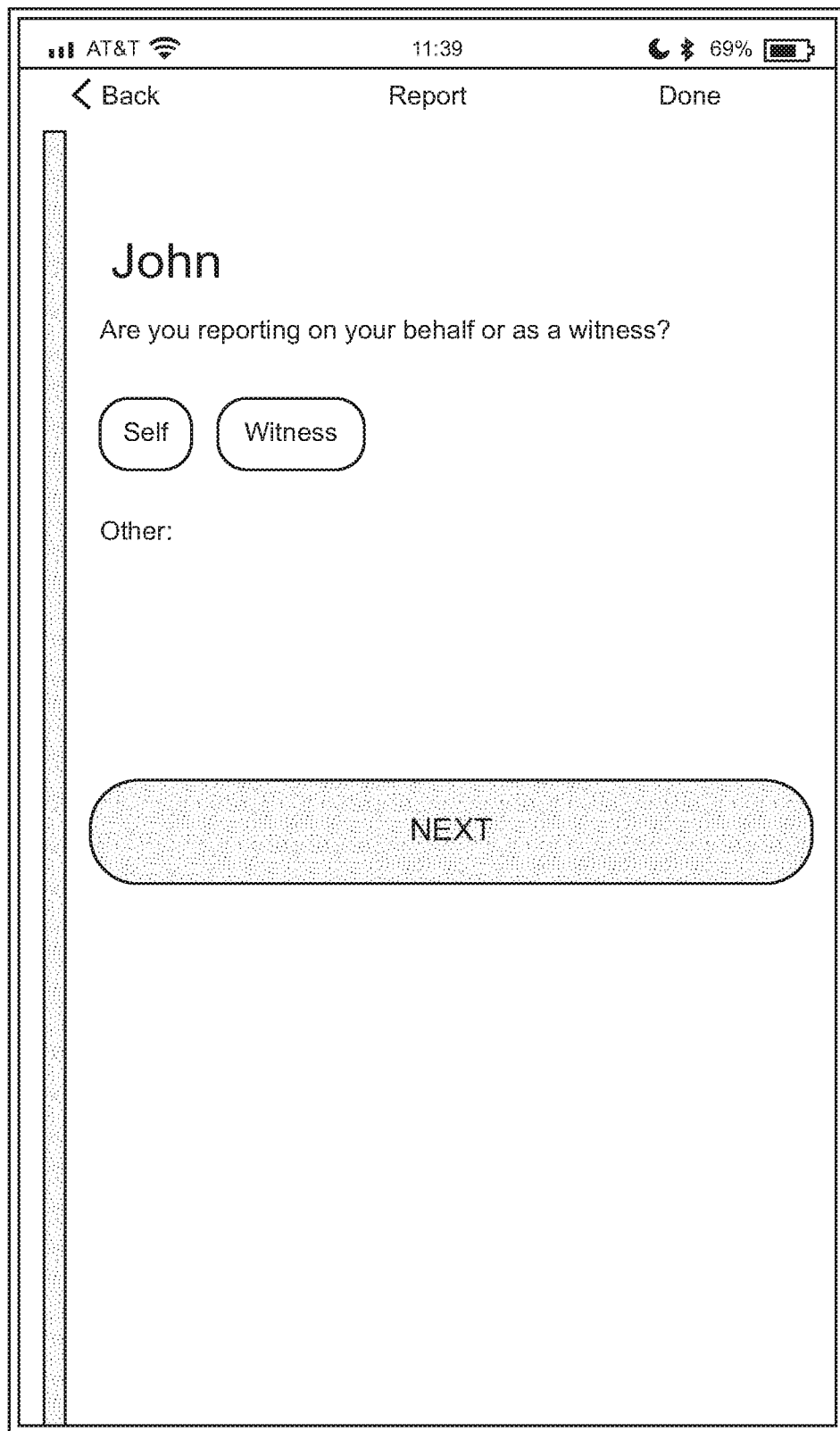
Figure 14:
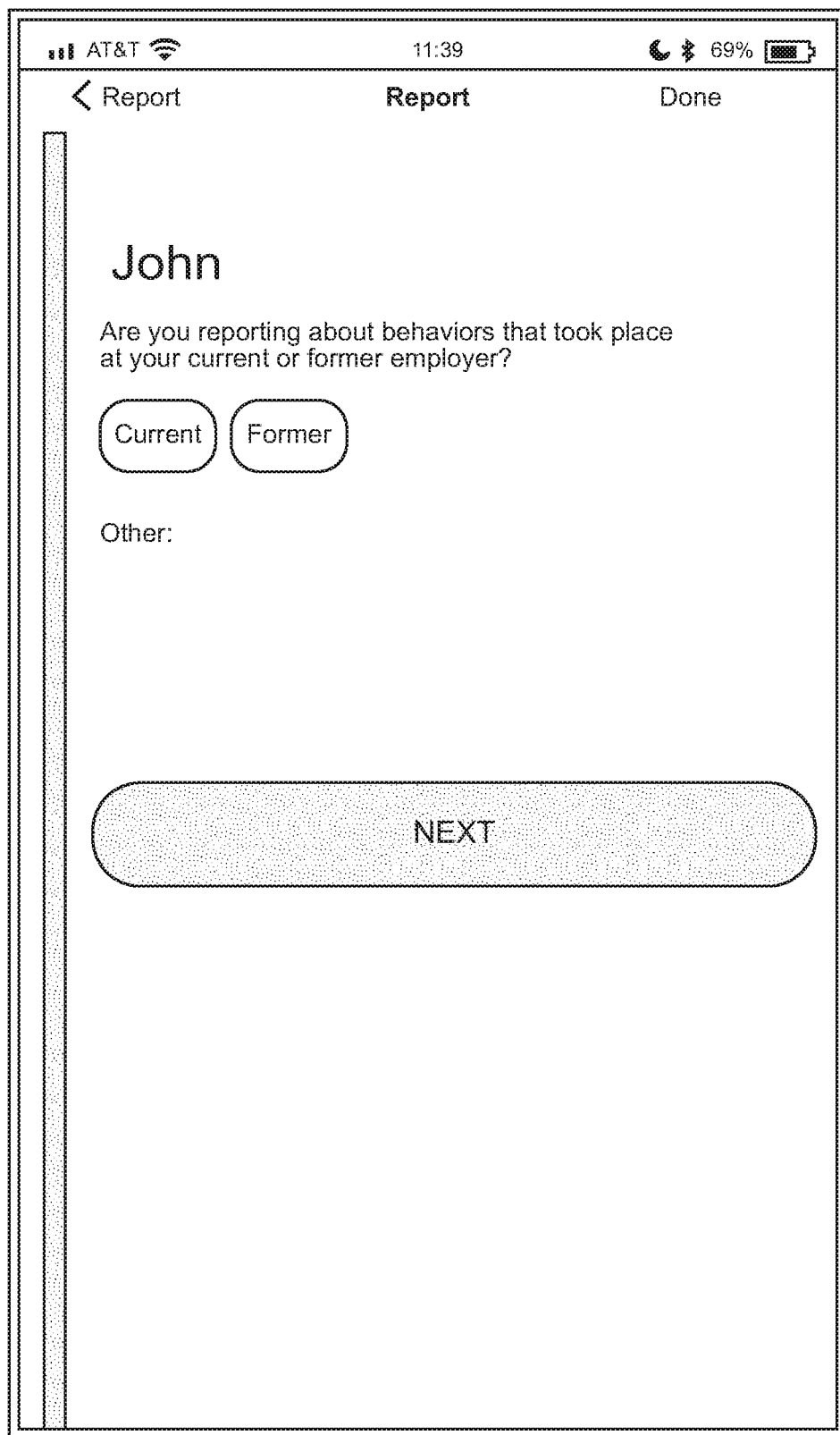
Figure 15:
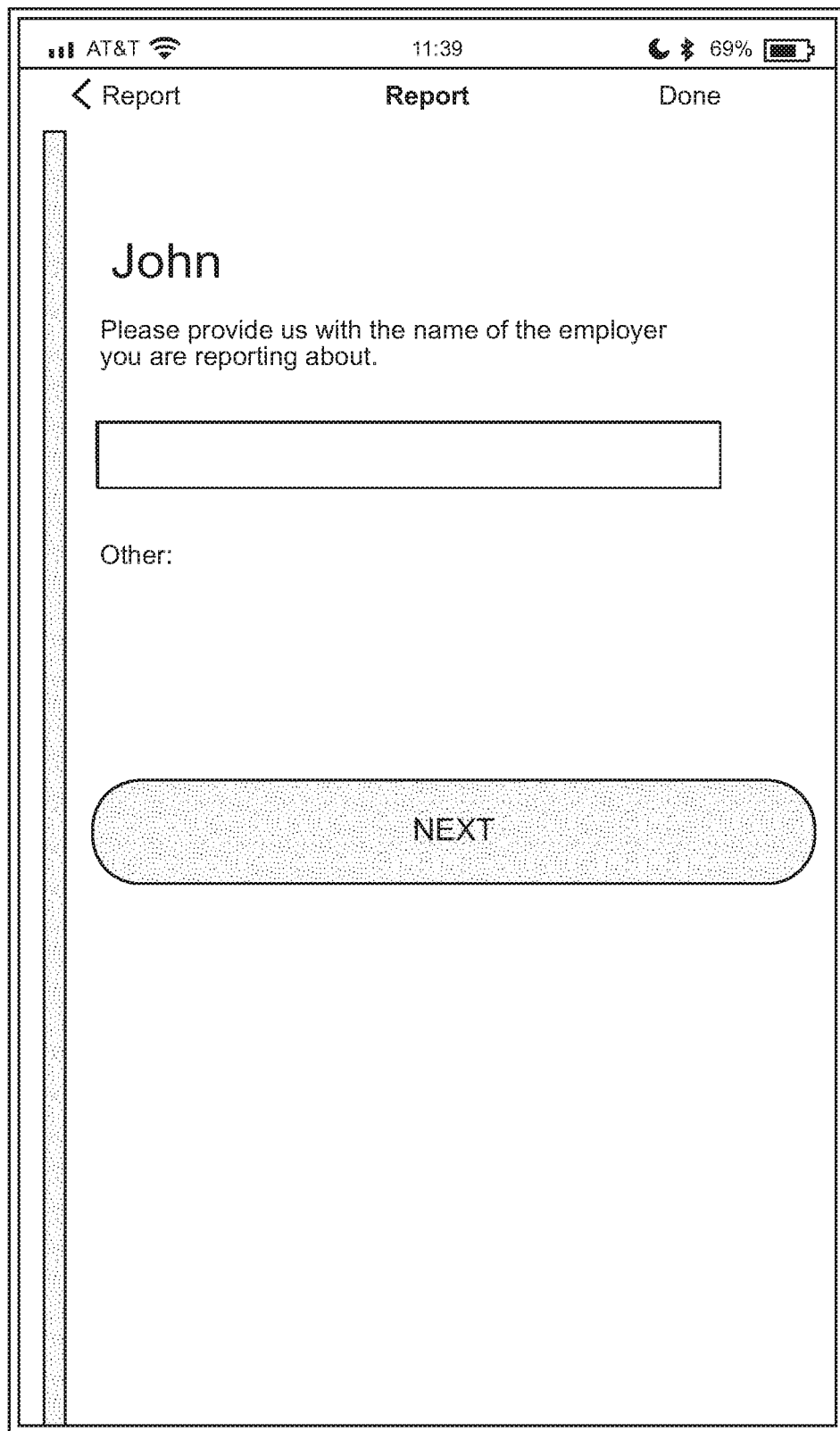
Figure 16:
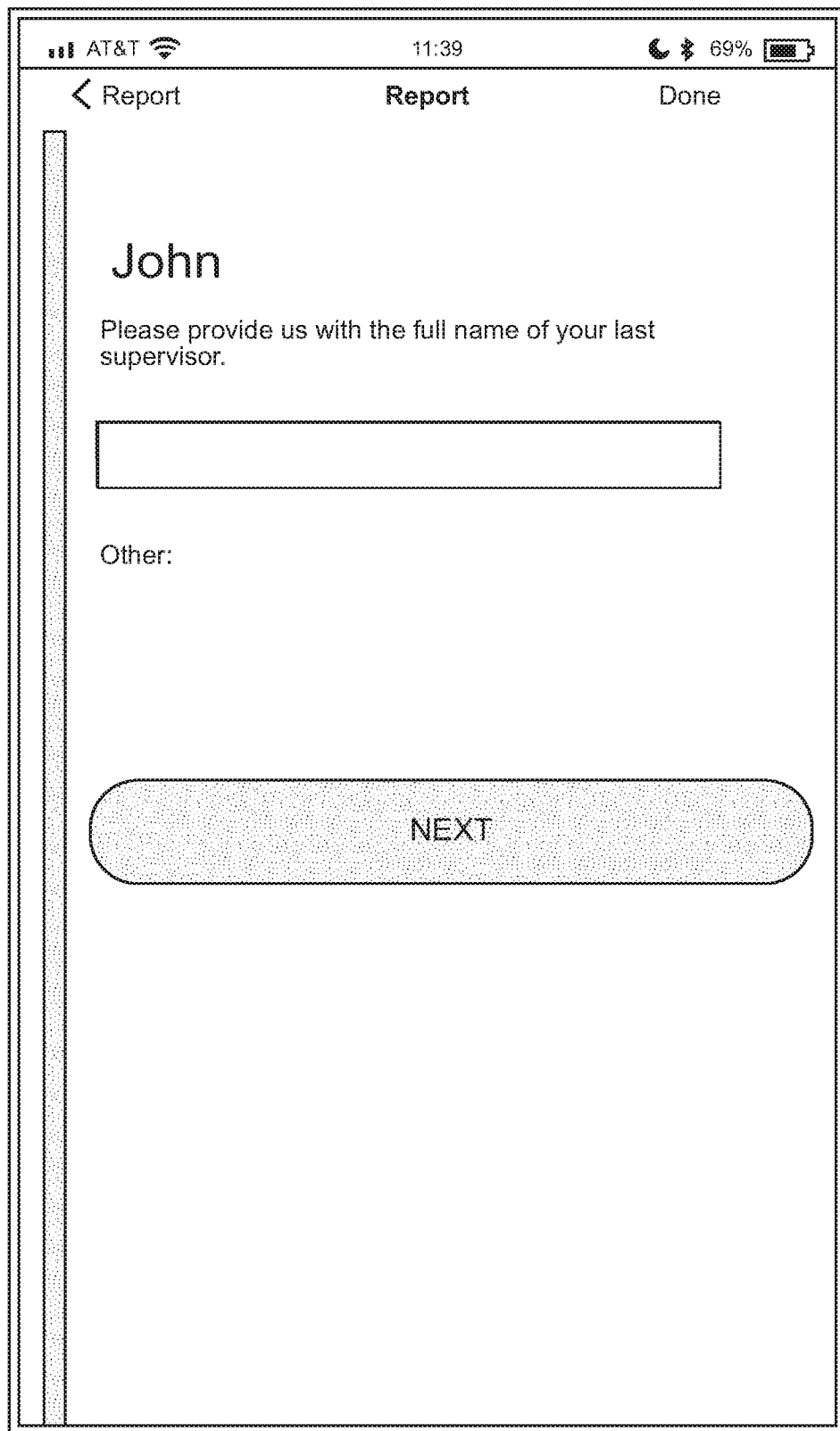
Figure 17:
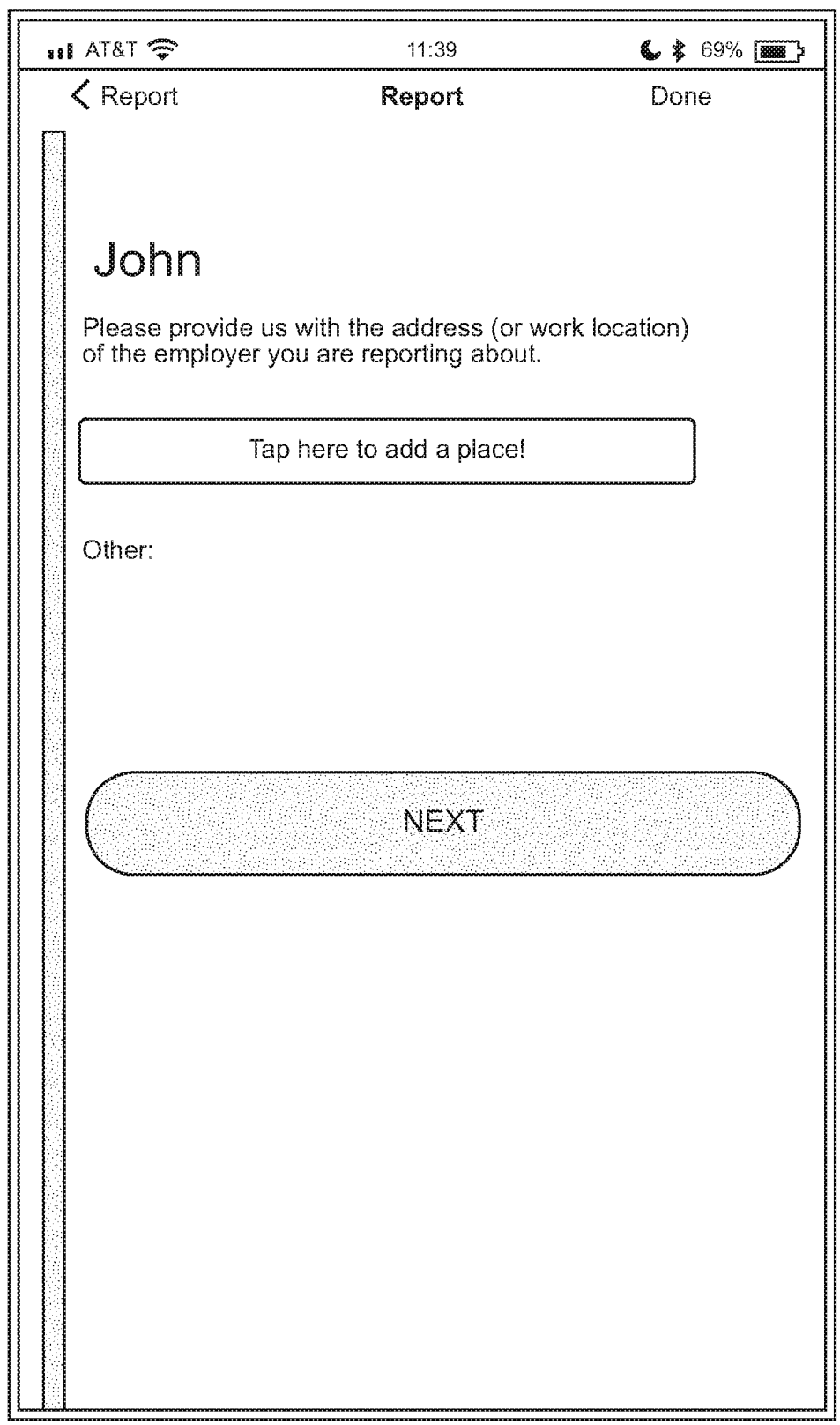
Figure 18:
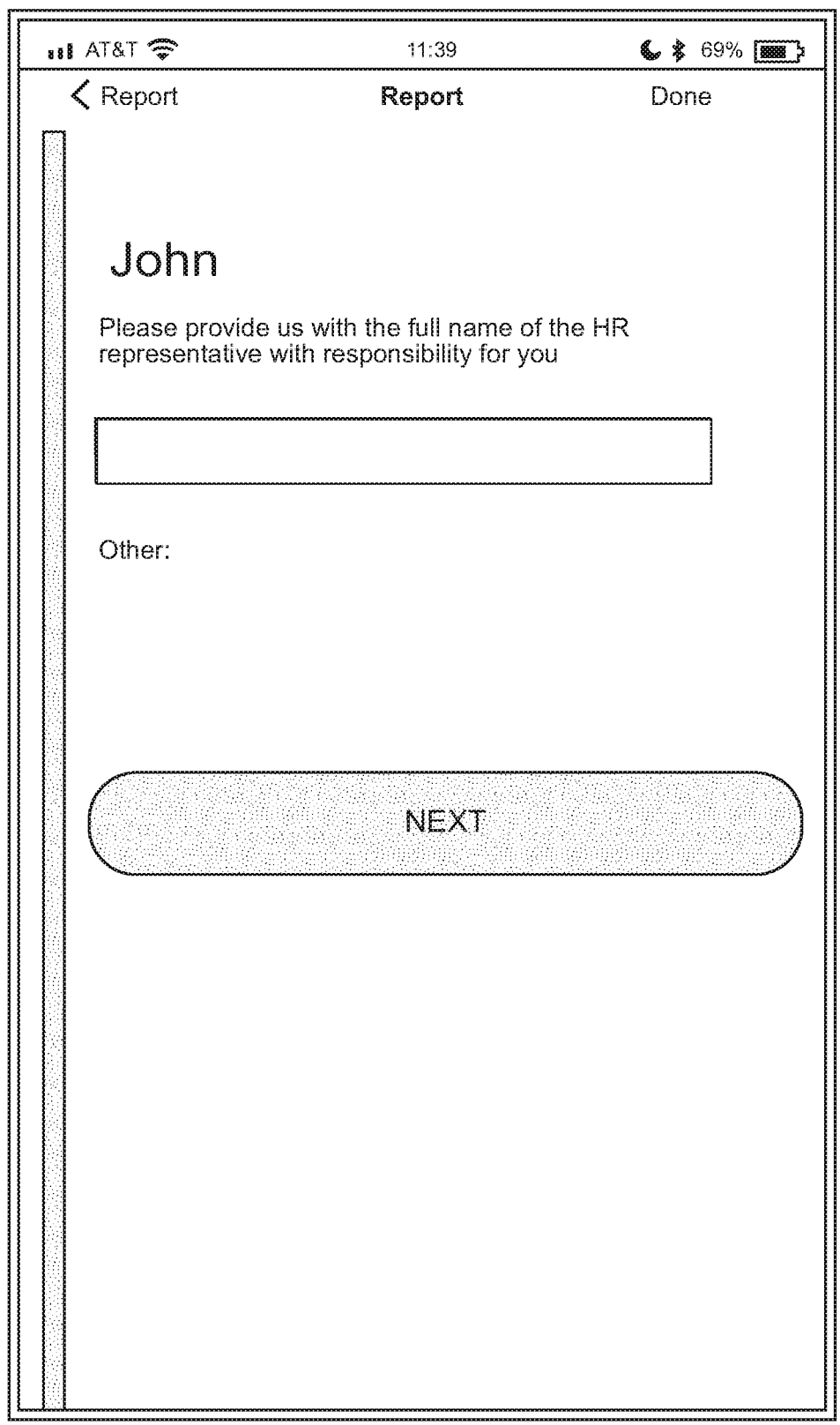
Figure 19:
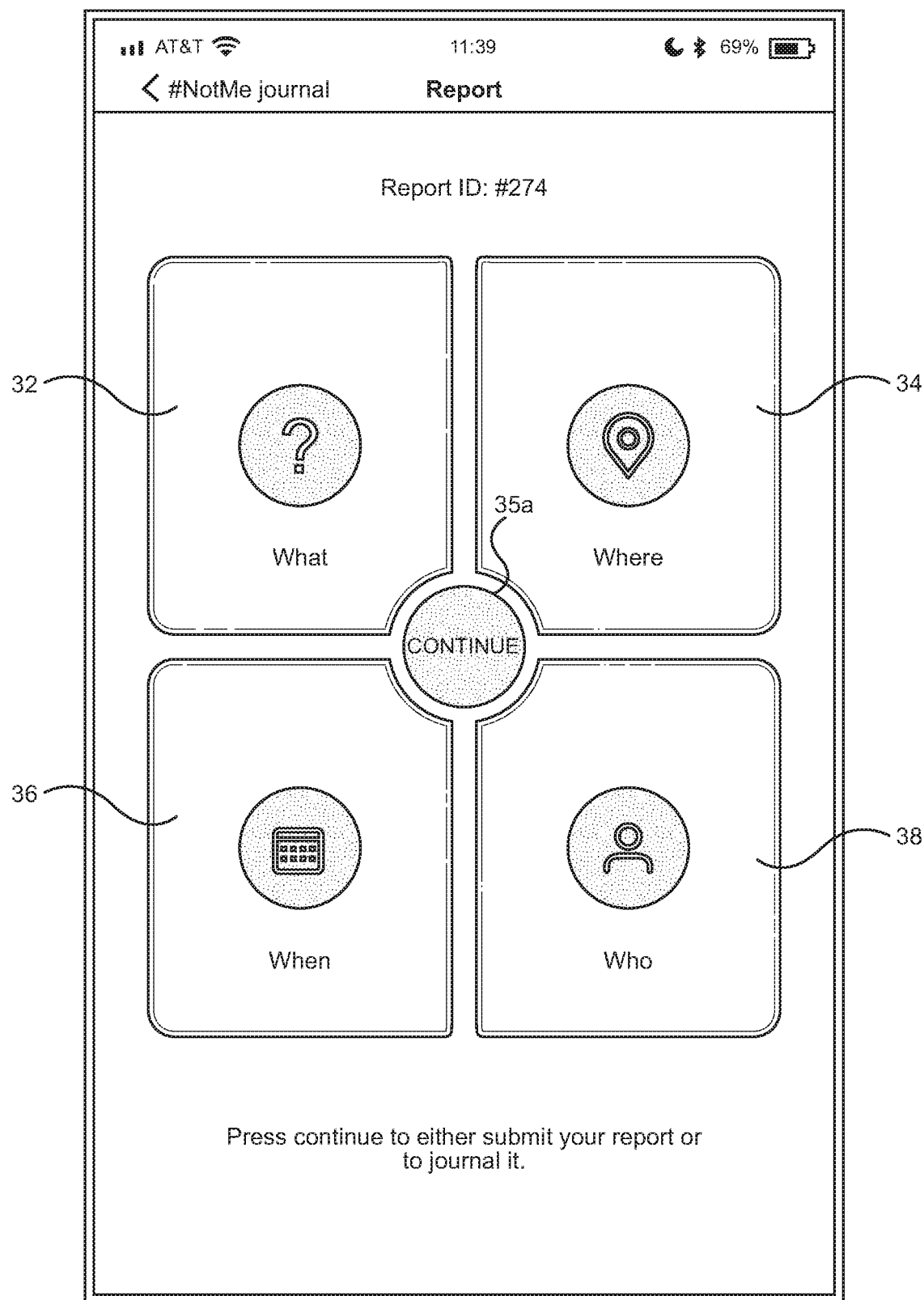
Figure 20A:
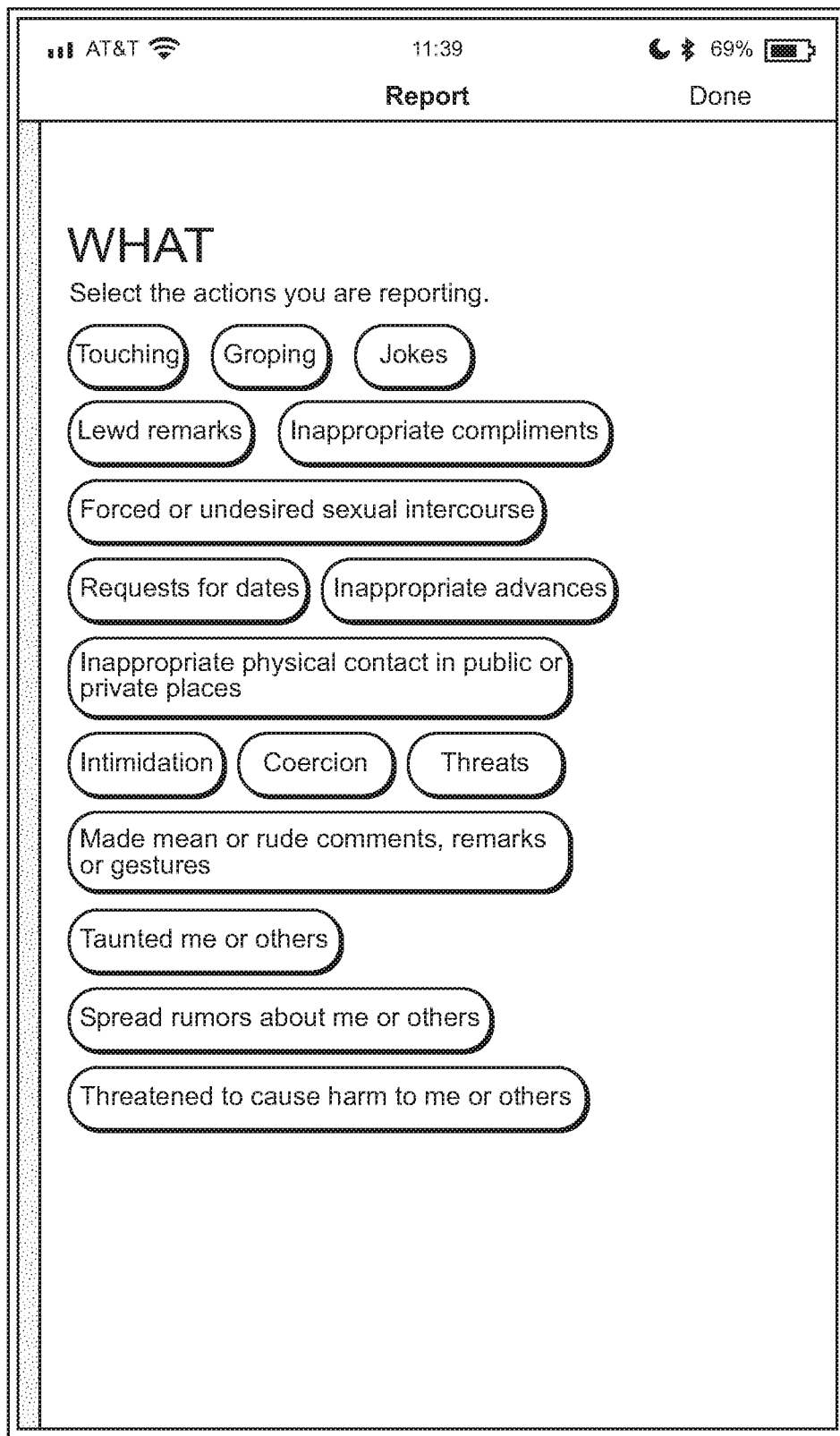
Figure 20B:
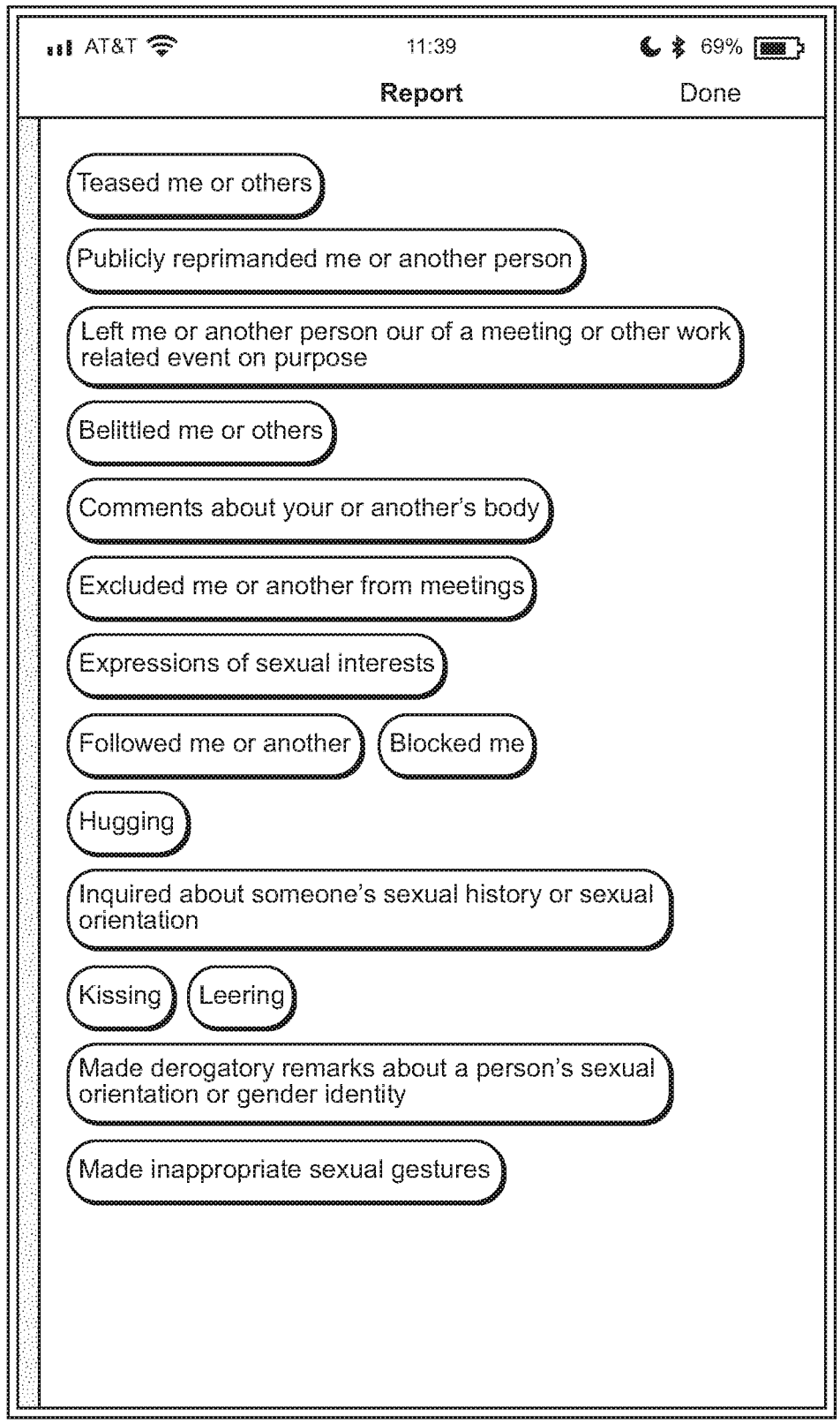
Figure 20C:
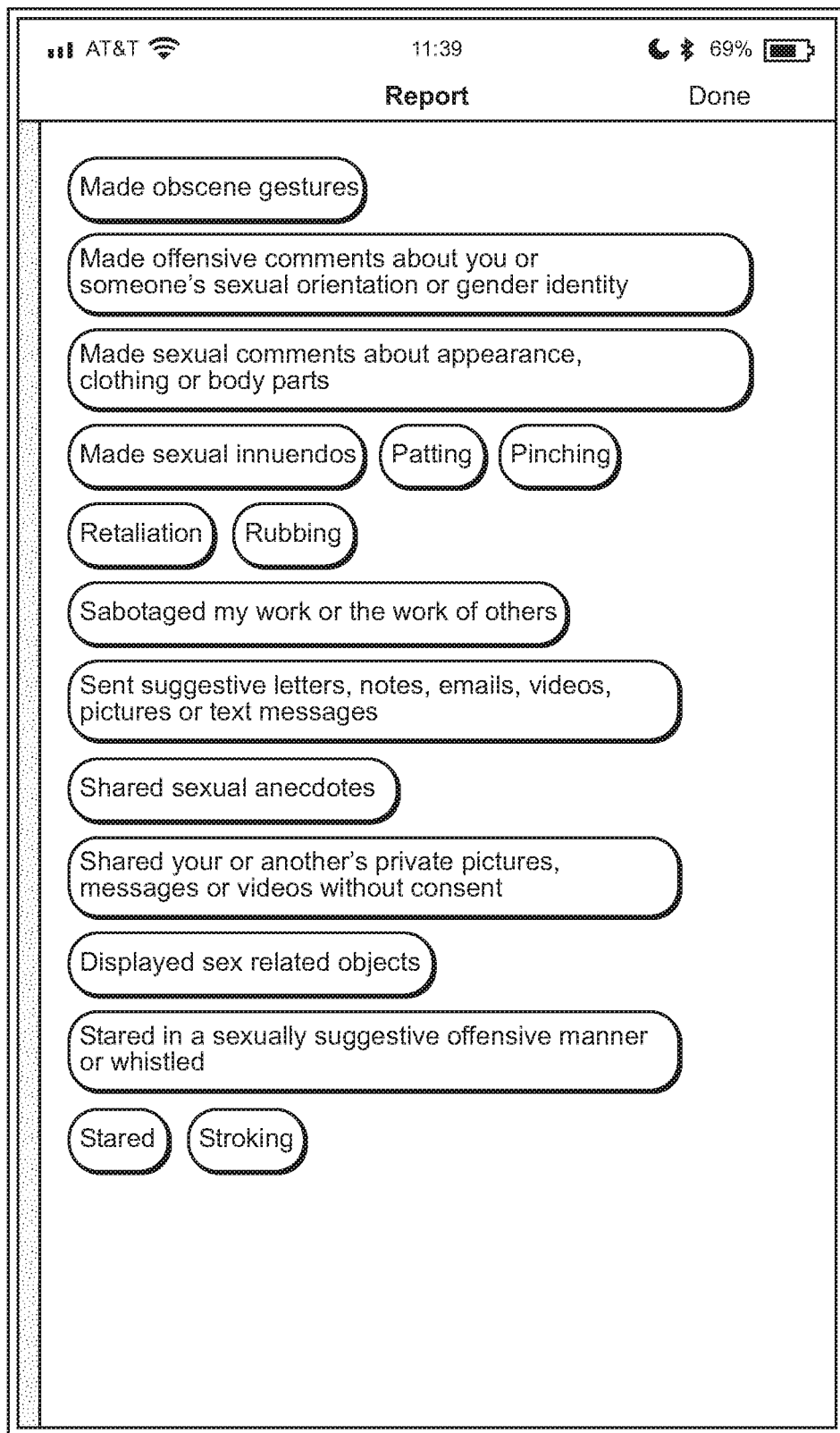
Figure 20D:
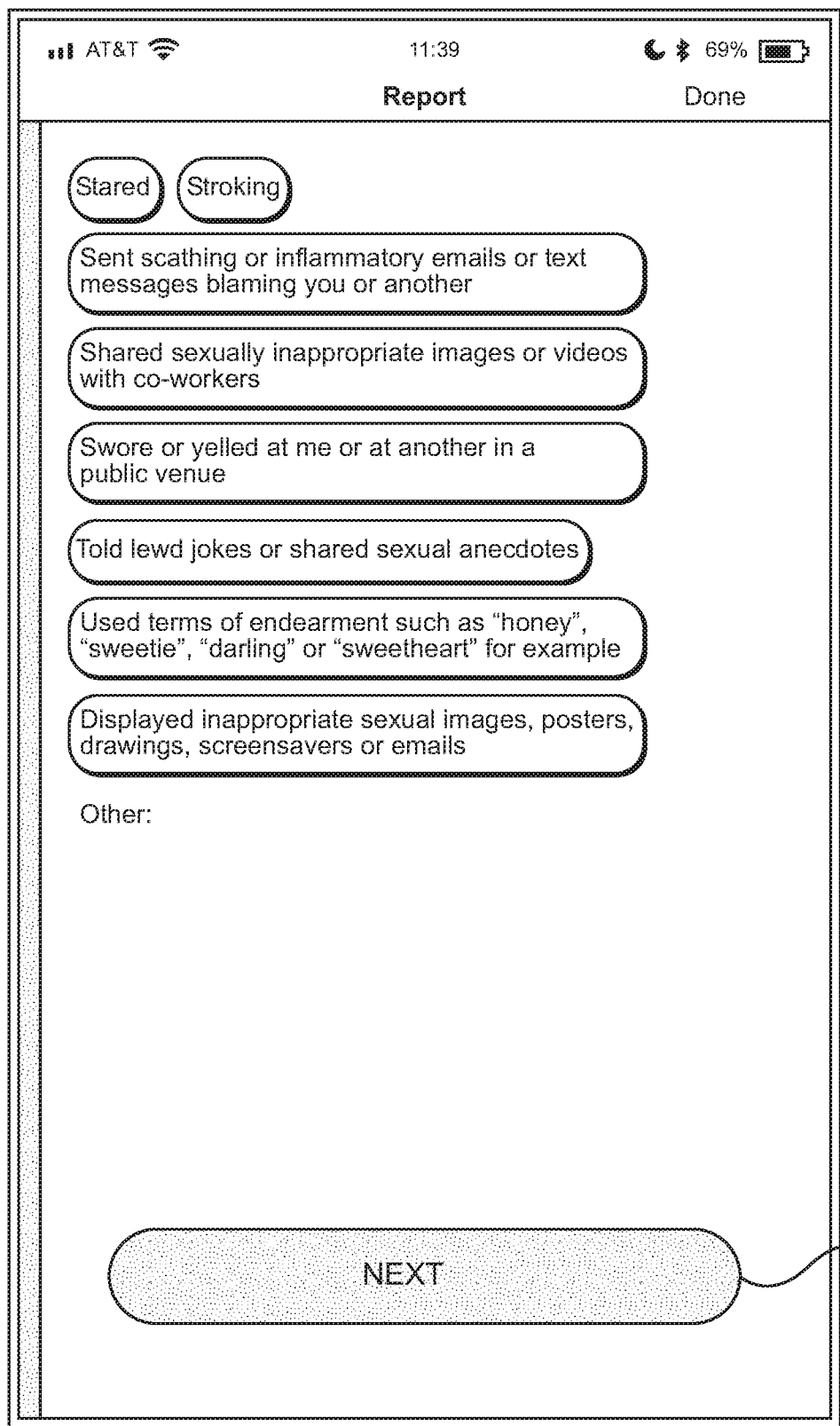
Figure 21:
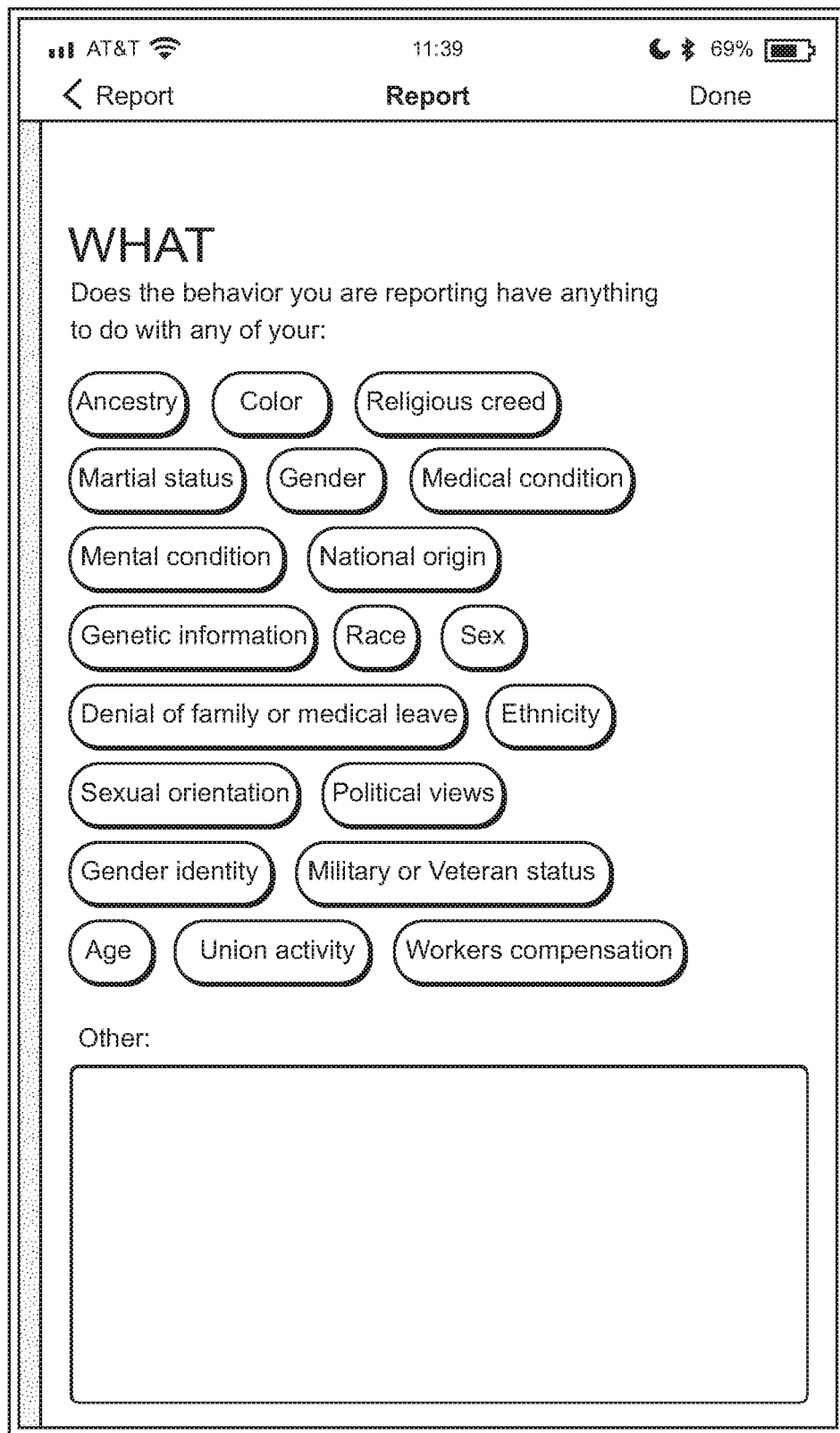
Figure 22:
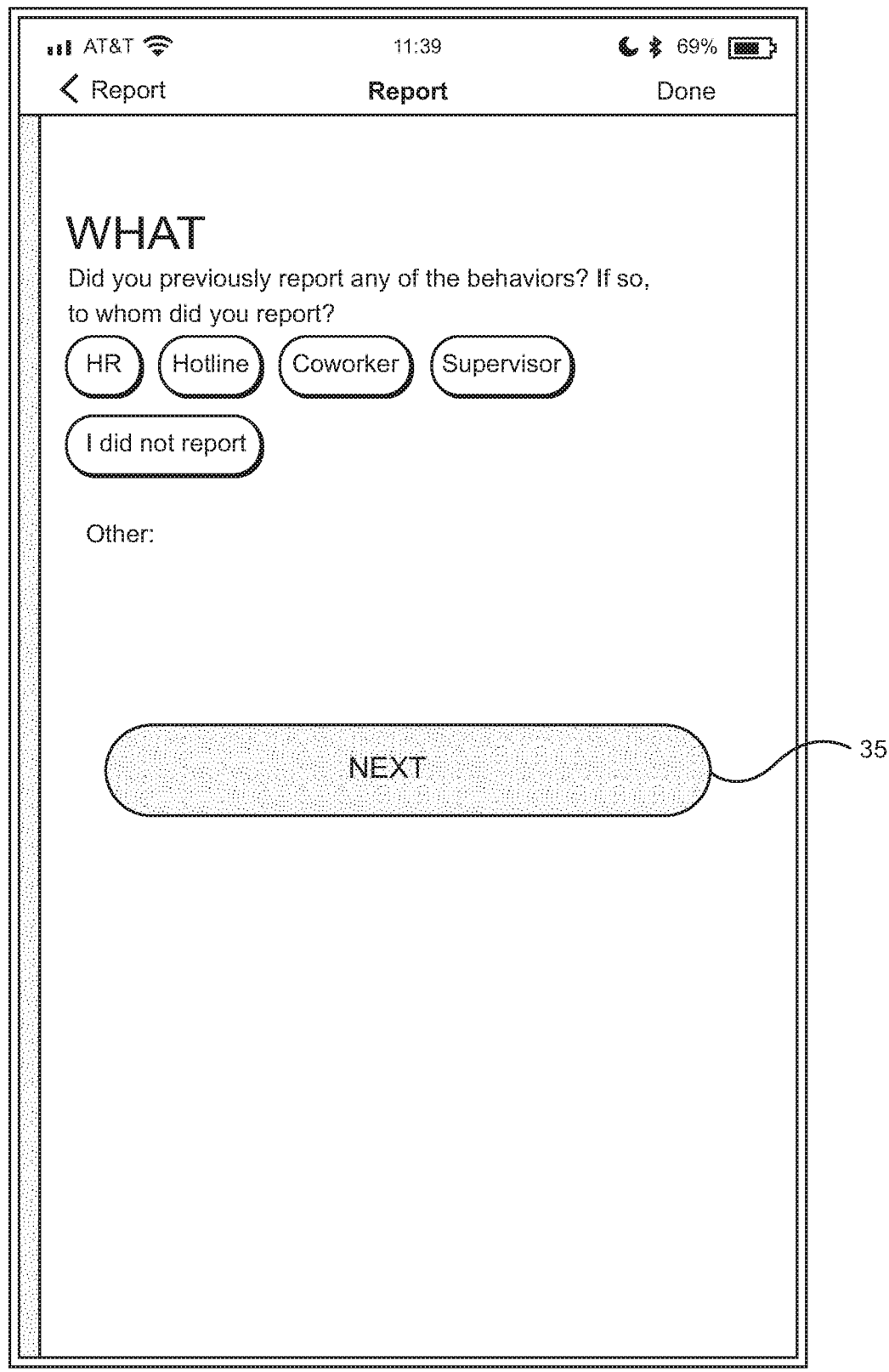
Figure 23:
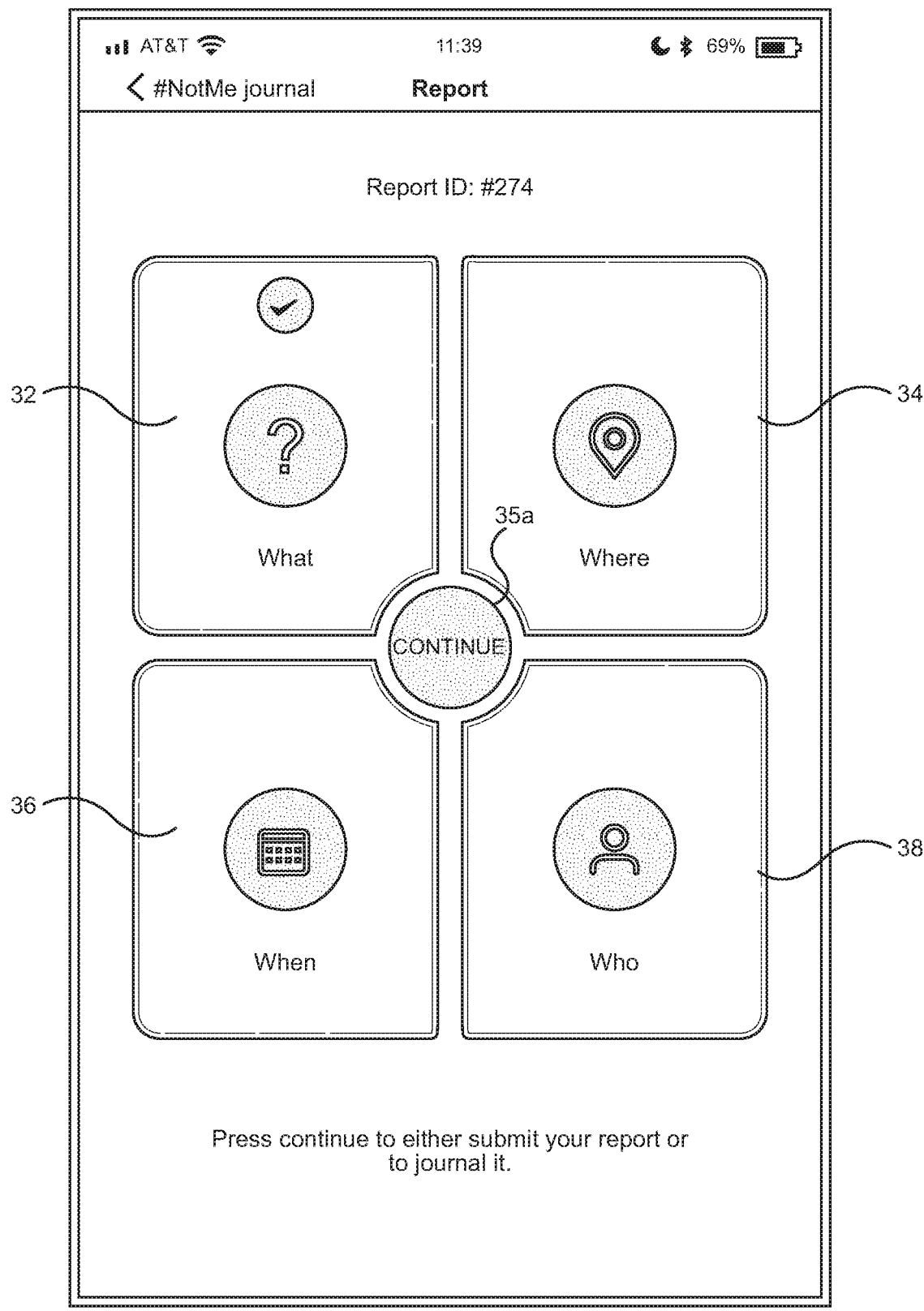
Figure 24:
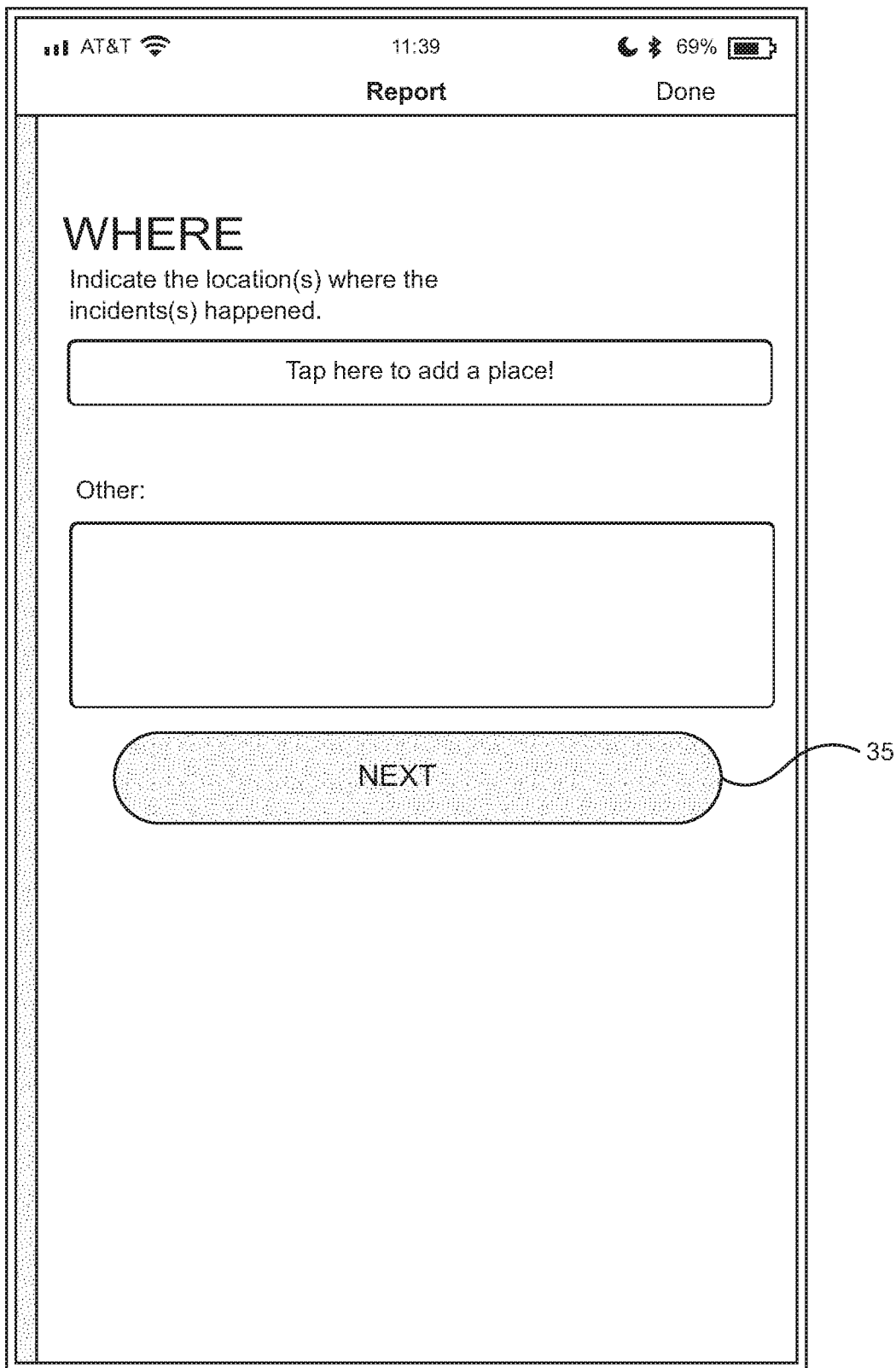
Figure 25:
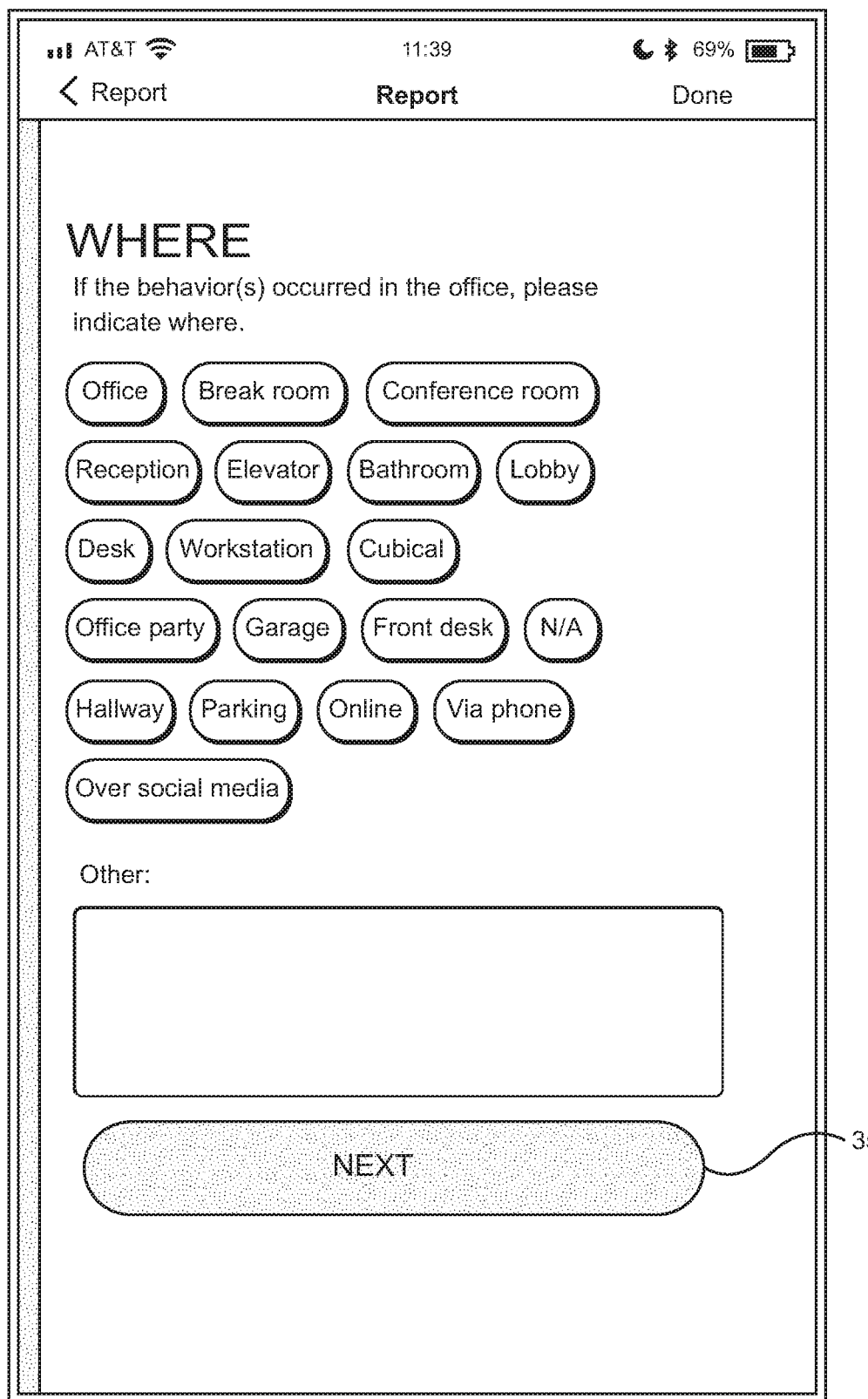
Figure 26:
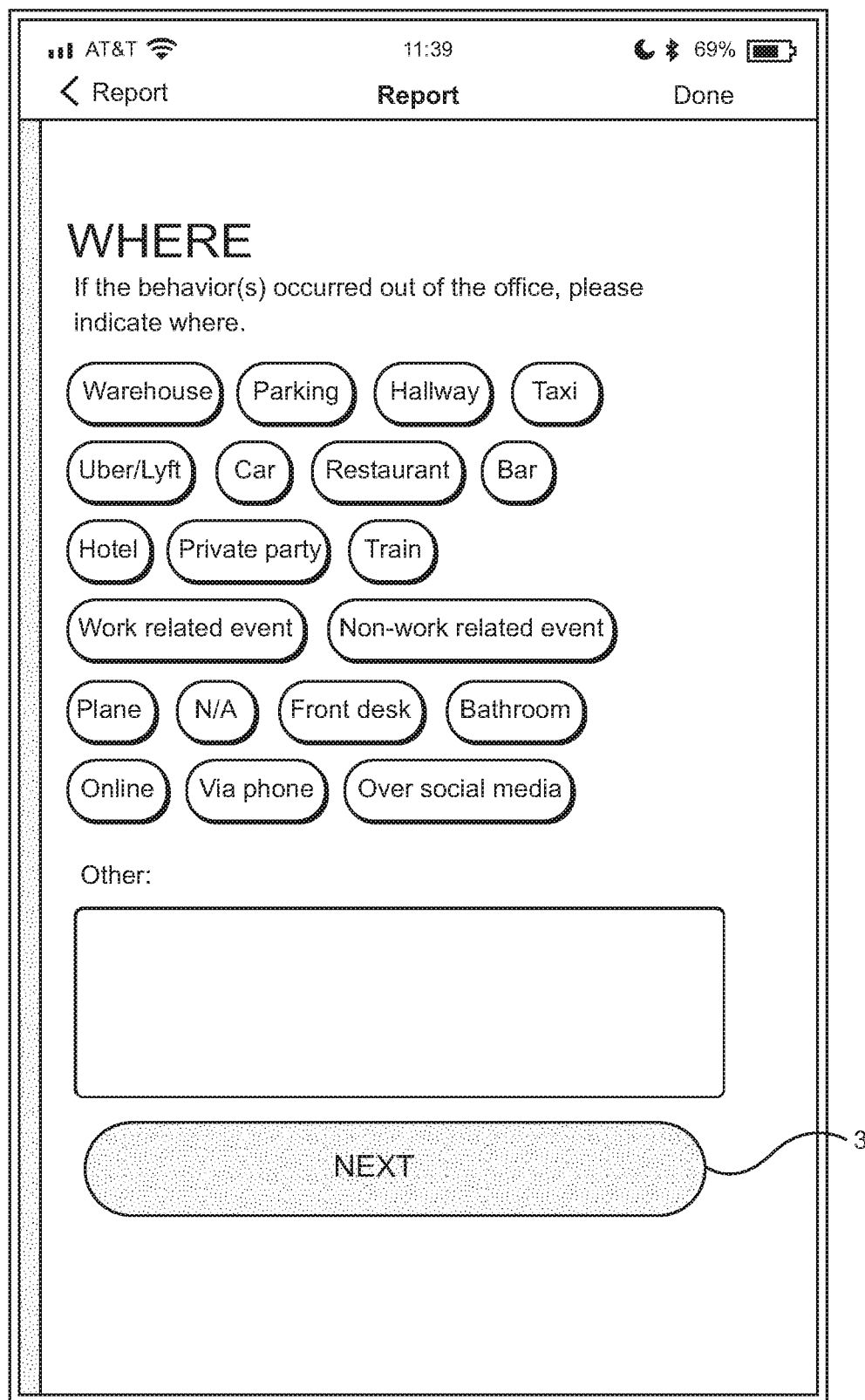
Figure 27:
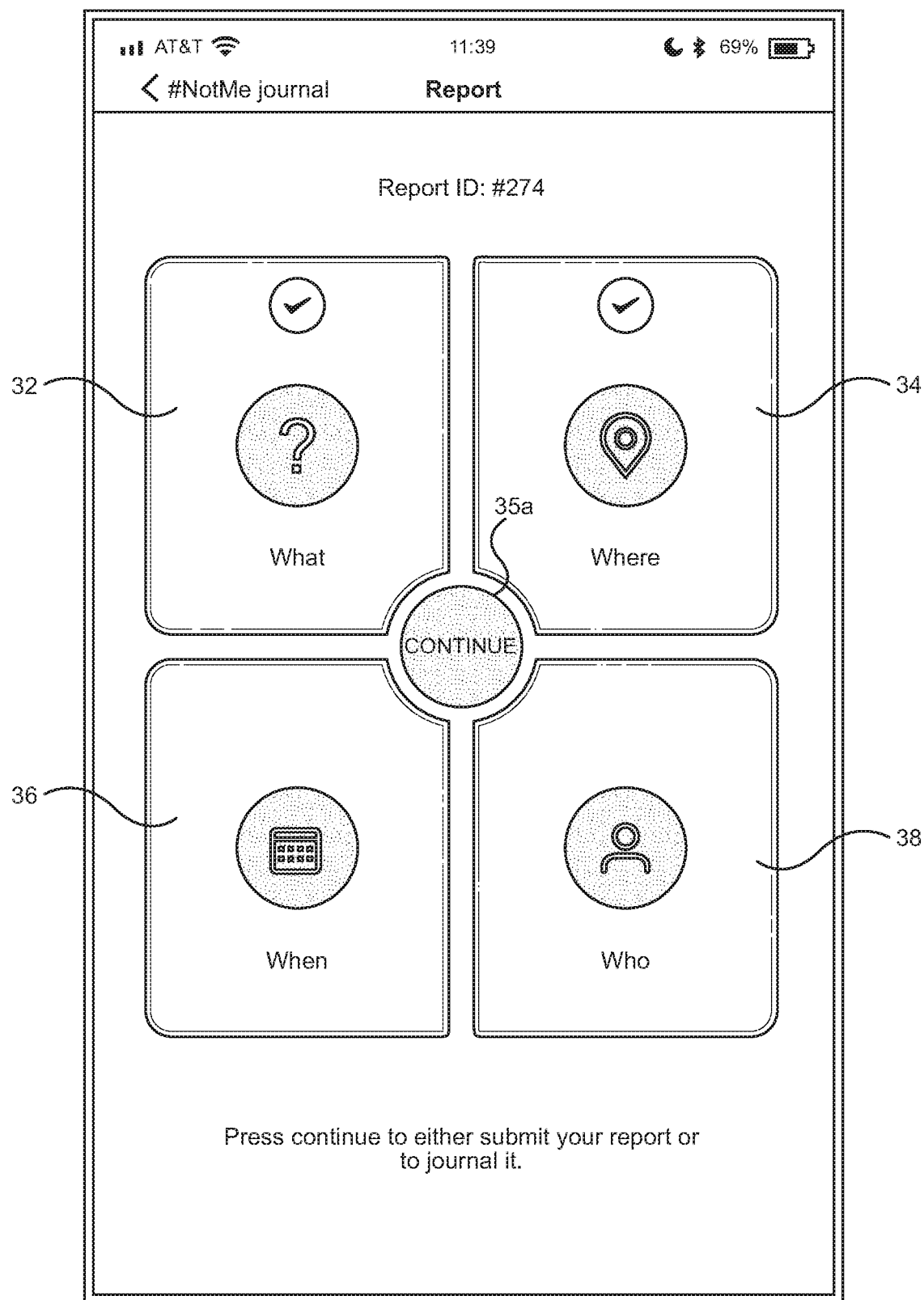

When it is time to report an incident, the employee 12 simply opens the reporting app 16, logs in (see FIG. 8) and swipes the "SWIPE TO REPORT" button 30 (see FIG. 9). In addition, and at this point, the employee 12 is asked to identify the name of the employer, enter the company email address, and confirm the company email (see FIGS. 10 and 11). Through the utilization of the victim notification system 10, and as part of the agreement between the employer 14 and the system administrator 22 of the victim notification system 10, the employer 14 reminds its employees that it cannot retaliate against the employee for reporting or complaining about harassment and/or discrimination (see FIG. 12). Retaliation is unlawful. The employee 12 is made aware of this fact and that unlawful retaliation can be any of the following: termination, demotion, change in compensation or in salary, change of schedule, change in job duties and responsibilities, and further derogatory comments. The employee 12 is notified that if they experience any of these activities after making a report the actions should be reported to either the system administrator 22 of the victim notification system 10 or to another individual empowered to handle the situation. With regard to gathering employee information, the employee 12 is further requested to identify whether he/she is reporting on their own or as a witness (see FIG. 13), whether he/she is reporting about current or past behavior (see FIG. 14), the name of the employer (see FIG. 15), the name of the last supervisor (see FIG. 16), the address of the employer where the act took place (see FIG. 17), and the name of the human resource representative (see FIG. 18).

The reporting app 16 is developed to make reporting of instances of harassment, discrimination or bullying (or other behaviors) very simple. In particular, and after the "SWIPE TO REPORT" button 30 is swiped and the employee has answered the few questions discussed in the above paragraph, the employee 12 is provided with a graphical user interface showing four icons that are provided for inputting relevant information (see FIG. 19). As mentioned above, a witness may similarly report an incident and the reporting app 16 provides a mechanism to allow for the user to designate whether the report is being initiated by an employee or a witness.

Initiation of the reporting process generates an API call via the public API 31 to the central operational facility 20 to generate a blank report that includes a report ID, the date of creation for the report, the company the person works for, and whether the person is the victim or witness. The blank report is stored in the in the central server database 24.

The icons of the reporting app 16 include a "WHAT" icon 32, a "WHERE" icon 34, a "WHEN" icon 36, a "WHO" icon 38 and a "CONTINUE" button 35a. This allows the employee 12 to provide as much or as little of the information as desired by the employee 12. While the description below presents the access to prompts and structured inputs in a specific order, it is appreciated the order may be varied and employees may access the "WHAT" icon 32, "WHERE" icon 34, "WHEN" icon 36, and "WHO" icon 38 in the order they desire.

It is appreciated the questions associated with the "WHAT" icon 32, "WHERE" icon 34, "WHEN" icon 36, and "WHO" icon 38 are customizable by the employer (or organization using the system) 14. As such, an employee of a company, for example, when he or she wants to start filling out the "What" questions and taps on the "WHAT" icon 32, generates an API call via the public API to the central operational facility 20 that queries questions that the company has decided it wants to ask its employees about "What" happened and then push those questions to the reporting app 16 of the user's smartphone 18 or other computer device.

Figure 1A:
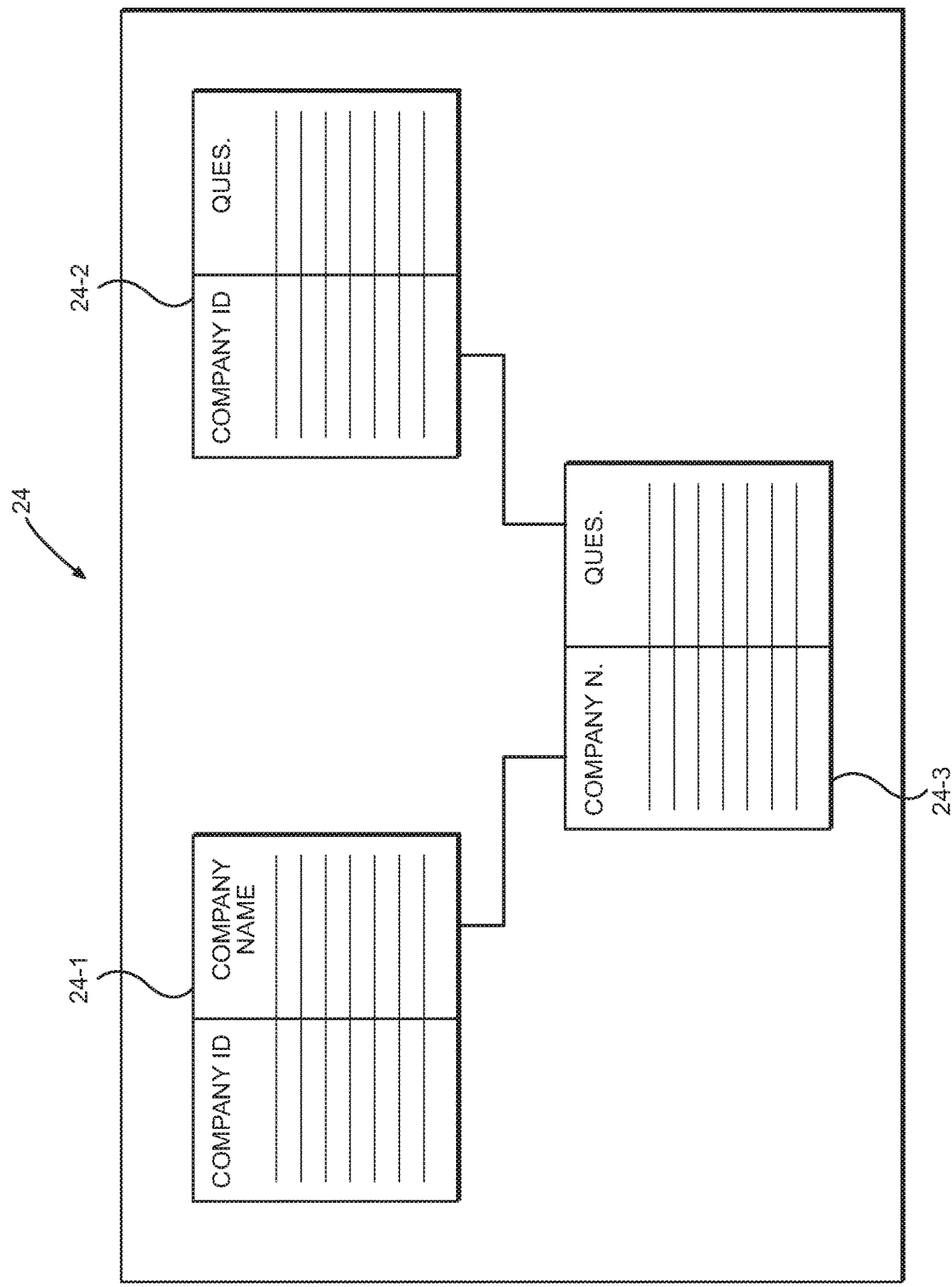
FIG. 1A is a schematic representation of the relational database tables used in accordance with the victim reporting and notification system.
Figure 2A:
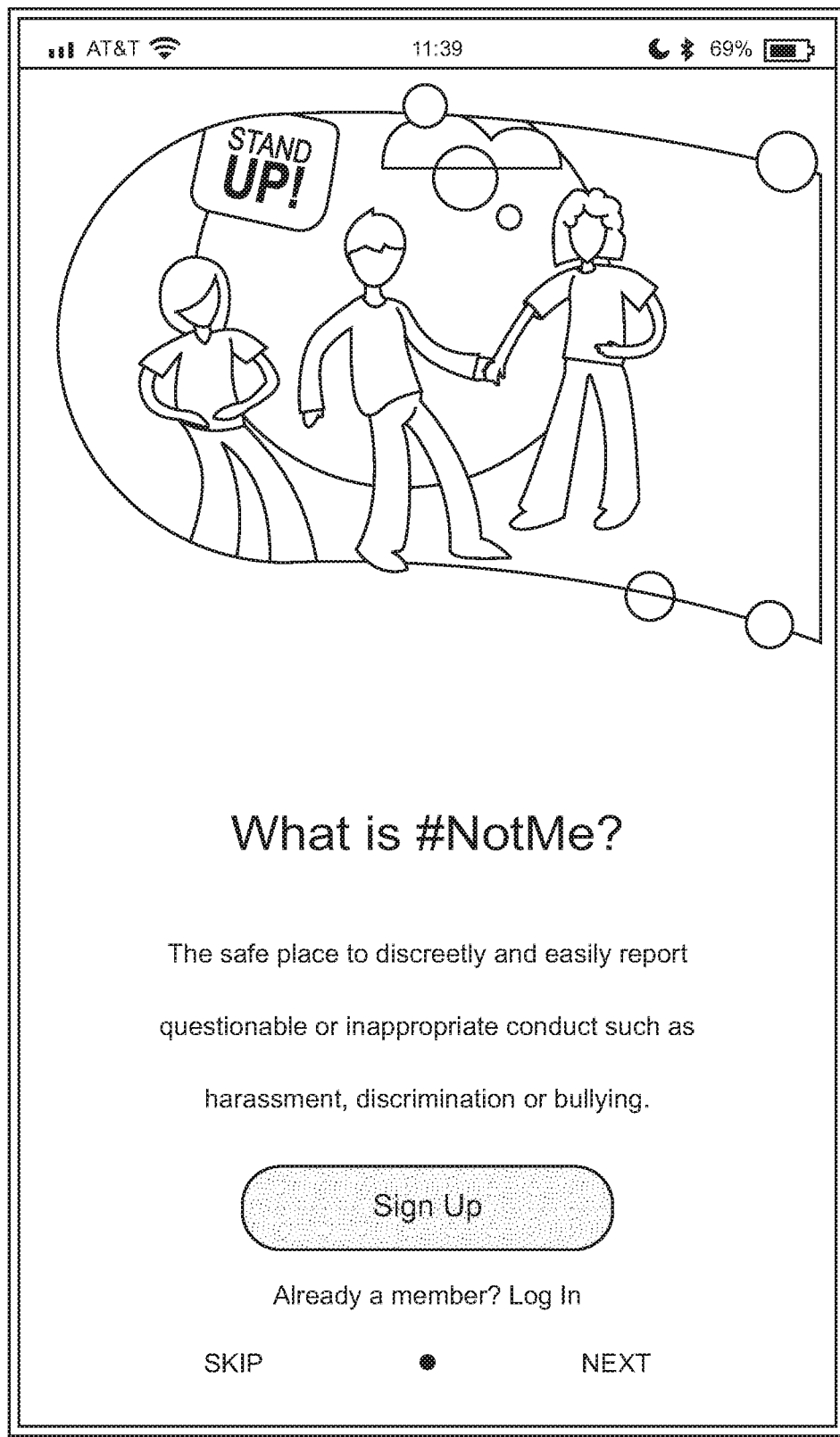
Figure 2B:
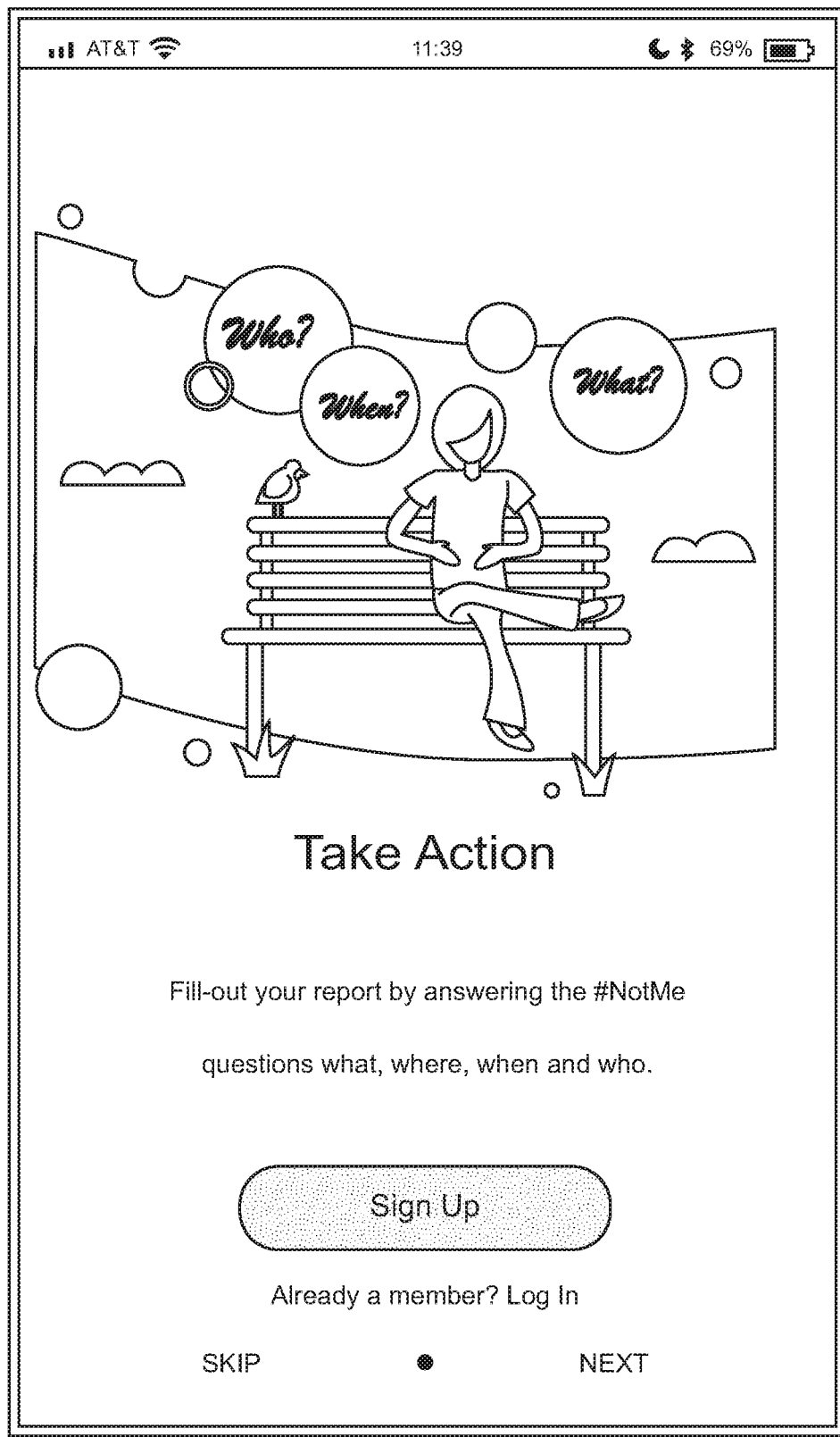
Figure 2C:
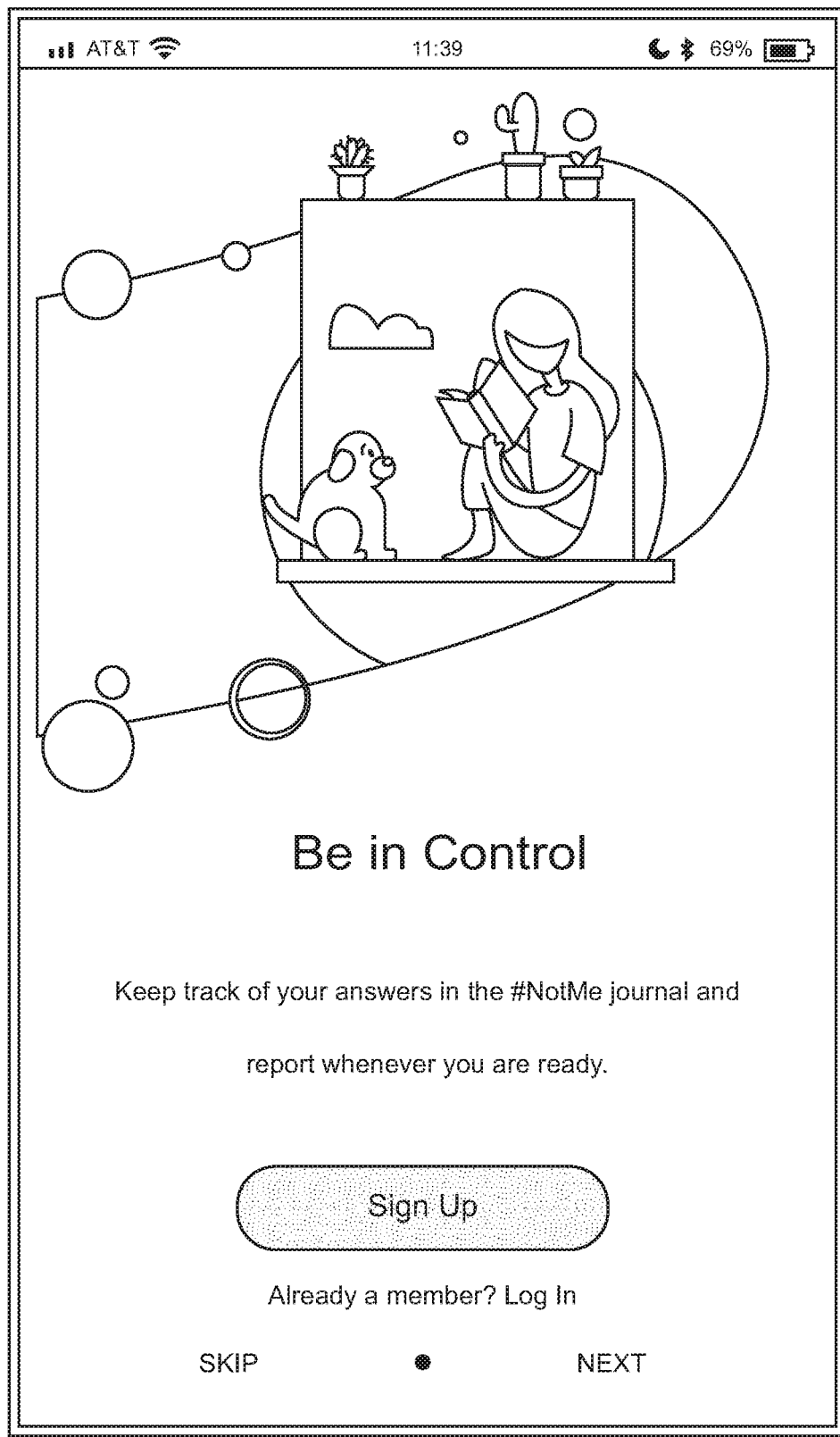
Figure 2D:
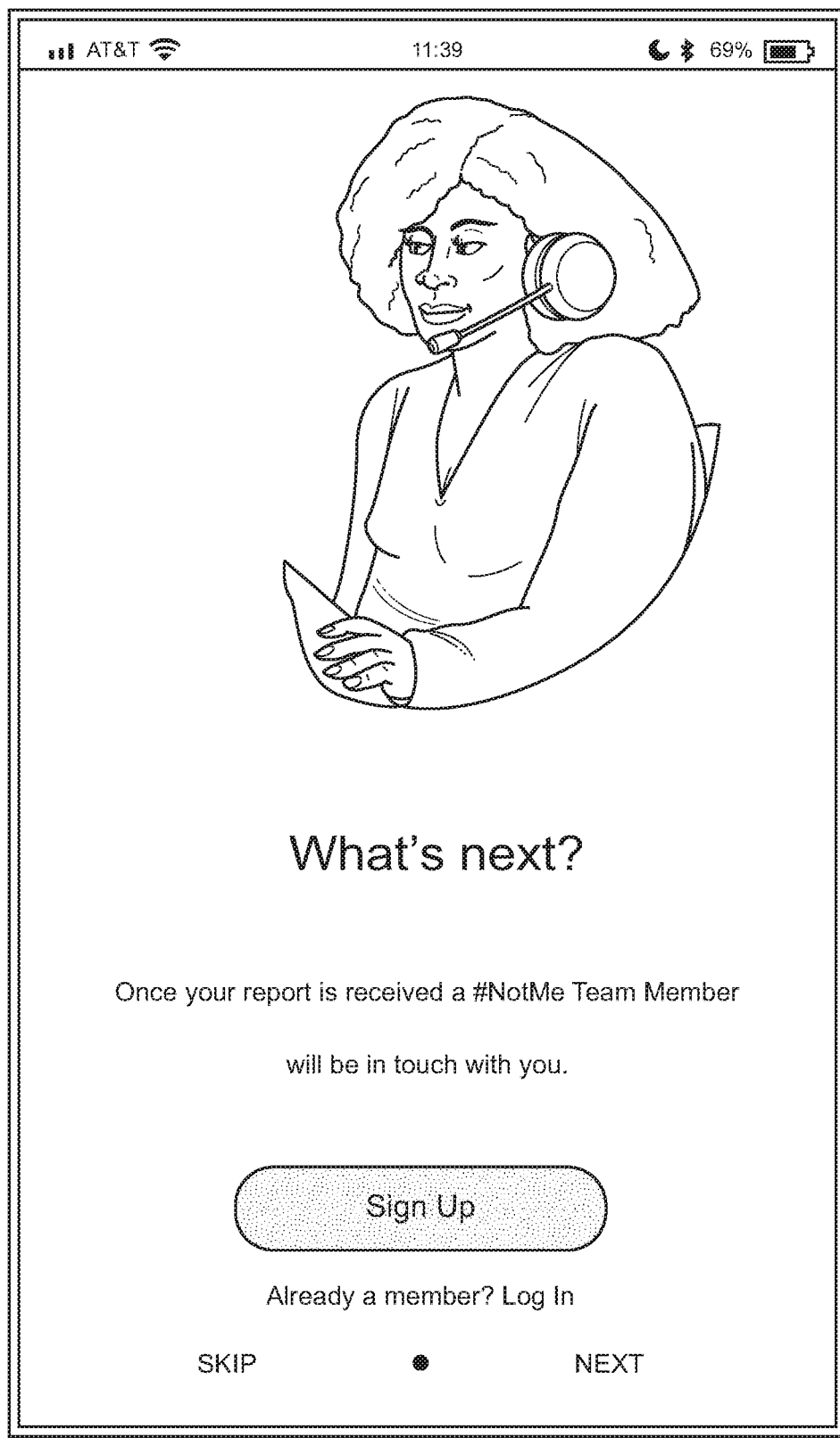
Figure 3:
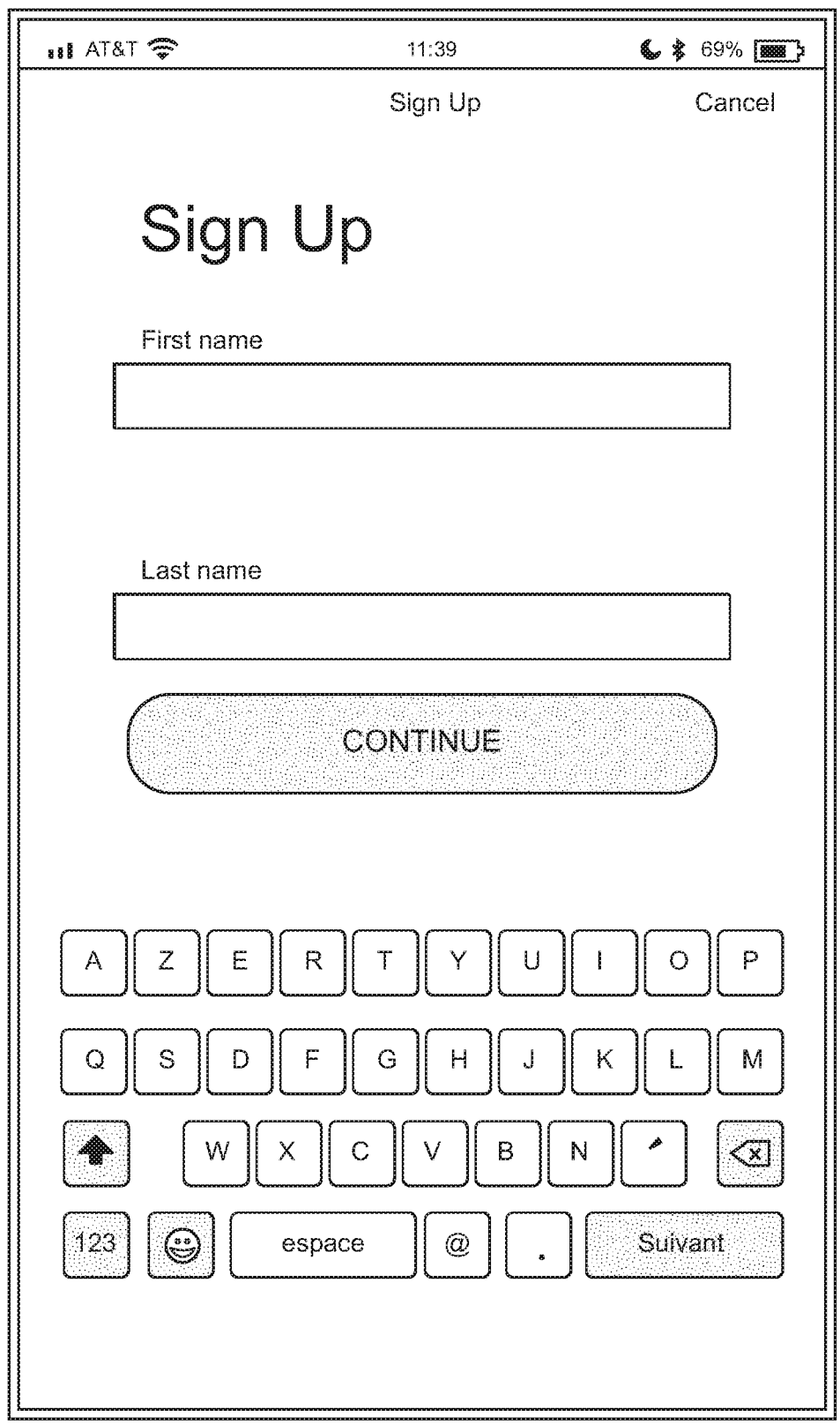
Figure 4:
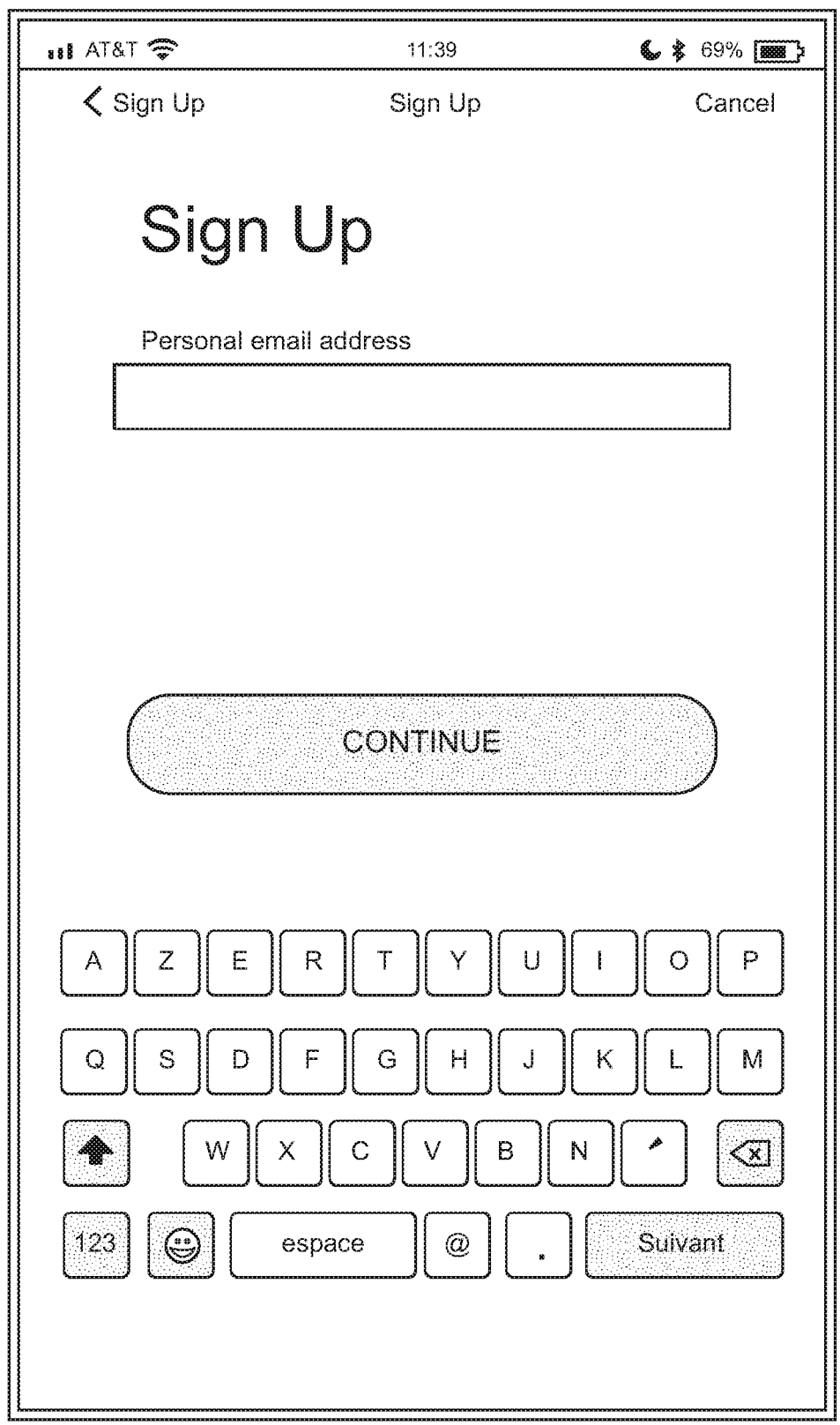
Figure 5:
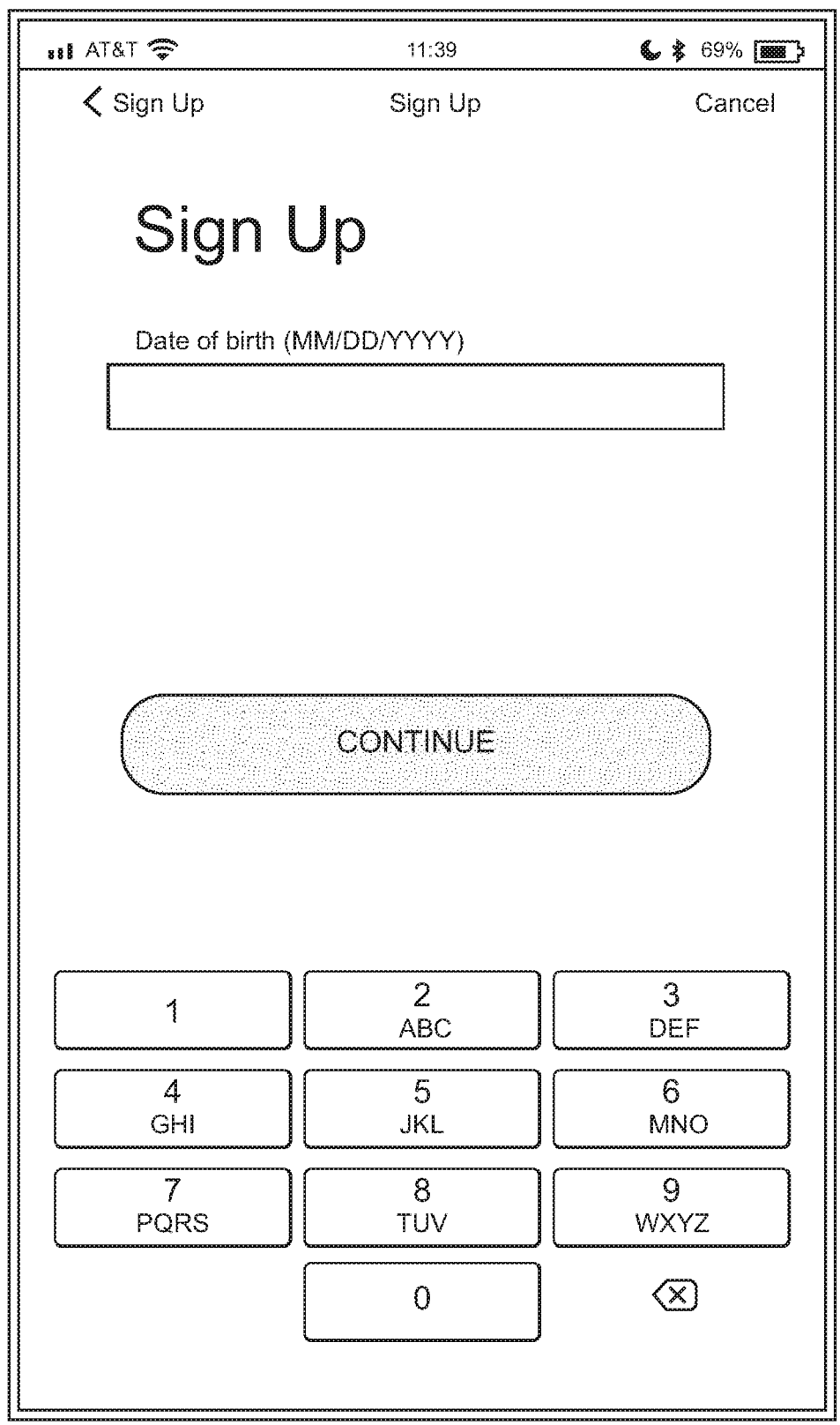
Figure 6:
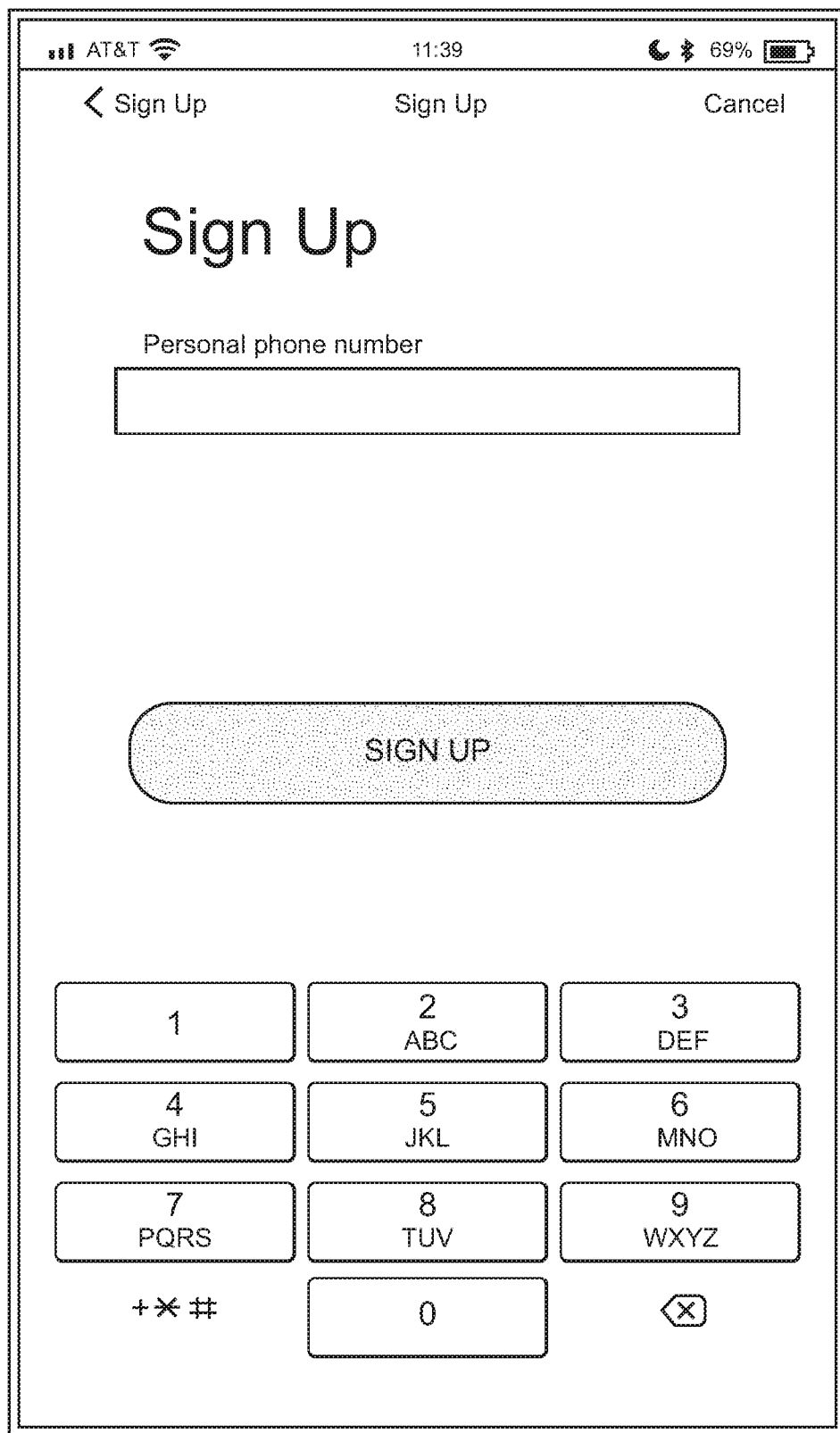
Figure 7A:
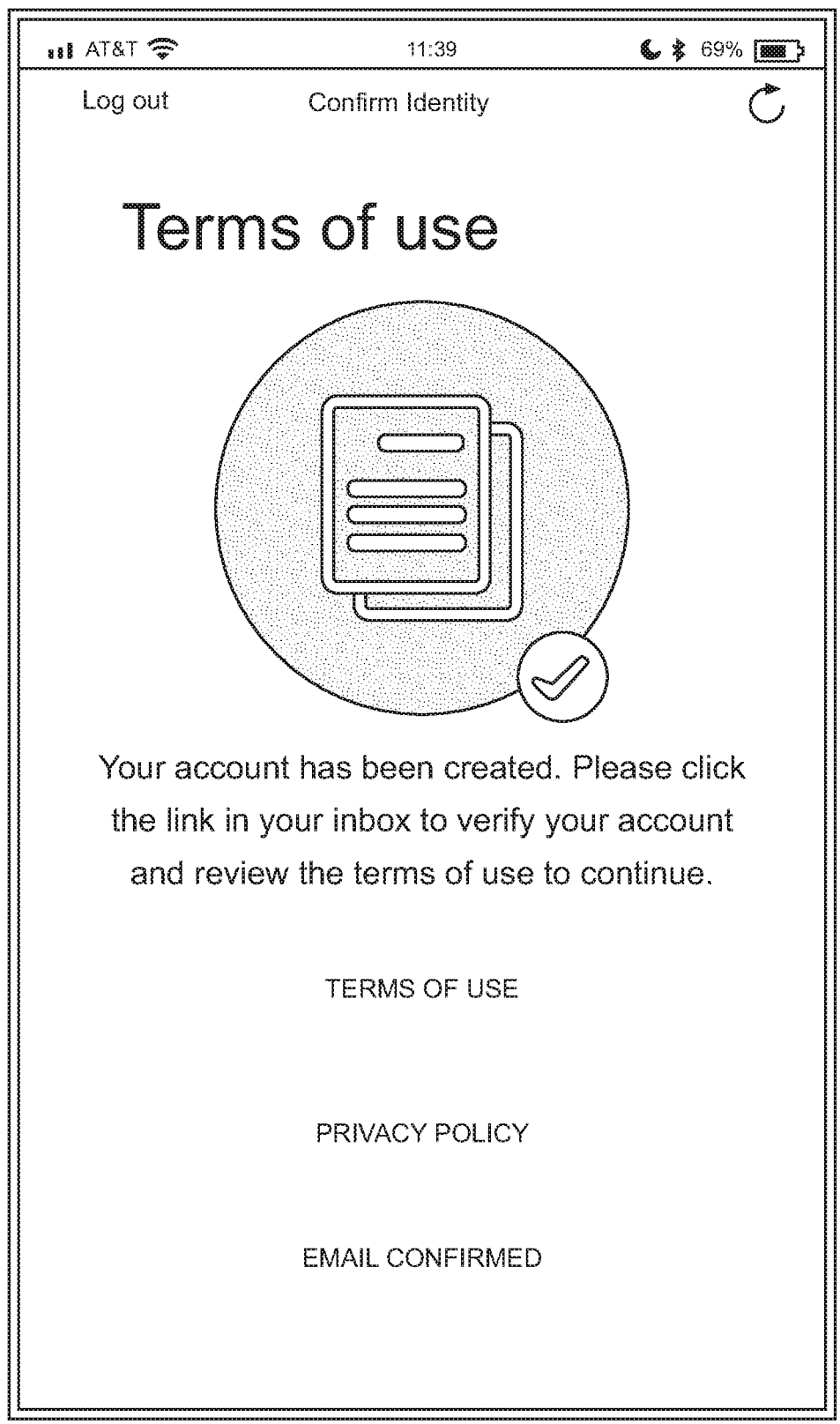
Figure 7B:
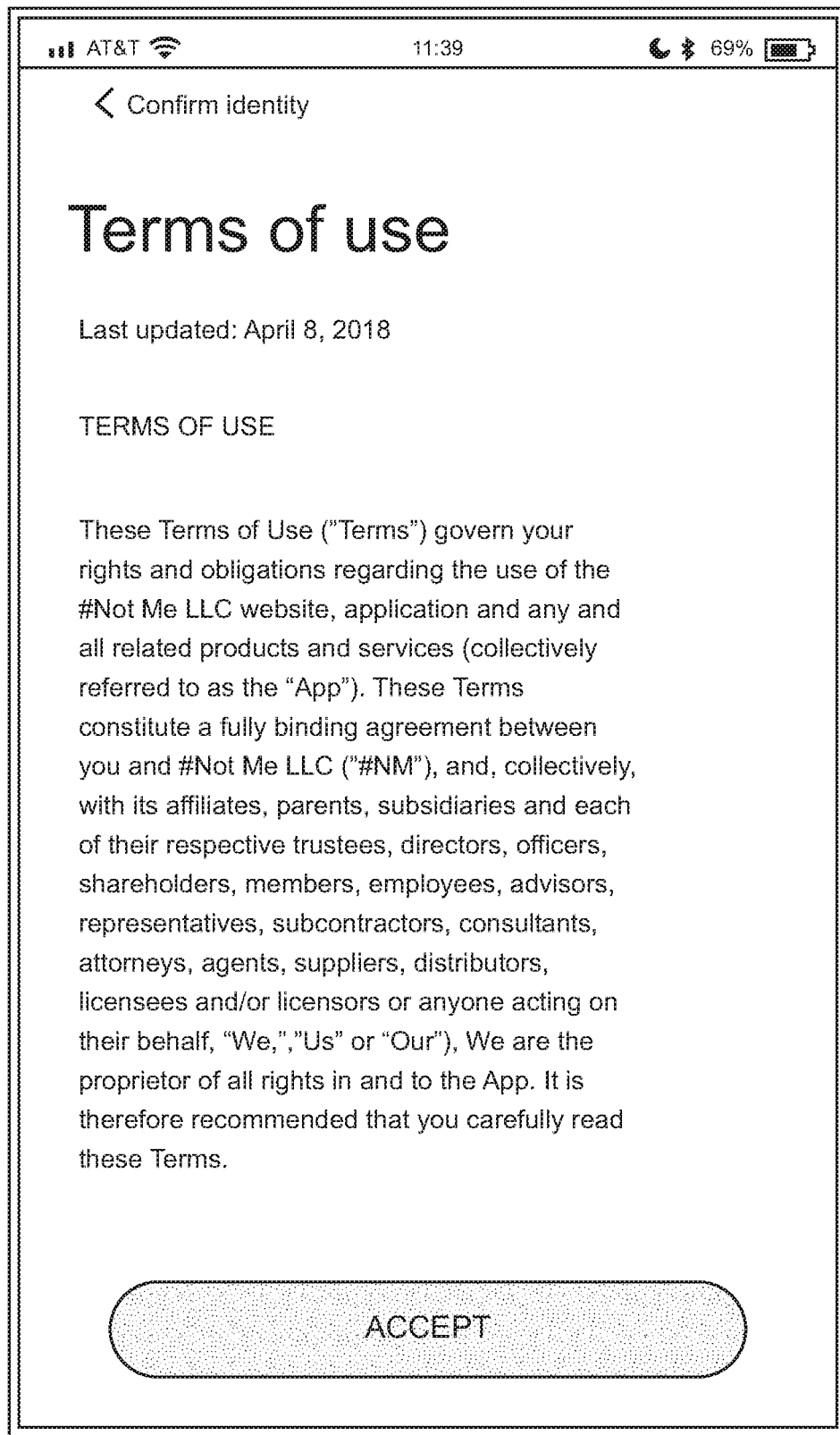
Figure 8:
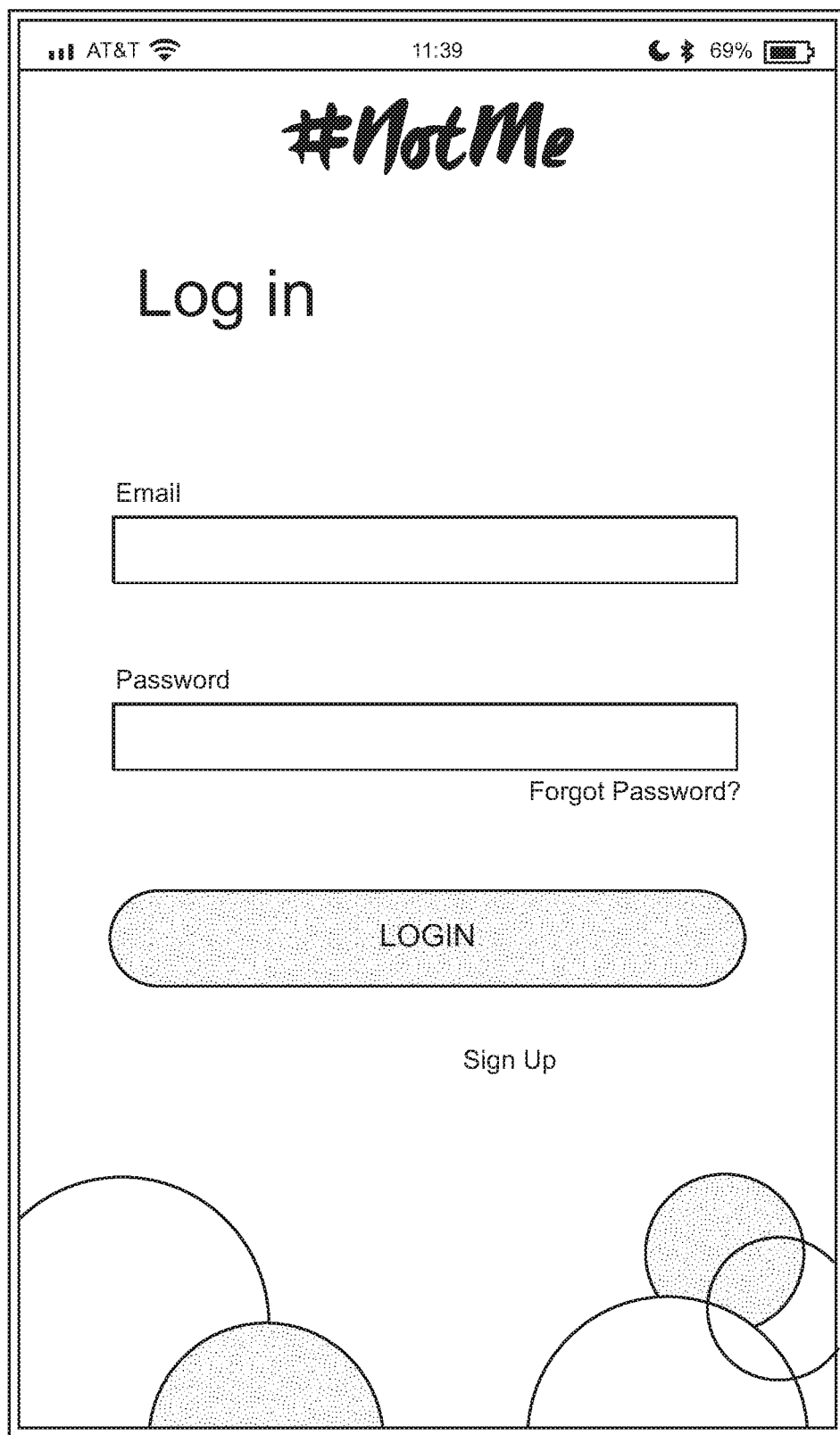

The questions for the various employers or organizations 14 are determined through the use of a Join table 24-3 in a relational database, that is, the central server database 24. As shown in FIG. 1A, one table 24-1 in the central server database 24 contains information of the employer 14, such as, company ID, company name, etc. Another table 24-2 in the central server database 24 contains all of the possible "What" questions, all of the possible "Who" questions, etc., and each question is assigned an ID. The Join table 24-3 is then used to figure out which questions are assigned to each employer or organization 14. That Join table 24-3 is referenced by the API call in order to display the customizable, company-specific inquiries that the employee 12 will see when he/she clicks on the "WHAT" icon 32, for example.

Each employer or organization 14 using the system is assigned the default set of questions (which are described below) to begin. The majority of employers 14 will use the default set of questions. It is not an efficient use of space to store the same default set of questions in full for every single employer 14. The Join table 24-3 allows the default set of questions to be stored only once, and then relate those questions to the appropriate employer or organization 14 with a more space efficient Join table 24-3.

Before discussing the default questions for the "WHAT" icon 32, "WHERE" icon 34, "WHEN" icon 36, and "WHO" icon 38, it should be noted that all of the employee's responses to the Who/What/Where/When questions are stored locally on the user's smartphone 18 until each pillar of questions (i.e., the Who/What/Where/When questions) is completed. Once completed, the central server database 24 is updated with the responses in a manner discussed below in more detail.

Upon clicking upon the "WHAT" icon 32, the employee 12 is provided with the option of identifying the action he or she is reporting (see FIGS. 20A-D, 21, 22). The employee proceeds through the various pages of prompts by click on the Next button 35. Referring to FIG. 20A-D, the employee 12 may first pick from various inappropriate actions, for example, including but not limited to, groping, touching, visual, jokes, lewd remarks, inappropriate comments, sexual intercourse, request for dates, inappropriate advances, expression of sexual interest, inappropriate physical contact in public or private places, shared sexually inappropriate images or videos (pornography) with you or coworkers, send suggestive letters, notes, emails or texts, displayed inappropriate sexual images or posters in the workplace, told inappropriate jokes or shared sexual antidotes, made inappropriate sexual gestures, stare in a sexually suggestive of offensive manner, made sexual comments about appearance, clothing, or body parts, inappropriately touched, including pinch, padded, rubbed or purposefully brushed against you or another person, asked sexual questions such as questions about someone's sexual history or their sexual orientation, or made offensive comments about you or someone's sexual orientation or gender. If none of these actions properly describe what has taken place, the employee 12 is provided with an "OTHER" input box for indicating other actions that have been taken.

Still further, the reporting app 16 will prompt the employee 12 to provide information as to whether any of the behavior being reported has anything to do with characteristics of the employee 12 including, but not limited to, age, ancestry, color, religious creed, marital status, gender, medical condition, mental condition, national origin, military and veteran status, genetic information, race, sex, family and medical leave, sexual orientation, union activity or workers compensation. If none of these properly describe the characteristics applicable to the behavior, the employee 12 is provided with a box labeled "OTHER" in which the information maybe input. See FIG. 21A-B. The reporting app also allows an employee to report whether the same or similar actions had been previously reported. See FIG. 22. Once the employee has answered all of the questions in the "WHAT" questionnaire, the "WHAT" box gets updated with a check mark (FIG. 23) to indicate to the employee that the "WHAT" questionnaire has been duly completed. The employee 12 may then click the "CONTINUE" button 35a and continue inputting information.

As mentioned above, and with reference to FIGS. 24, 25, and 26, the employee 12 may also provide information as to "WHERE" the action happened or occurred. In conjunction with this, the employee 12 is prompted to describe the location "WHERE" the incident or instances happened. The employee 12 is then asked to indicate where the behavior occurred if in the office or out of the office (See FIG. 24). If the behavior occurred in the office, the employee is asked to select where it happened in the office, for example Bathroom, Break room, Reception, over social media, online, etc. (see FIG. 25). If the behavior occurred out of the office the employee is asked to indicate where it happened, for example, in a Uber/Lyft, online, at a party, etc. (see FIG. 26). When the final CONTINUE button 35a is clicked as shown on FIG. 26, the employee 12 is returned to the graphical user interface showing four icons that are provided for inputting relevant information. Once the employee has answered all of the questions in the "WHERE" questionnaire, the "WHERE" box gets updated with a check mark (FIG. 27) to indicate to the employee that the "WHERE" questionnaire has been duly completed. The employee 12 may then click the "CONTINUE" button 35a and continue inputting information.

Figure 28:
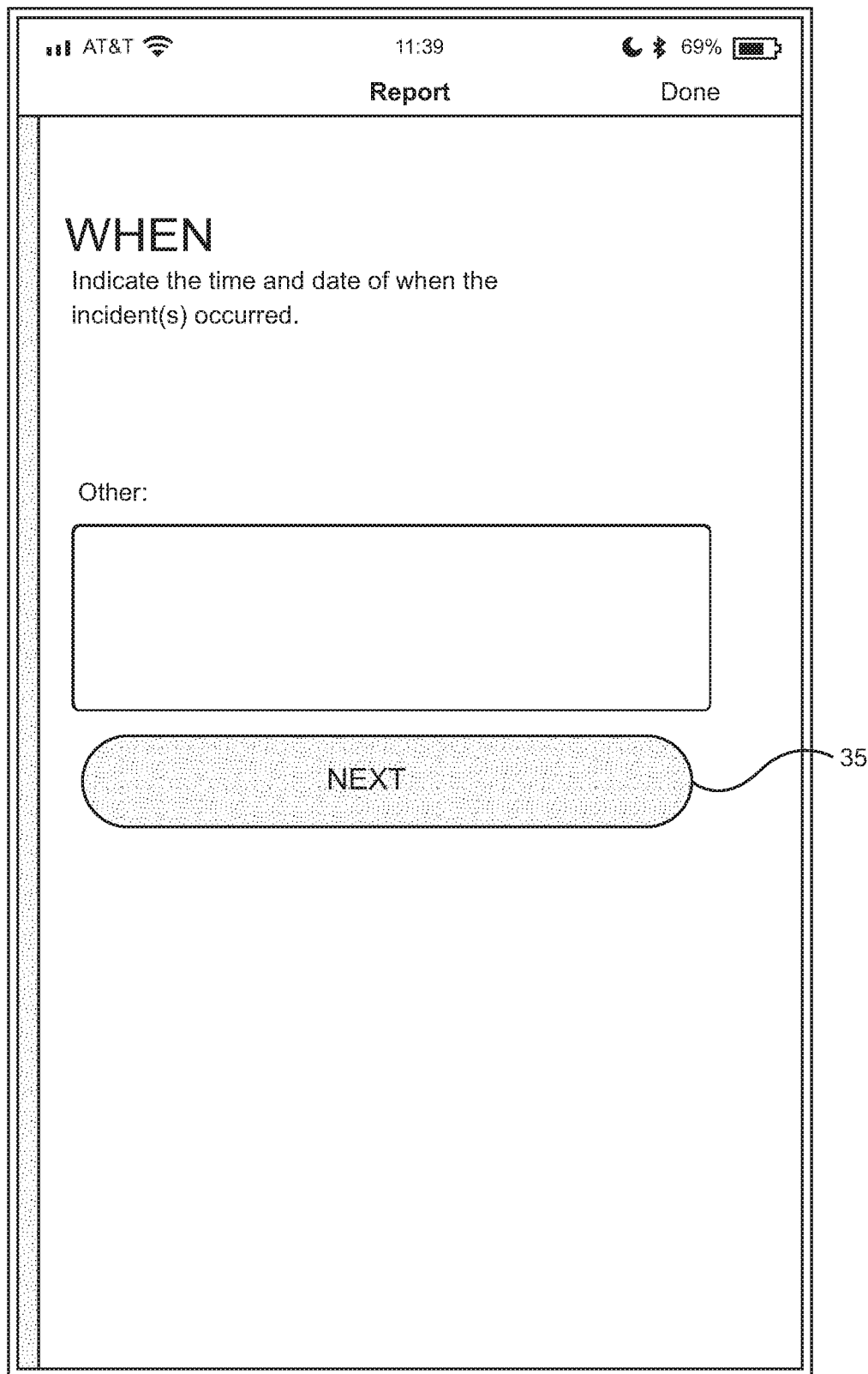
Figure 29:
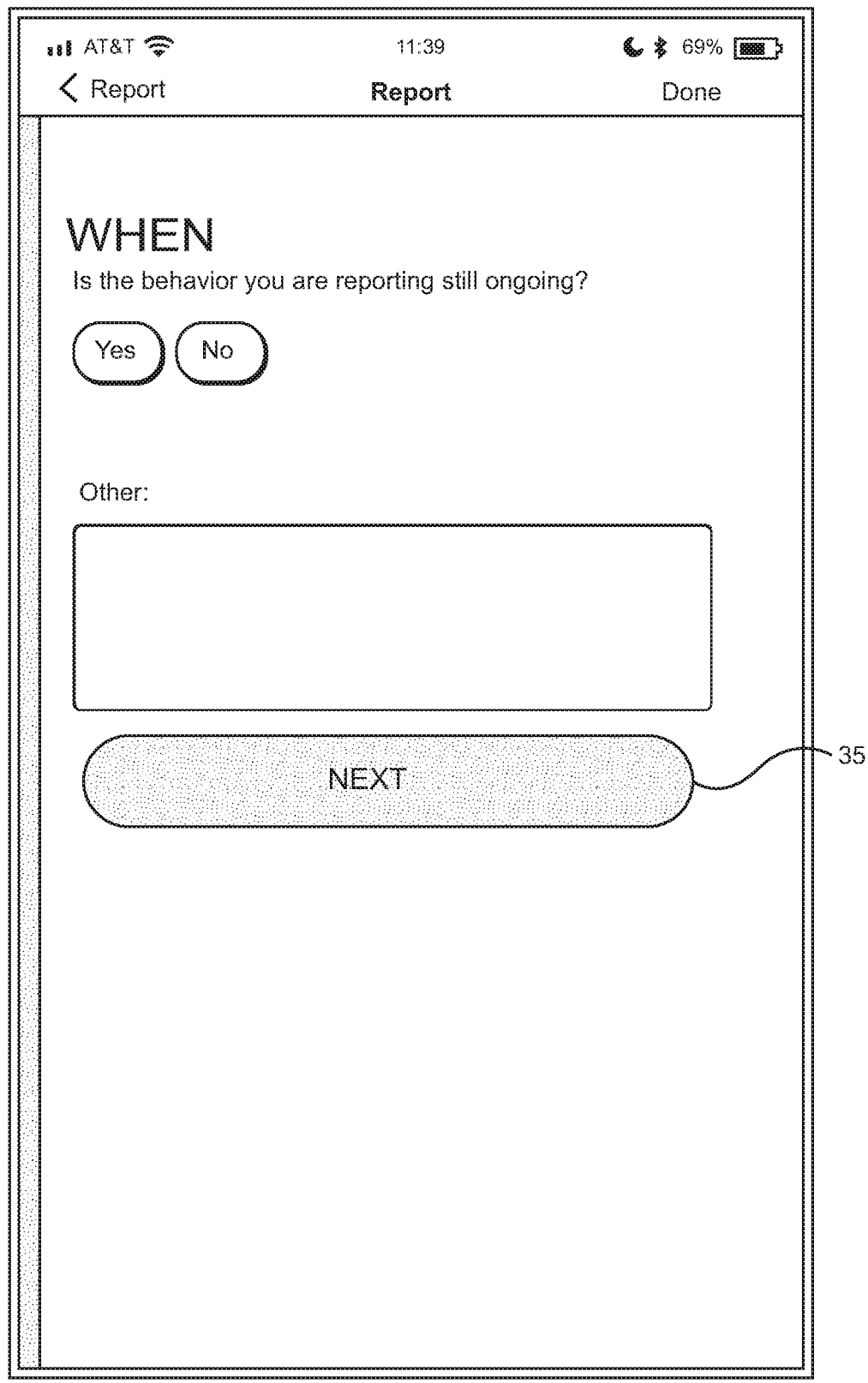
Figure 30:
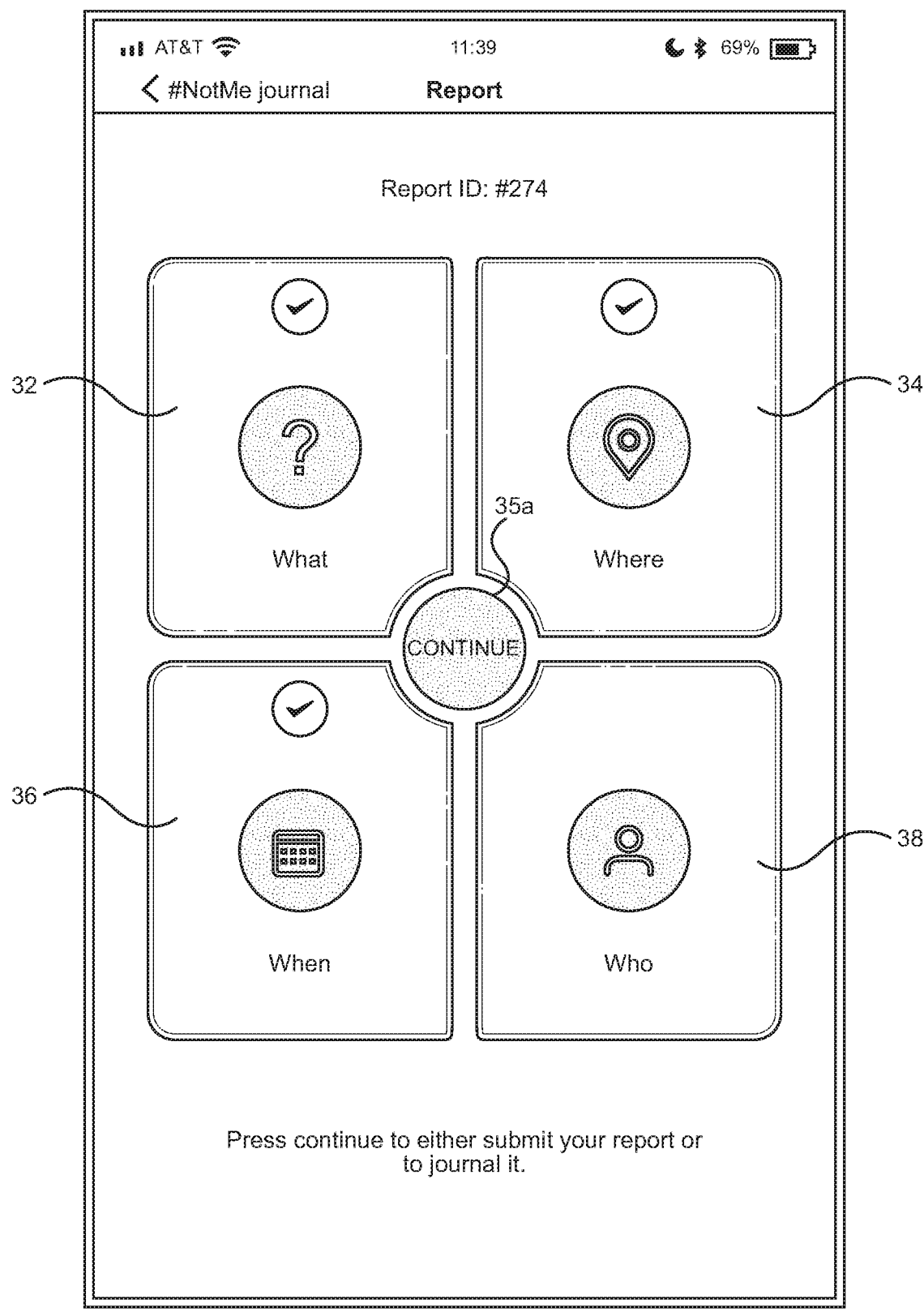
Figure 31:
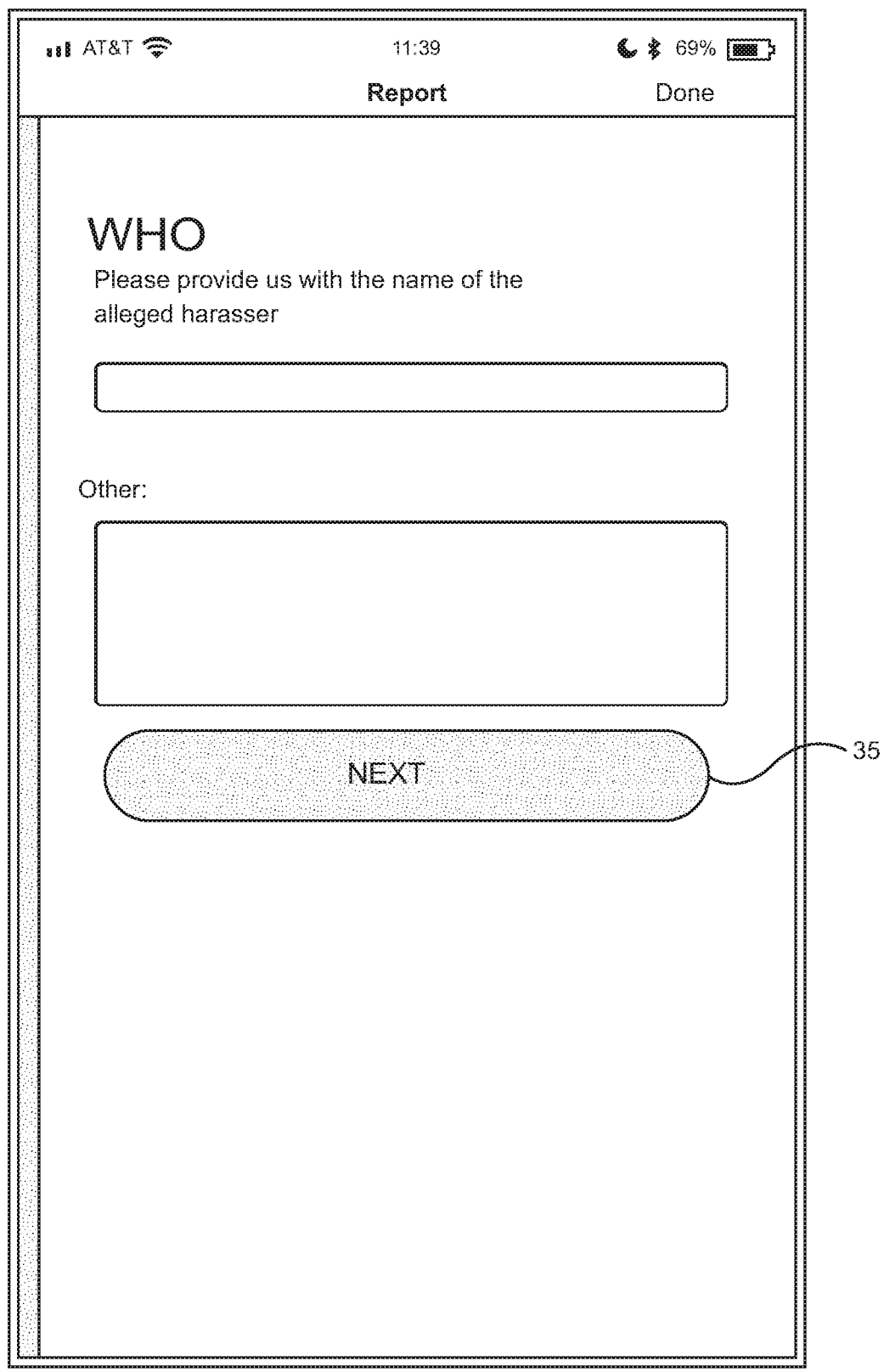
Figure 32:
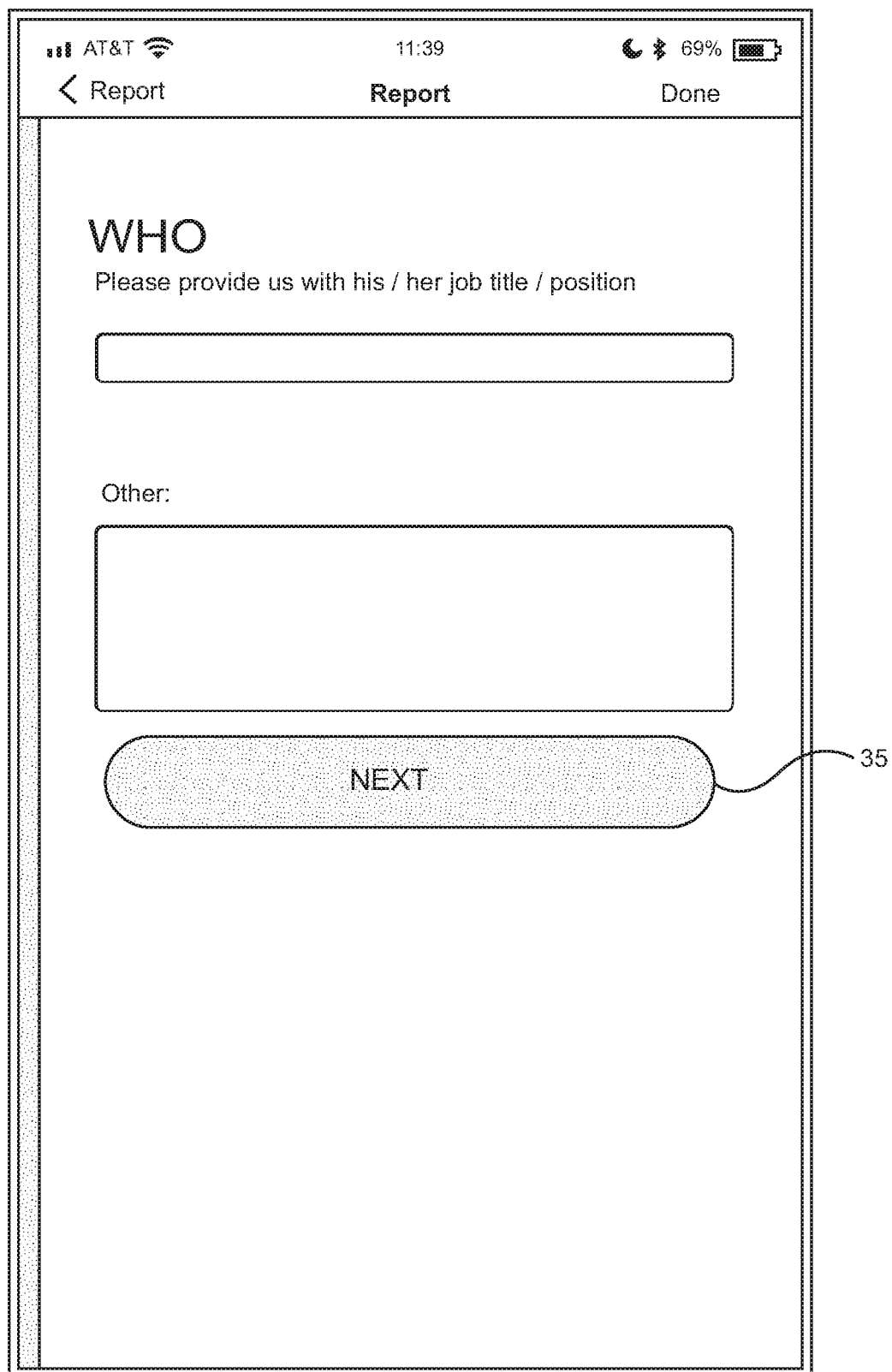
Figure 33:
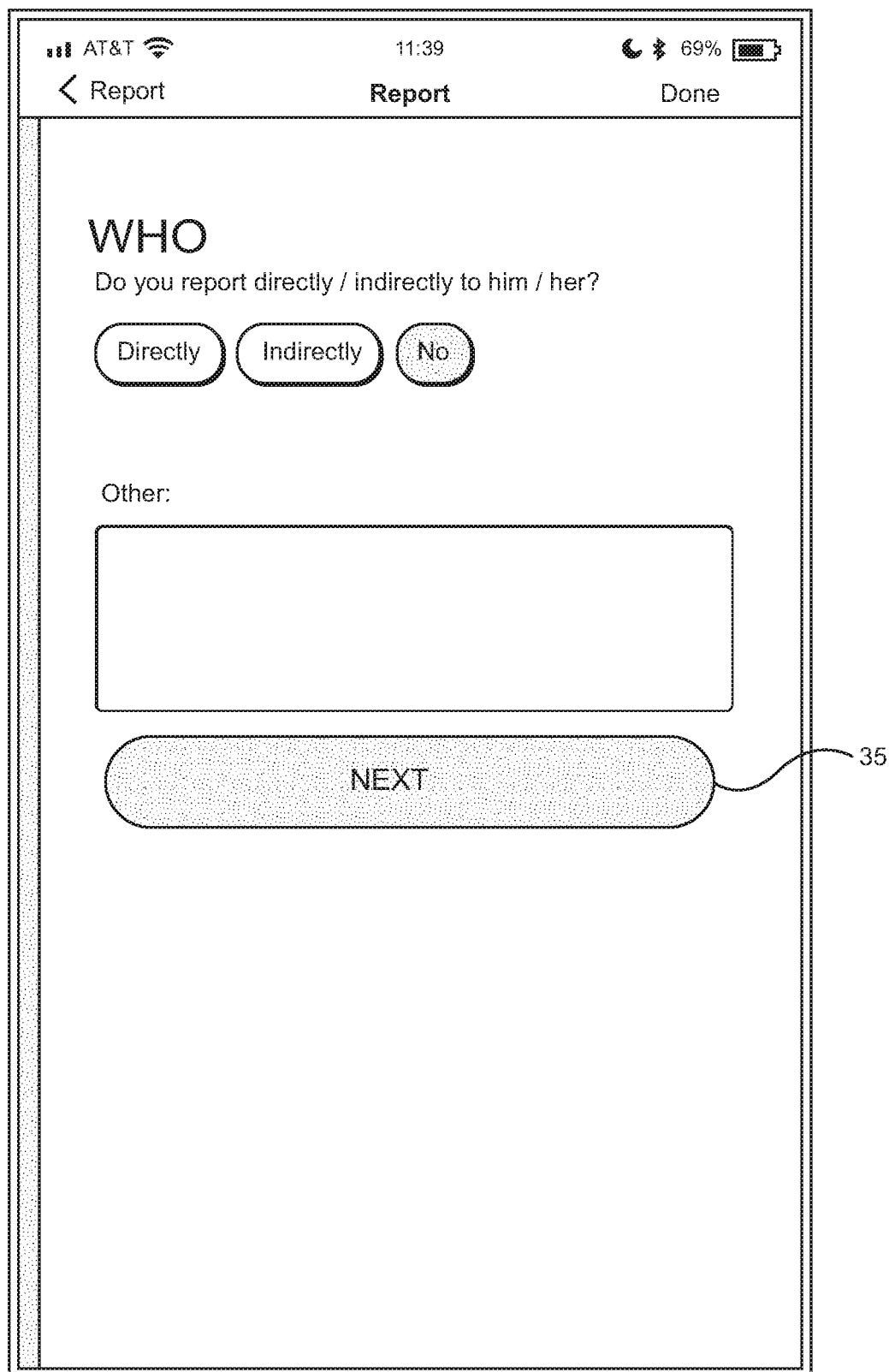
Figure 34:
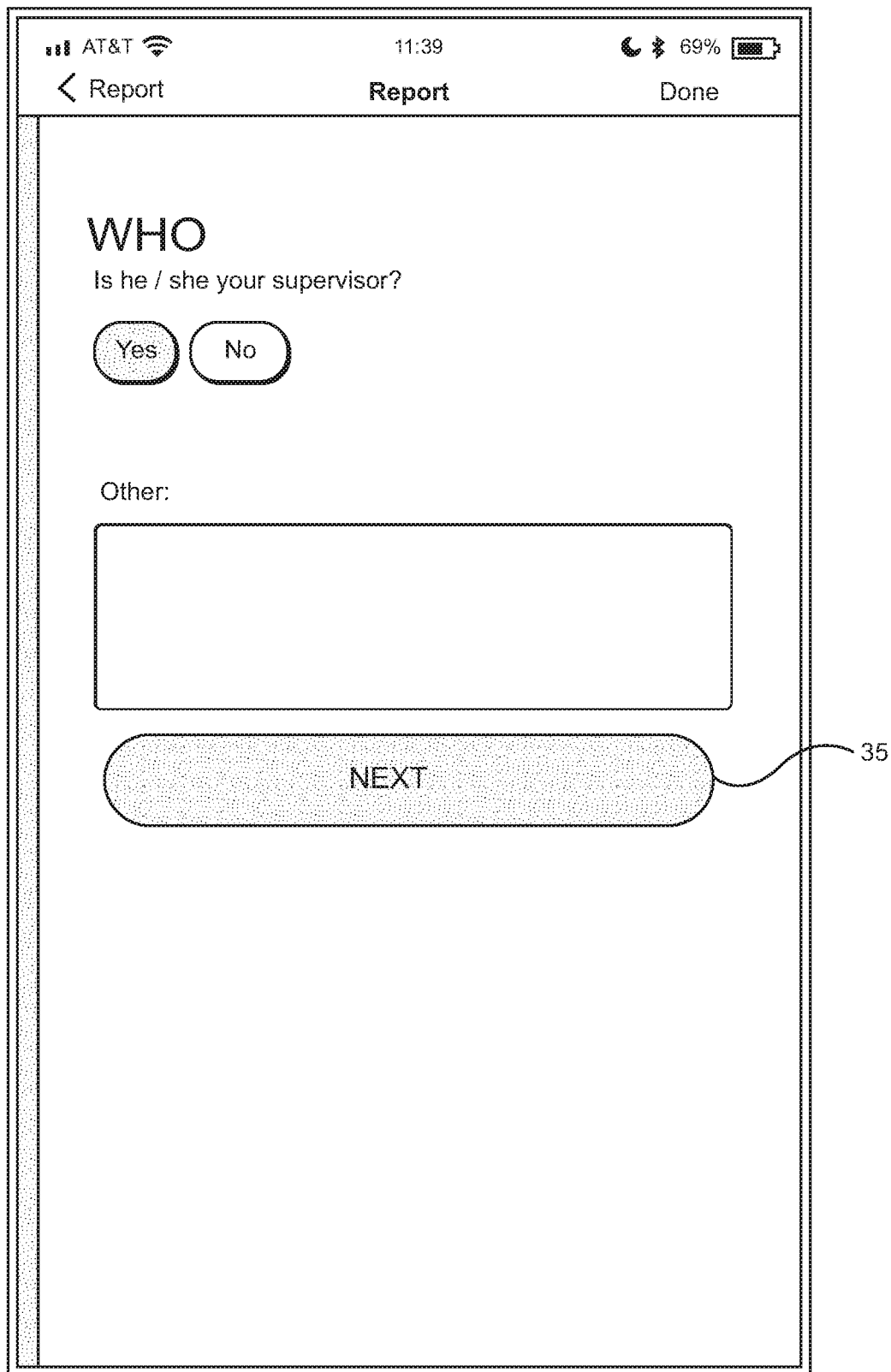
Figure 35:
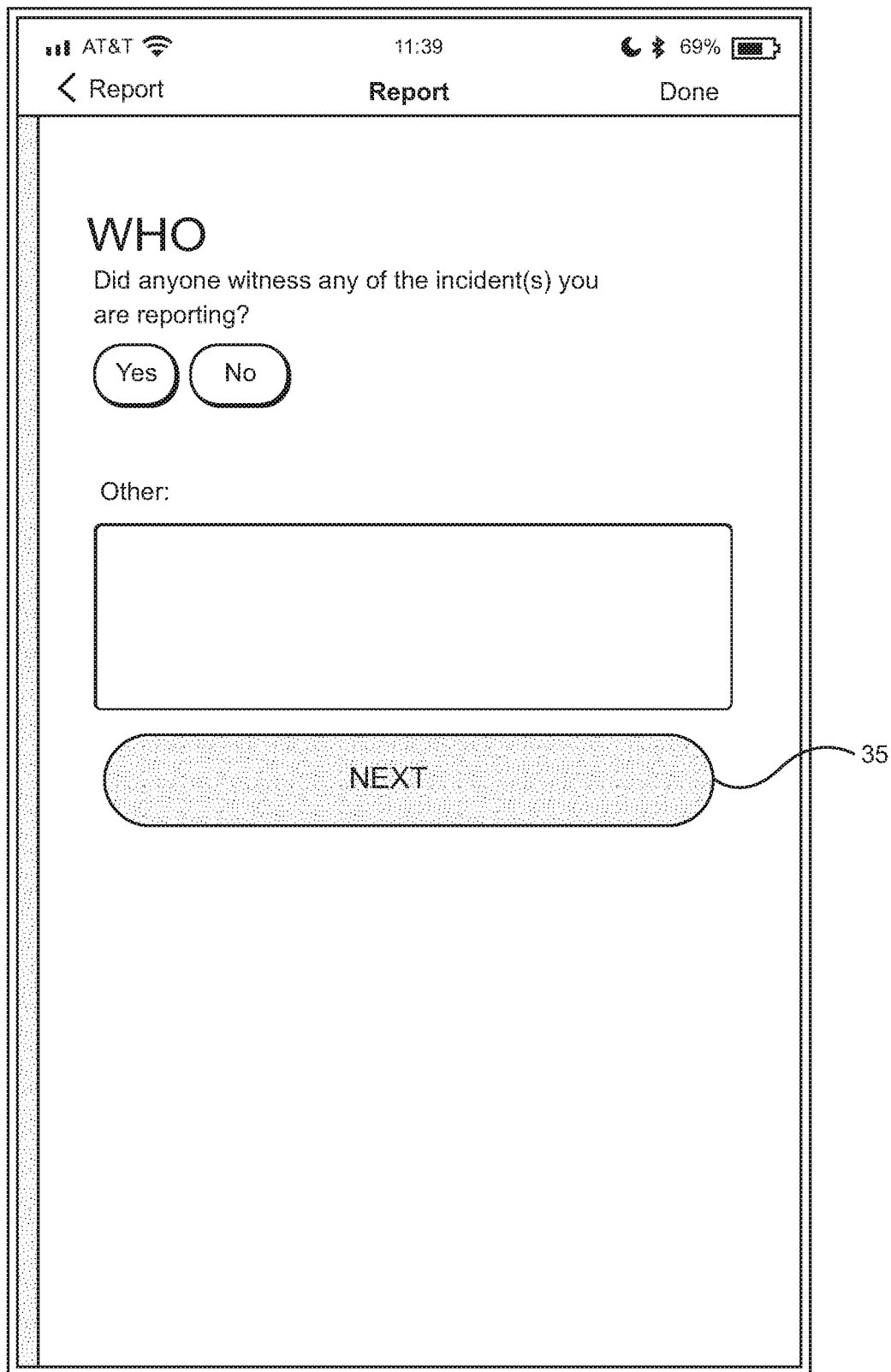
Figure 36:
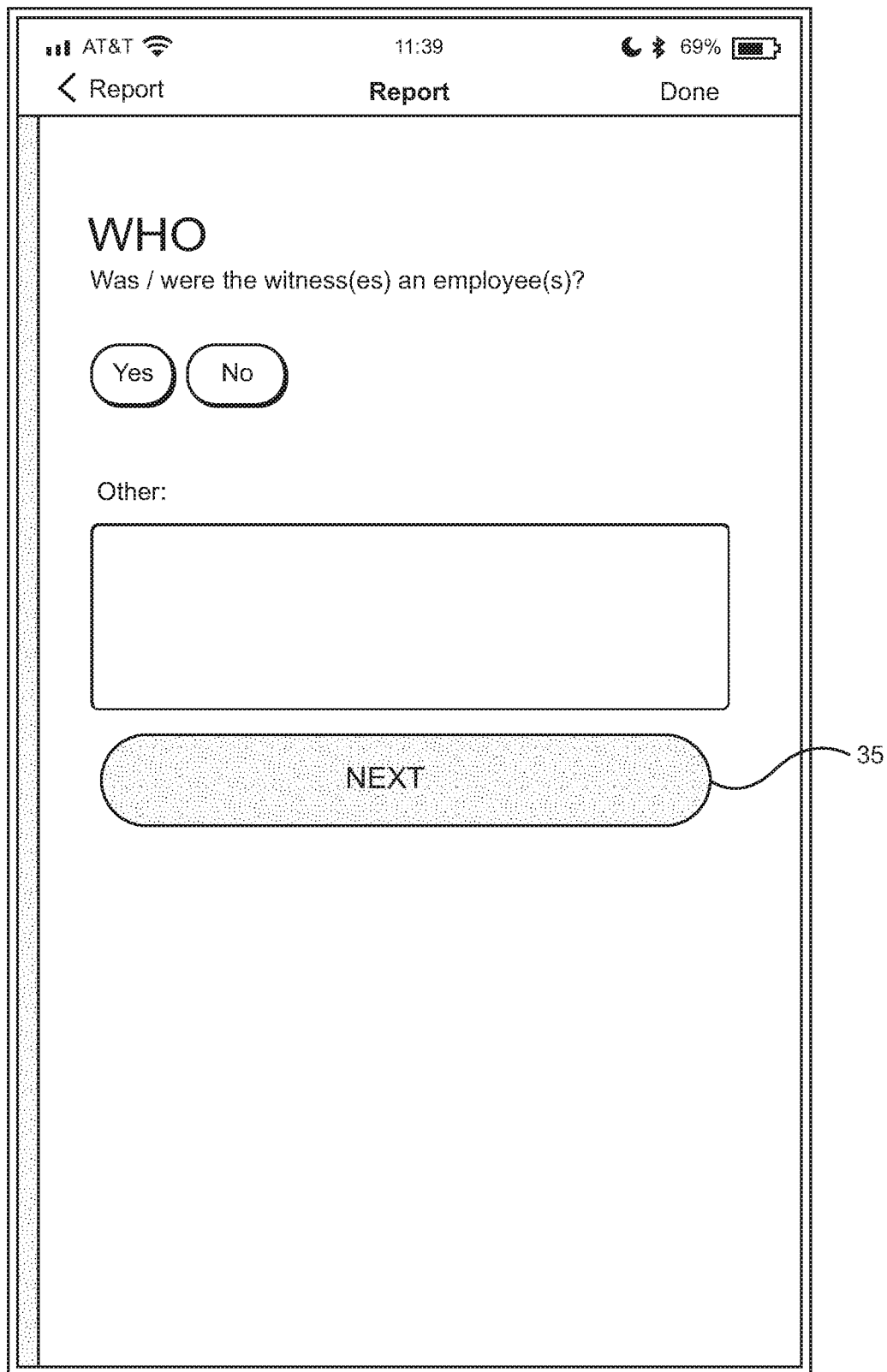
Figure 37:
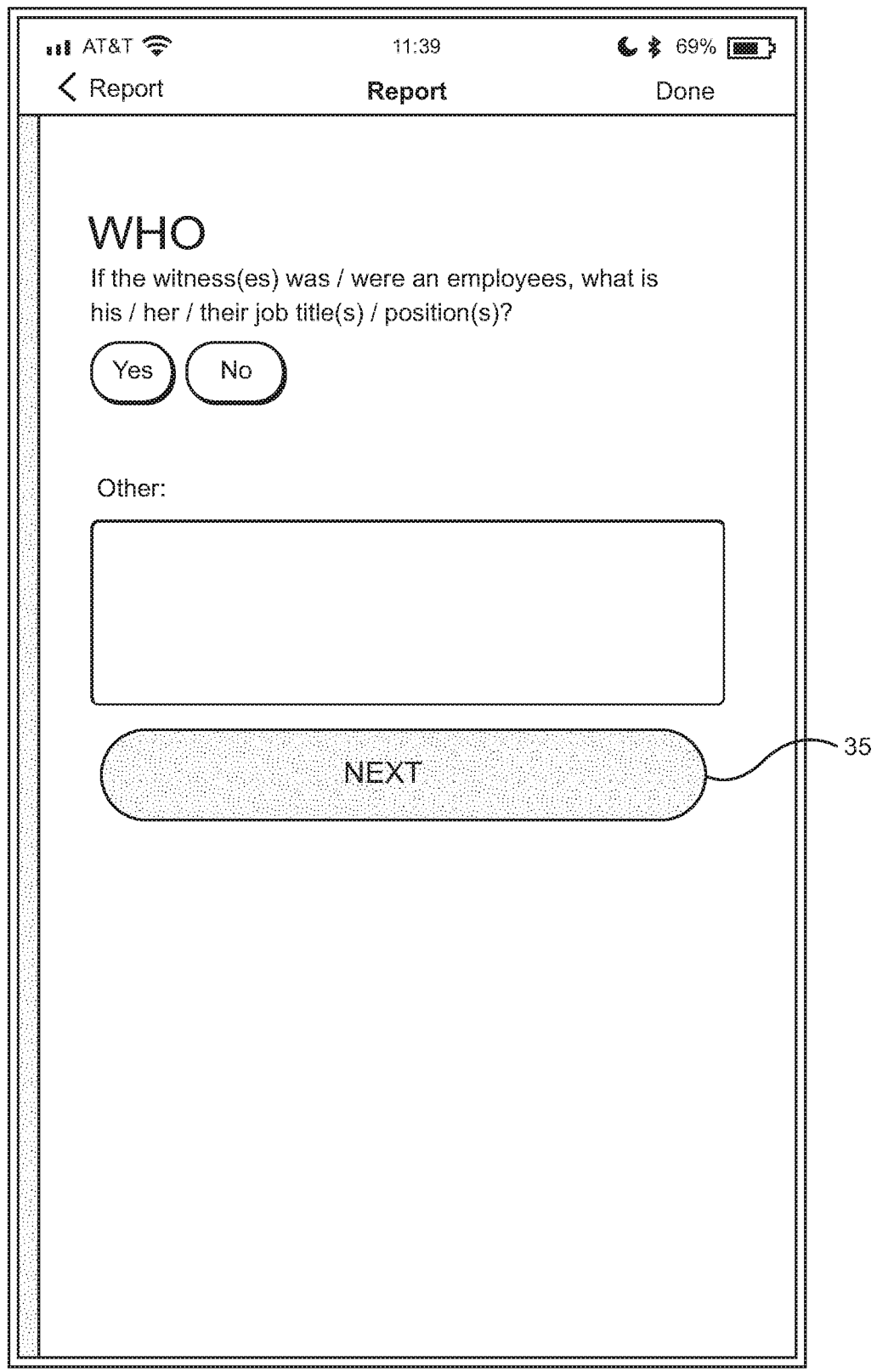
Figure 38:
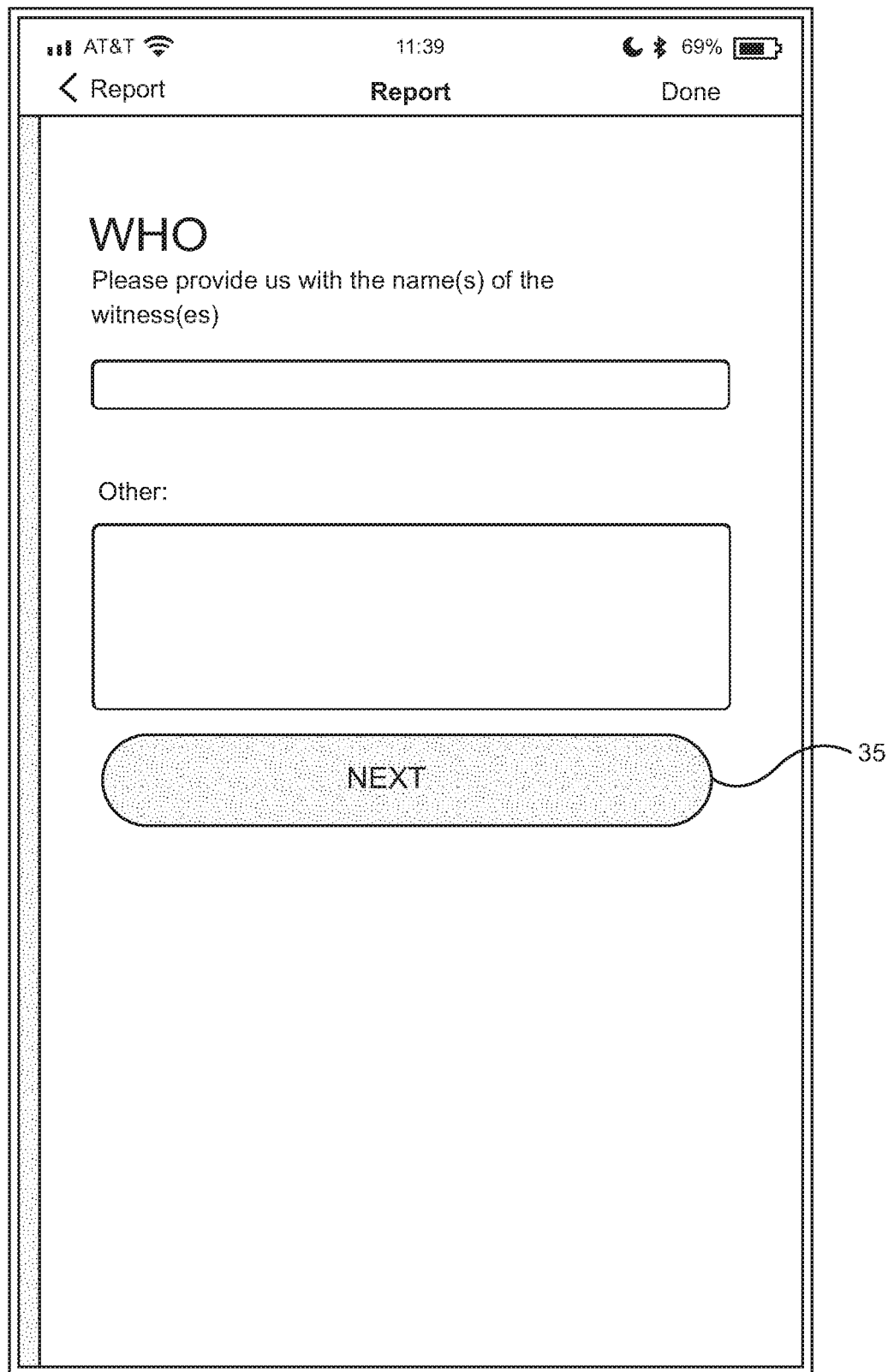
Figure 39:
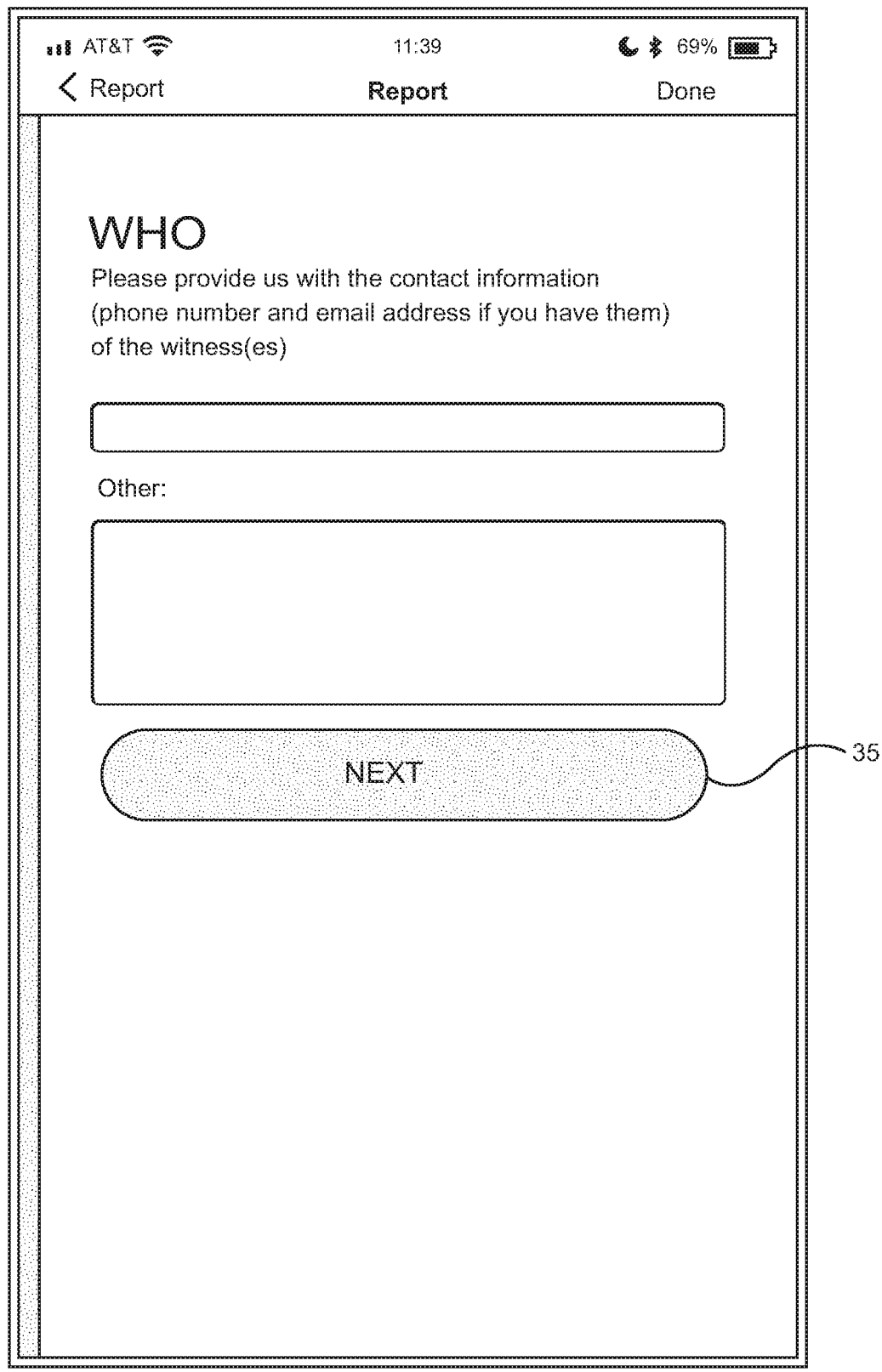
Figure 40:
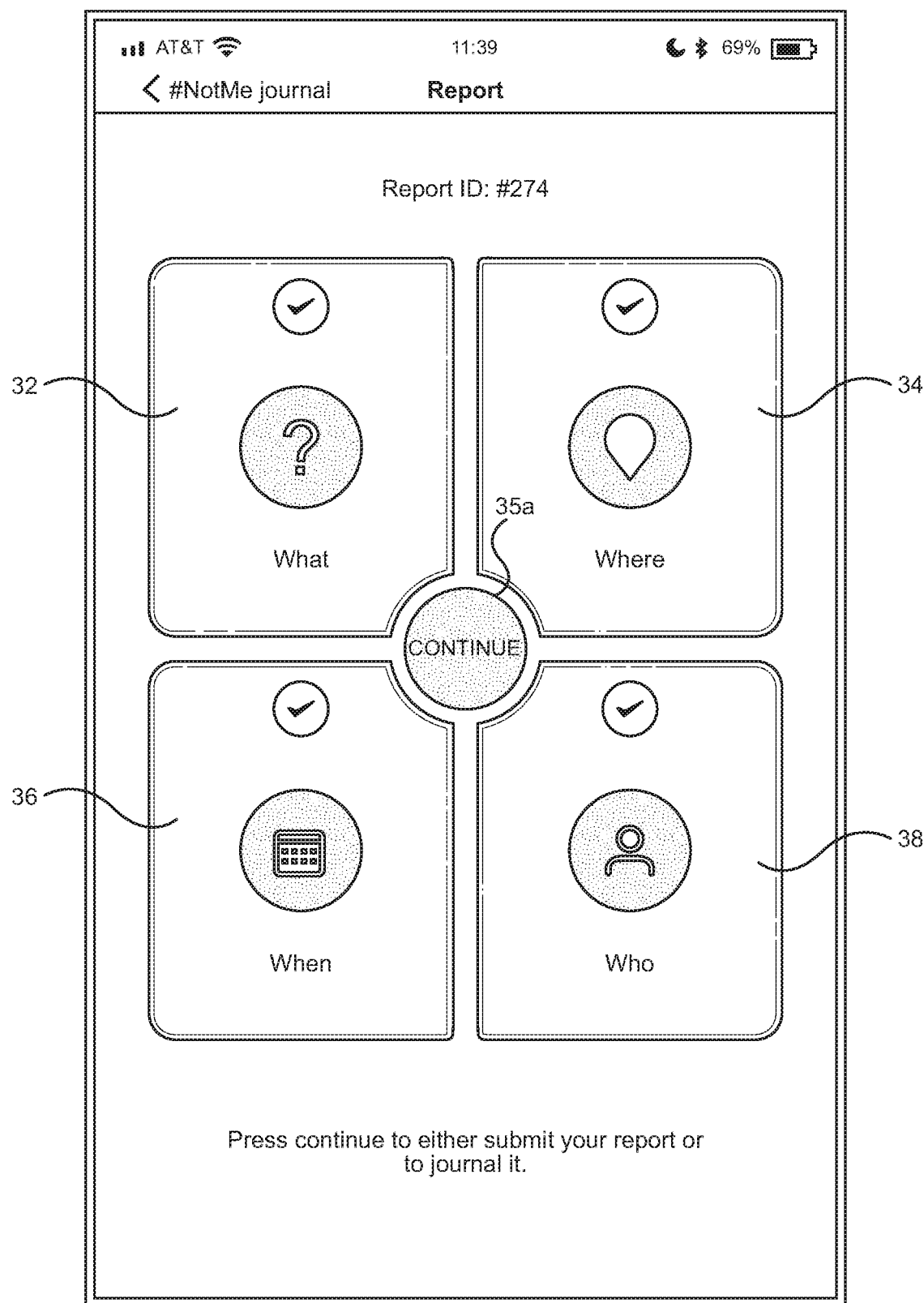
Figure 41:
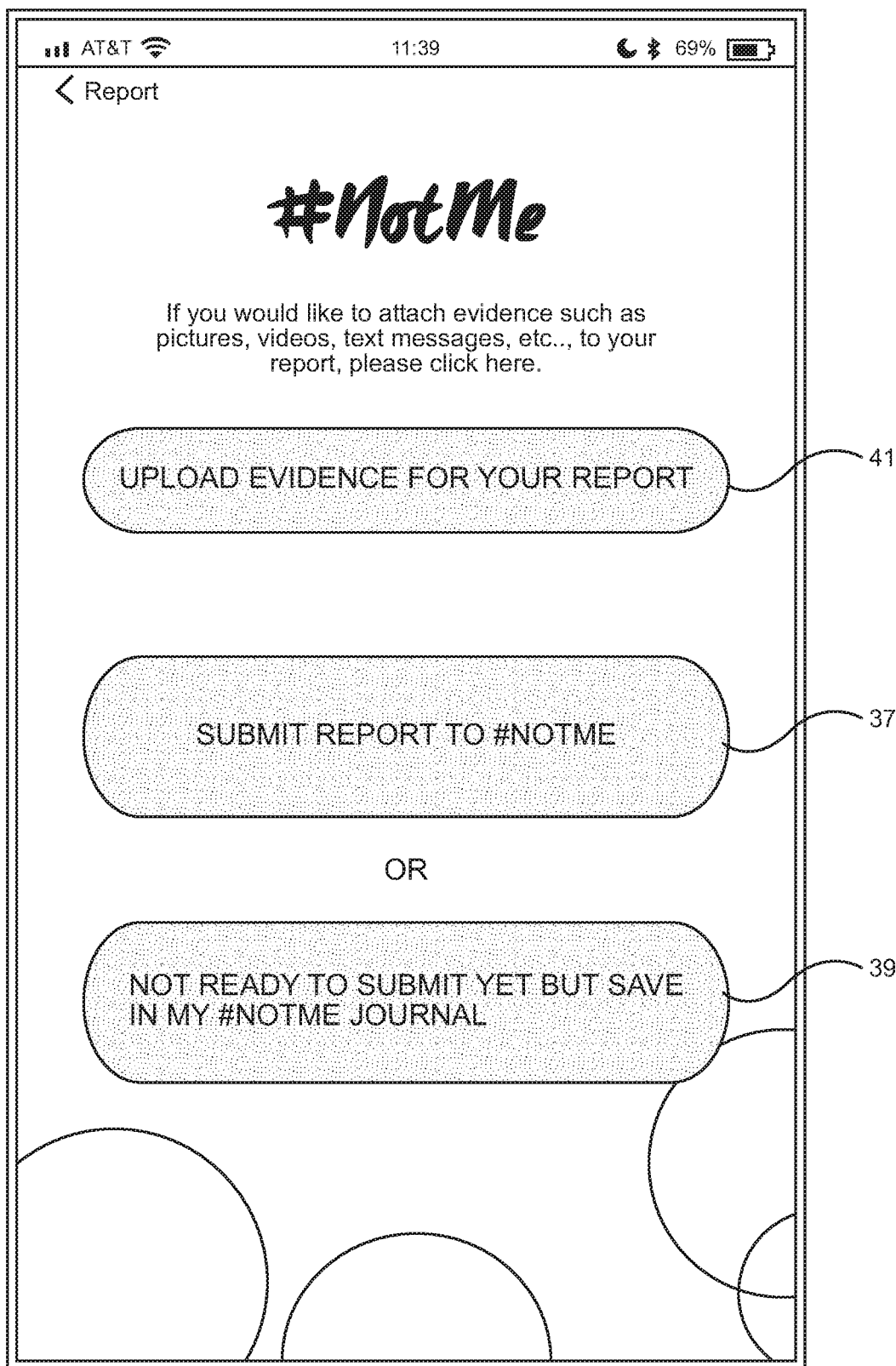
Figure 42:
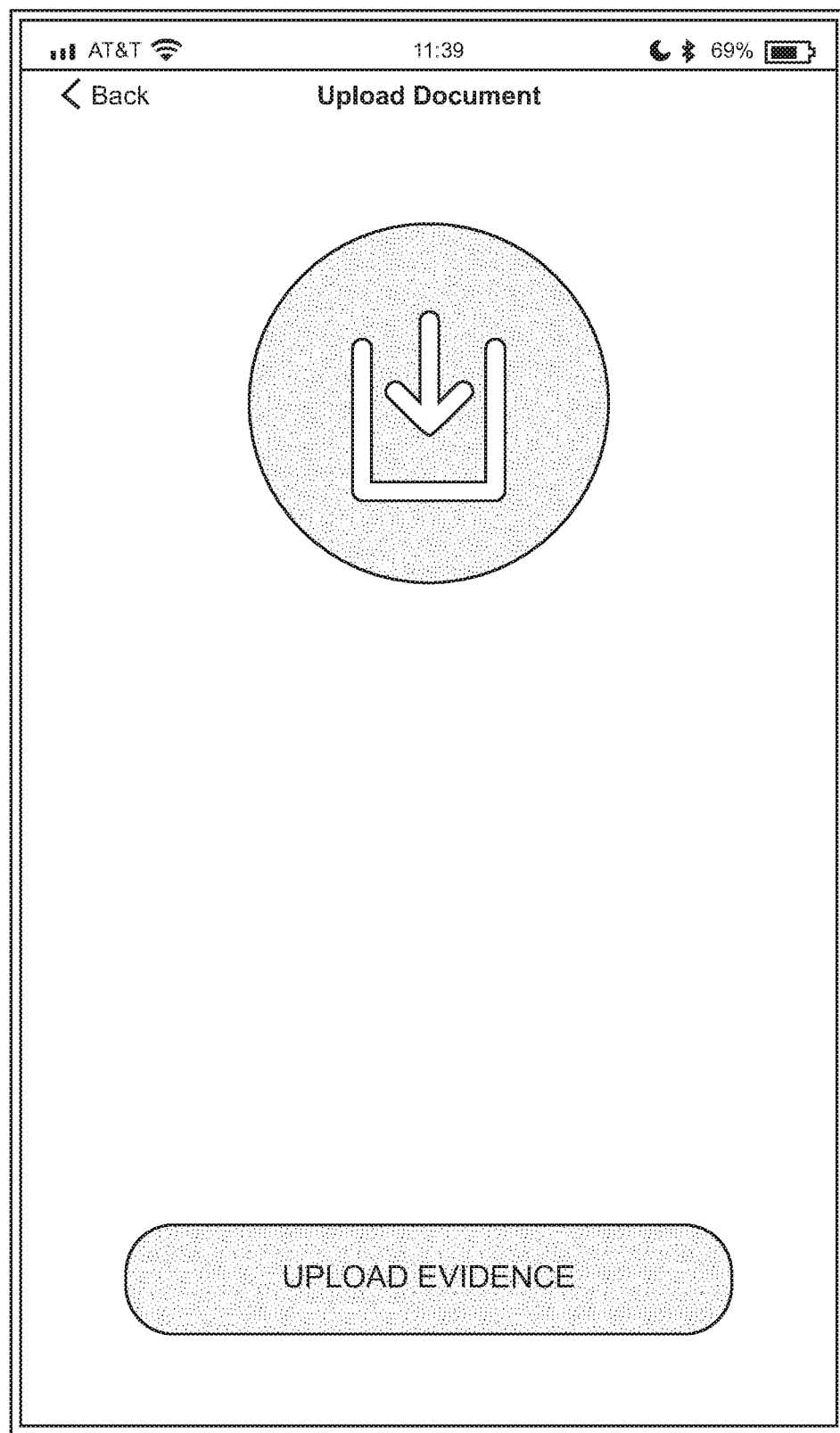
Figure 43:
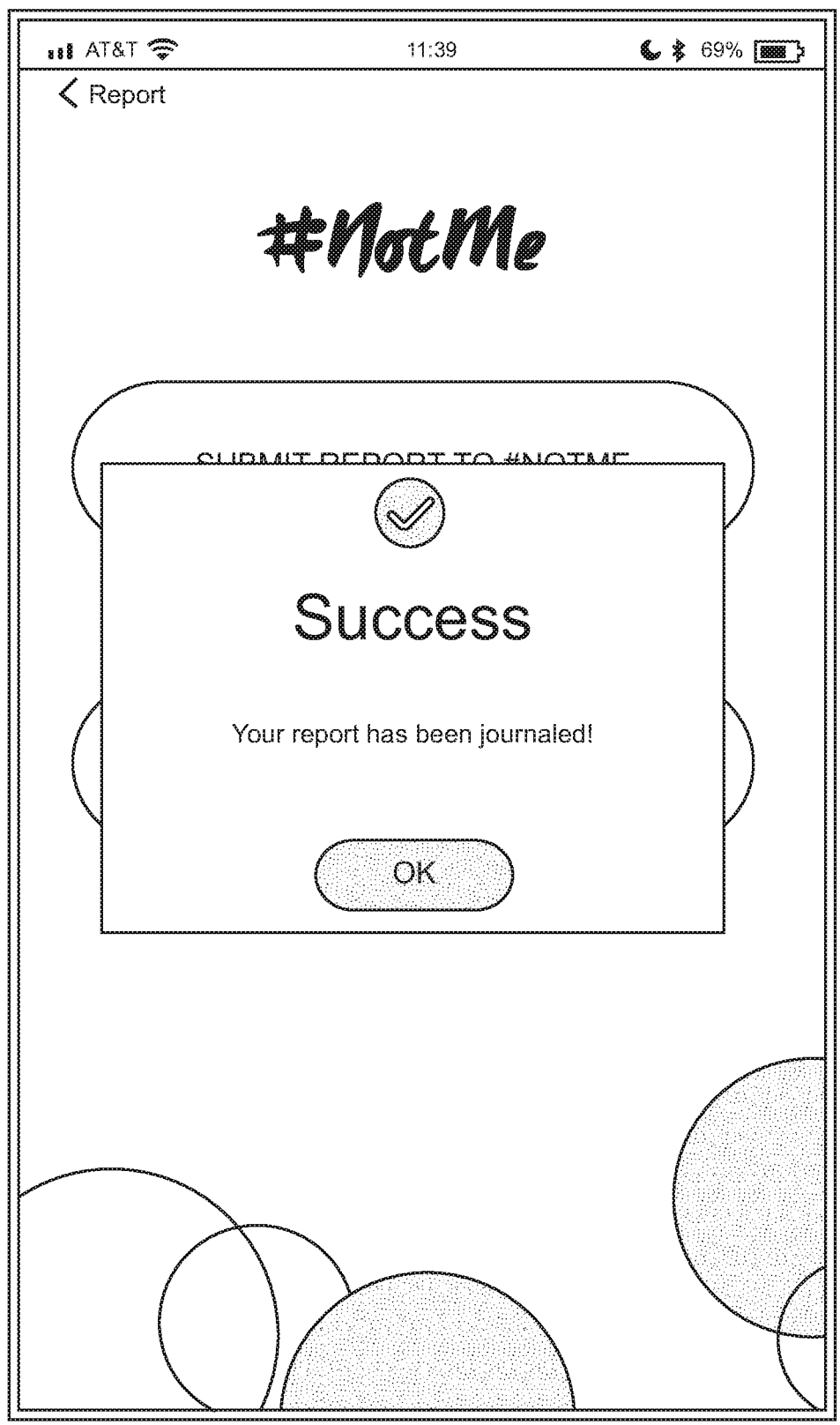
Figure 45:
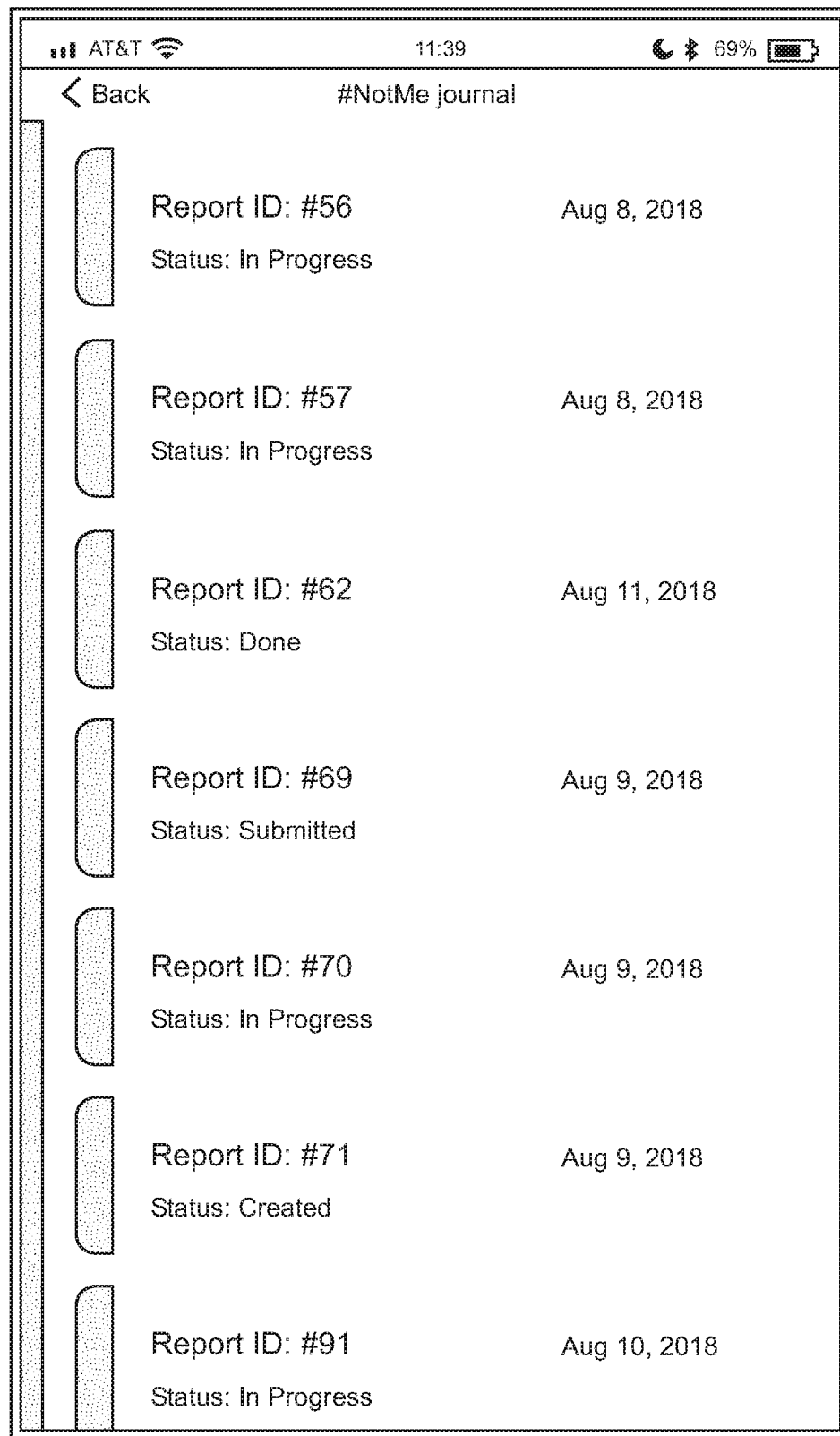

Further still, and with reference to FIGS. 28 and 29, the employee 12 is prompted to explain "WHEN" the incident or instances occurred (see FIG. 28). The employee is then asked if the behavior is still ongoing (see FIG. 29). When the Next button 35 on the screen of FIG. 29 is clicked on this page, the employee 12 is returned to the graphical user interface showing four icons that are provided for inputting relevant information. Once the employee has answered all of the questions in the "WHEN" questionnaire, the "WHEN" box gets updated with a check mark (FIG. 30) to indicate to the employee that the "WHEN" questionnaire has been duly completed. The employee 12 may then click the "CONTINUE" button 35a and continue inputting information.

Finally, the employee 12 is prompted to provide information regarding "WHO" is the perpetrator of the actions and if there are any witnesses. In providing information identifying the perpetrator, the employee 12 is asked to name the alleged harasser, provide the alleged harassers job title/position, explain whether the employee reports directly/indirectly to the perpetrator, and identify whether the perpetrator is the employee's supervisor. If more than one perpetrator was involved or if there were witnesses to the incidents that are being reported, the employee 12 is given the opportunity to identify additional perpetrators and/or the witnesses. In addition, and as an evidence gathering mechanism, the employee 12 is provided with the opportunity to identify whether any witnesses are available. In particular, the reporting app 16 asks whether anyone witnessed any of the instances or incidents being reported. The employee 12 may provide the first and last name of the witness(es), the cell phone number of the witness(es), and the email address of the witness(es). See FIG. 31-39. When the Next button 35 is clicked on this page, the employee 12 is returned to the graphical user interface showing four icons that are provided for inputting relevant information. Where all the questions have been answered, the graphical user interface is updated with check marks on the various squares (see FIG. 40). At this point the employee click the "CONTINUE" button 35a.

As mentioned above, while a preferred sequence is disclosed above for the gathering of information in accordance with the victim notification system 10, it is appreciated that the victim notification system 10 allows for the ordering of the data and steps in any which way the employee 12 reporting wishes. That is, the entry of the information and the steps taken in conjunction therewith can be switched as desired by the employee 12. If there are multiple offenders, for example, the employee 12 can have the ability to specify that there are multiple offenders at the beginning of the report so that the employee 12 can clarify that different offenders did different things (i.e., the WHAT might be different for different offenders, even if part of the same incident). Similarly, in the event one reports is intended to cover multiple instances (i.e., the WHEN is more than once), then the employee 12 would need the ability to specify the WHAT/WHERE for each such instance without having to re-specify the WHO each time and filing a distinct report for each instance.

Finally, and once the report is completed, the employee 12 is directed to upload any evidence he or she may have such as pictures, text messages, etc. and send the information to the central server database 24 which may subsequently be accessed by the employer 14, system administrator 22 of the victim notification system 10, or other stakeholders. See FIG. 40 and "REPORT NOW" button 35b. However, and as will be discussed below in more detail, the employee 12 is provided with the option of either reporting all of the information to the system administrator 22 for processing and use in accordance with the full scope of the victim reporting and notification system 10 (see SUBMIT REPORT TO #NOTME™ button 37) or the employee 12 may simply transmit the information for recordation and storage by the victim reporting and notification system 10, with no further action taken and access to the information only available to the employee 12 (see NOT READY TO SUBMIT YET . . . button 39). See FIGS. 41 and 43. The transmitted data is ultimately timestamped and provided with a report ID. The information is maintained by the system and may be reviewed by the employee before reporting. See FIG. 44A-F. By inputting information in this highly structured manner, the resulting data is readily implemented for the purposes of the present invention. The information reported is maintained in a history page of the reporting app 16 that provides a summary of the report including date, instances, incidents, the person reported, status, etc. (see FIG. 45). The reporting app includes functionality allowing for the ability to send evidence of the inappropriate behavior (for example, text messages, videos, photos, etc.) to the central server via the reporting app.

In practice, and as discussed above, the reporting app 16 collects, and temporarily stores, the list of steps and questions from the central server 21 (that is, "Who," "What," "Where," "When"). As such, the central server 21 provides all the questions to the reporting app 16. This means that changing a step or a question will only consist of changing it in the central server database 24, without the need of updating the reporting app 16. In addition to collecting the list of steps and questions, the reporting app 16 also collect, and temporarily stores, the type of answers required. For example, if the questions can only be answered with pre-defined answers, the reporting app 16 receives these from the central server 21. If it is an open question, the employee will have to input an answer using the keyboard or other input mechanism. The "finished" reports will be shown in the employer dashboard report 40 as discussed below in more detail.

In accordance with a preferred embodiment, and considering the many steps involved in the preparation of a report in accordance with the present invention, the reporting app 16 transmits the input information to the central server 21. At the end of every step, the input information is temporarily stored on the central server 21. This allows the employee 12 to save the progress made in answering questions and ultimately create the report later. During this step-wise process, the report is maintained in the central server database 24 as "in progress" and is only labeled "finished" upon final submission. This input information, however, is not available to system administrator 22 or other parties associated with the operation of the victim notification system 10, until the employee 12 "presses" the final button (that is, the SUBMIT REPORT TO #NOTME™ button 37) for submission, thereby labelling the report as "finished." By pressing the SUBMIT REPORT TO #NOTME™ button 37, the employee 12 validates the report and the report is stored within the central server database 24 for scoring and further processing as discussed herein. Where the employee merely presses NOT READY TO SUBMIT YET . . . button 39 the information is merely stored on the central server database 24. In accordance with a preferred embodiment, the data exchanged between the reporting app 16 and central server 21 (via the public API) uses the JSON (JavaScript Object Notation) format. It is sent through an HTTPS connection, which prevents security breaches.

As mentioned above, the employee 12 has the choice between journaling the report only (that is, clicking the NOT READY TO SUBMIT YET . . . button 39 and maintaining on the central server database 24 of the victim reporting and notification system 10 for use only by the employee 12) or fully submitting it to the victim notification system 10 (by clicking the SUBMIT REPORT TO #NOTME™ button 37) for full use by the system administrator 22, the employer 14, and others who might be participating in conjunction with the victim notification system 10. The victim reporting and notification system 10 enables employees 12 to keep a journal and document behaviors and instances of harassment and/or discrimination without reporting them. Where the employee 12 only wishes to "journal" the report, the reporting app 16 will send the information to the central server 21 at the end of every step as discussed above. This information will not be disclosed to the system administrator 22 until the employee affirmatively directs the system 10 accordingly and it's marked as "submitted," although the step-wise save information will be saved to the central server database 24 for access by only the employee (see, for example, the screen shot of saved reports shown in FIG. 45).

In addition to either "journaling" the input information or submitting the report to the victim notification system 10, the employee 12 may attached and upload evidence in conjunction with the report. This is achieved by clicking on the UPLOAD EVIDENCE FOR YOUR REPORT button 41 (see FIG. 41) that leads the user to an interface screen (see FIG. 42) for completing the uploading process. leads It is appreciated the steps and questions discussed above, will be maintained on the central server database 24 of the central server 21. As a result, and as briefly discussed above, if it is desired to change a step or a question, the system administrator(s) 22 of the victim notification system 10 just has to make such changes in the central server database 24, and then the specific step or question will be altered accordingly. The system will, however, still be able to compute the scores even with "deleted" steps or questions.

The information gathered as a result of the employee reporting app 16 and maintained in the central server database 24 is thereafter processed and analyzed in a manner optimizing the goals of the present invention, that is, providing victims with a mechanism whereby one can safely, easily and anonymously (under certain circumstances) report conduct that is believed to constitute harassment and/or discrimination, as well as providing individuals and organizations tangentially affected by harassment and/or discrimination to effectively monitor and address such conduct.

The gathered information is employed by the data analysis system 25 for data analysis to provide timely information for both employees 12 and employers and organizations 14 that subscribe to the services offered by the operators of the victim reporting and notification system 10. The data analysis system 25 is remote from the central server 21 for both security purposes and so as to avoid bottlenecks in storing information in and querying information from the central server database 24. In practice, and as it will be explained below in greater detail, a data analysis system 25 issues an API call via a private API 29 to the central server 21 to retrieve the next-in-line unscored report. The data analysis system 25 parses the report for the name of the alleged harasser and the user (i.e., victim or witness) and the data analysis system 25 issues an API call via the private API 29 to the central server 21 to query the central server database 24 for past reports about the alleged harasser and by the reporting employee 12 from within a certain time period (e.g., within the last three years, or as may be customized to meet specific needs). The data analysis system 25 performs its analysis and issues an API call to the central server to store its verdict in the central server database 24.

As previously mentioned, the data analysis system 25 includes the scoring system 27 doing the analysis mentioned above. The scoring system 27 provides employers 14 and third-party enforcement agencies, for example, law enforcement, with a mechanism for assessing the harassing and discriminatory behavior by "severity and pervasiveness." The scoring system 27 objectively assesses both the severity and the pervasiveness of the harassing and discriminatory behavior in order to determine the appropriate action to be taken. In arriving at an objective assessment, the scoring system 27 relies on structured data of pre-determined options (see the various prompts and defined answers provided by the reporting app 16 as explained above), making it easier to compare "apples" to "apples," rather than allowing open-ended reports that may not collect all the data required and making it harder to compare one report to another.

The scoring system 27 takes all of the information generated as a result of the collected reports and assigns a "severity score." As explained above, the data analysis system 25, and, therefore, the scoring system 27, is decentralized from the central server 21, as it is a data processing system on to itself. This means that the data analysis system 25 collects all the information generated based upon the reports from a private API 29 opening parts of the central server 21 (including data and functionality) for use by the scoring system. In accordance with the present invention, the private API 29 is secured with private authentication tokens. As the victim notification system 10 grows, it is anticipated the system will ultimately be composed of a plurality of networked central servers 21 and a plurality of networked scoring systems 27 so as to help in maintaining a high uptime rate; meaning that if one of the servers crash, it will not have a major impact on other servers as these will keep running and collecting data.

The data analysis system 25 collects metrics from the private API 29 for use for the scoring system 27. When a report is "submitted" in accordance with the present invention, it is stored in the central server database 24. The data analysis system 25 accesses this information via the private API 29, and the scoring system 27 of the data analysis system 25 calculates and computes the severity and pervasiveness of the conduct, and assigns an objective score regarding both the severity and the pervasiveness of the behaviors or instances that are being reported. The objective scores, as well as intermediate data generated during the scoring processing, are saved in a database table 27*db* of the scoring system 27. The central server 21 will, then, be able to access to this data, that is, objective scores, as well as intermediate data generated during the scoring processing, when needed.

The scoring system 27, in generating objective scores, as well as intermediate data generated during the scoring processing, analyzes the reports to extract "key points" (for example, behavior, frequency, person involved, relationship between the victim and alleged harasser (reporting/subordination link for example)). Severity factors are applied to these points to calculate a score for each report.

For example, when computing reports of a same person about "Inappropriate jokes":
  the first report will result in a low score because the scoring system will not find any other identical behaviors,
  but the second report will have a higher score than the first one.
Same thing if a person is reported multiple times by different victims for example.

In accordance with a preferred embodiment, actions will be categorized as Category 3 relating to behaviors or instances occurring either on multiple occasions over time OR are on their own serious enough; Category 2 relating to behaviors or instances occurring multiple times (behaviors happen between 1 and 3 times) to the same victim OR more than one victim or witness have complained about the same individual for the same behaviors OR because it involved a link of subordination between the victim and alleged harasser; Category 1 relating to behavior or instance which occurs only on one occasion AND only against the same victim.

It is appreciated that the scoring system 27 is structured to allow for real-time processing of reports. However, it is appreciated that a downtime of the scoring system 27 may be encountered and contingencies have been developed to allow for the collection of reports during the downtime, with subsequent application of the scoring system 27 upon the resumption of the victim notification system 10. This means that when computing a report, the scoring system 27 will only take account of what happened the day of the report or earlier.

As such, the scoring system 27 includes "artificial intelligence" to detect and flag patterns, as well as associate a report from the victim notification system 10 with an intelligent score, for example, multiple reports by the same alleged harasser, victim targeted by multiple alleged harassers, whether the alleged harasser is a supervisor or not. After querying the past reports from the central server database 24, the data analysis system 25 parses it to only keep the information needed; the remaining information is discarded by the data analysis system 25, although it will be retained by the central server database 24 in the event it later becomes relevant. This allows the assignment of scores depending on the past behaviors. With this in mind, the scoring system 27 is enabled to:

Detect "fake" reports using Artificial Intelligence. Stance detection can be performed using the information given by the victim in the report and the evidence documents uploaded.
  Detect and flag behaviors occurring multiple times. The scoring system 27 considers new reports accessed via the private API 29, keeps the important information (behavior, alleged harasser, victim . . . ), matches this information with the existing records (behavior occurrences, number of reports involving the alleged harasser, number of reports involving the victim), and sets a score depending on a grading given by the programmer.
  Constantly update itself with new behaviors so the scoring system 27 is always able to determine what is a red-flag behavior, for example. This score will be sent to the private API 29 for updating of the central server database 24. On the company's side, the subscriber dashboard will have a colored light (yellow, orange or red) on each report that will simply describe the score to the user.
  Pull notifications from the central server database 24.

With this in mind, it is apparent, the intelligence of the scoring system 27 lies in its ability to apply predefined rules in a systematic manner based upon previous reported behaviors to have a score that better predicts how important a currently report behavior is. For example, reports from 6 months ago won't impact the score the same way as a report from 3 days ago will. This is achieved using mathematical functions only. However it is appreciated Artificial Intelligence techniques could be implemented in conjunction with the present invention. For example, either a Random Forest (an algorithm that takes decisions based on an automatic voting system, and would perform well in most cases) or an AdaBoost algorithm (an algorithm that will associate each behaviors with a factor, and would perform well in solving hard cases) might be effectively implemented in accordance with the present invention.

As discussed above, while the generated information is processed by the scoring system 27, the central server database 24 continually maintains all of the input information allowing for the victim notification system 10 to provide a "journaling" functionality allowing the employee 12 to just keep notes of what happened without actually reporting the behavior. In that instance, the report would be cached locally (or potentially on the network) but not analyzed.

As explained above, the information gathered as a result of the employee reporting app 16 is maintained in the central server database 24 that may be accessed by the employer 14. In addition, the information may be forwarded to the system administrator 22 or third-part enforcement agencies, or the employer 28 as required in accordance with the victim notification system or in accordance with the employer's requests 10. Employers 14 wishing to subscribe to the victim notification system 10 simply register with the victim notification system 10 and agree to comply with the underlying rules and requirements. Included with the employer registration may be information regarding geography and business unit information of the employer 14 which allows recommendations to be generated not just for the specific accused but also for the relevant geography/business unit. In this way, if a particular department is receiving a number of other otherwise low-level complaints regarding various different people, there may be no action necessary for a specific accused, but the department might need training, intervention, etc.

As with employee 12 registration, upon registration each employer 14 is provided a unique token that is hashed and stored in the central server database 24. When an employer 14 logs in, the token is sent through the public API 31 so each employer 14 can be differentiated. The public API 31 uses versioning such that each major modification will result into a new API version. This way, employees 12 and employers 14 that haven't downloaded a reporting app update (when updates take place) will still be able to use it, and those who downloaded the update reporting app will also be able to use it. This will also allow the system administrator 22 to provide different user experience and features, but also to give new features only to some people, for example.

In situations where the employer 14 is the subscriber to the victim notification system 10, and as will be discussed below in greater detail, the employer 14 is provided with an immediate alert regarding a report of a possible instance(s) of harassment, bullying or discrimination. Thereafter, in accordance with a protocol developed and put in place between the system administrator 22 and the employer 14, the legal department and/or the human resource department 42 of the company will act in an appropriate manner to remedy the situation. Where the employee 12 does not want to contact the human resource department 42, the employee 12 may indicate that the system administrator 22 of the victim notification system 10 direct a system assistant 45 to conduct an investigation and works with the employer's human resource department 42 to investigate the allegations of the employee 12.

As briefly mentioned above, employers 14 are provided with access to the central operational facility 20, for example, and as will be explained below in more detail, employers 14 are provided with a graphical user interface 47 (displayed on a computer display screen 49 in the form of various interface screens regarding activities (see FIGS. 1 and 46-49). It is contemplated employers 14 will subscribe to the victim notification system 10 and in return are provided various tools based on "data-mining" offered in accordance with the present invention and discussed below in greater detail.

Figure 46:
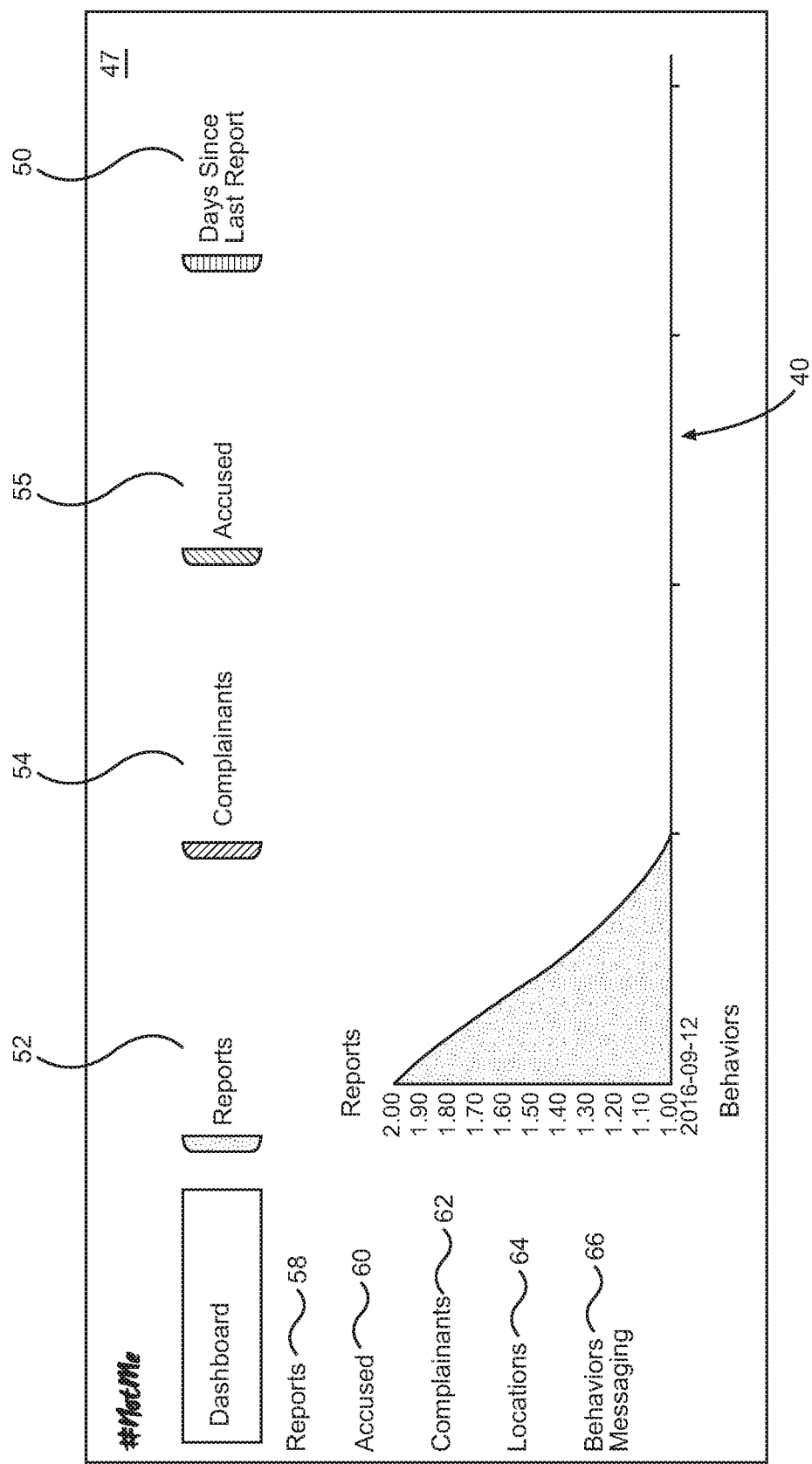
FIGS. 46-49 are screenshots of the graphical user interface showing activities of interest to employers using the victim reporting and notification system.

Referring to FIG. 46, the graphical user interface 47 includes a dashboard report 40 allows the employer 14 to monitor employee registration, identify potential recurrent cases of harassment and/or discrimination identify problematic employees 12 who may need training or discipline, contact the system administrator 22 of the victim notification system 10 to disclose potential recurrent harassers and or allow human resource department 42 and/or supervisor 44 appropriate follow-ups with victims. In accordance with a preferred embodiment the dashboard report 40 present an overview of collected data and links to a vast array of information relevant to cases harassment and/or discrimination within a company. For example, and with reference to FIG. 46, the dashboard report 40 includes a header identifying the days since last report 50, the number of reports 52, the number of complaints 54, and the number of accused 56. The dashboard 40 also provides graphs 58 that may be of interest.

Figure 47:
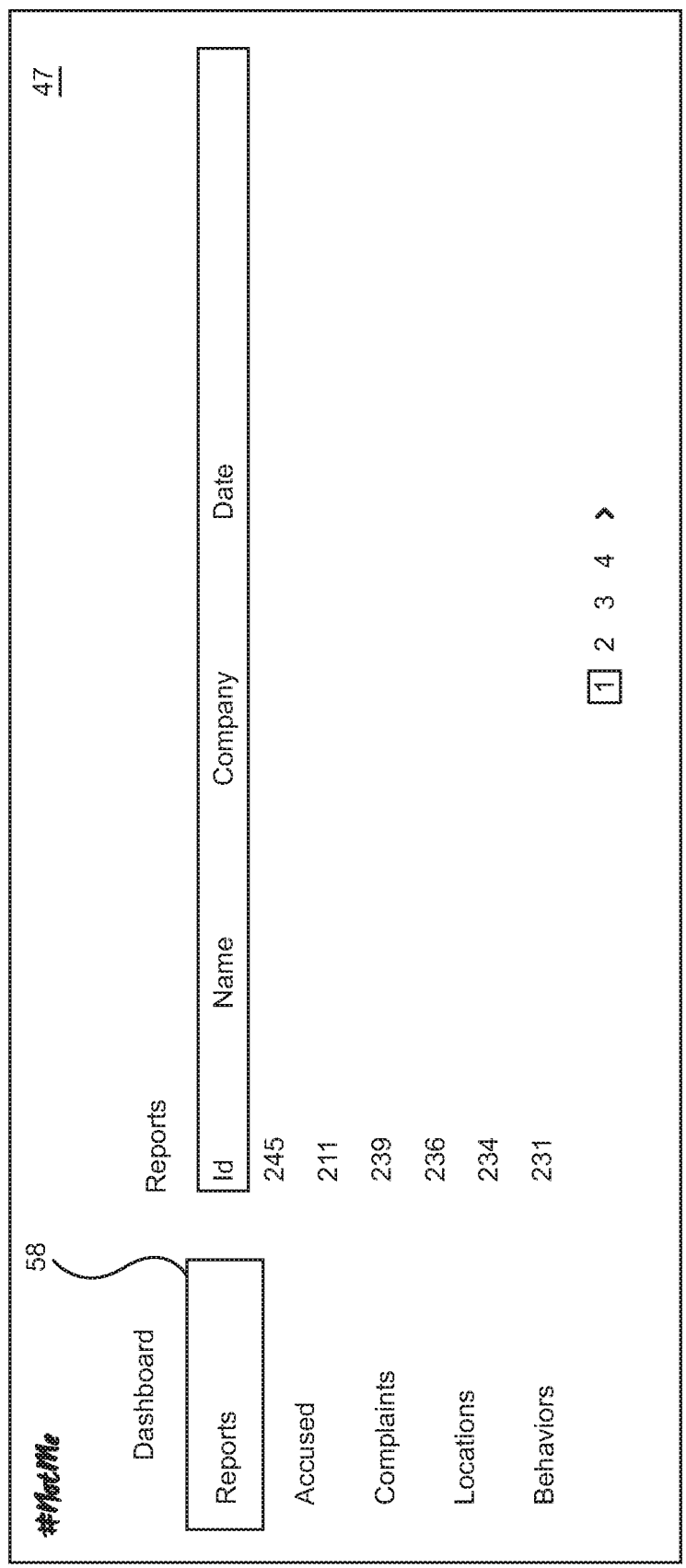
Figure 48:
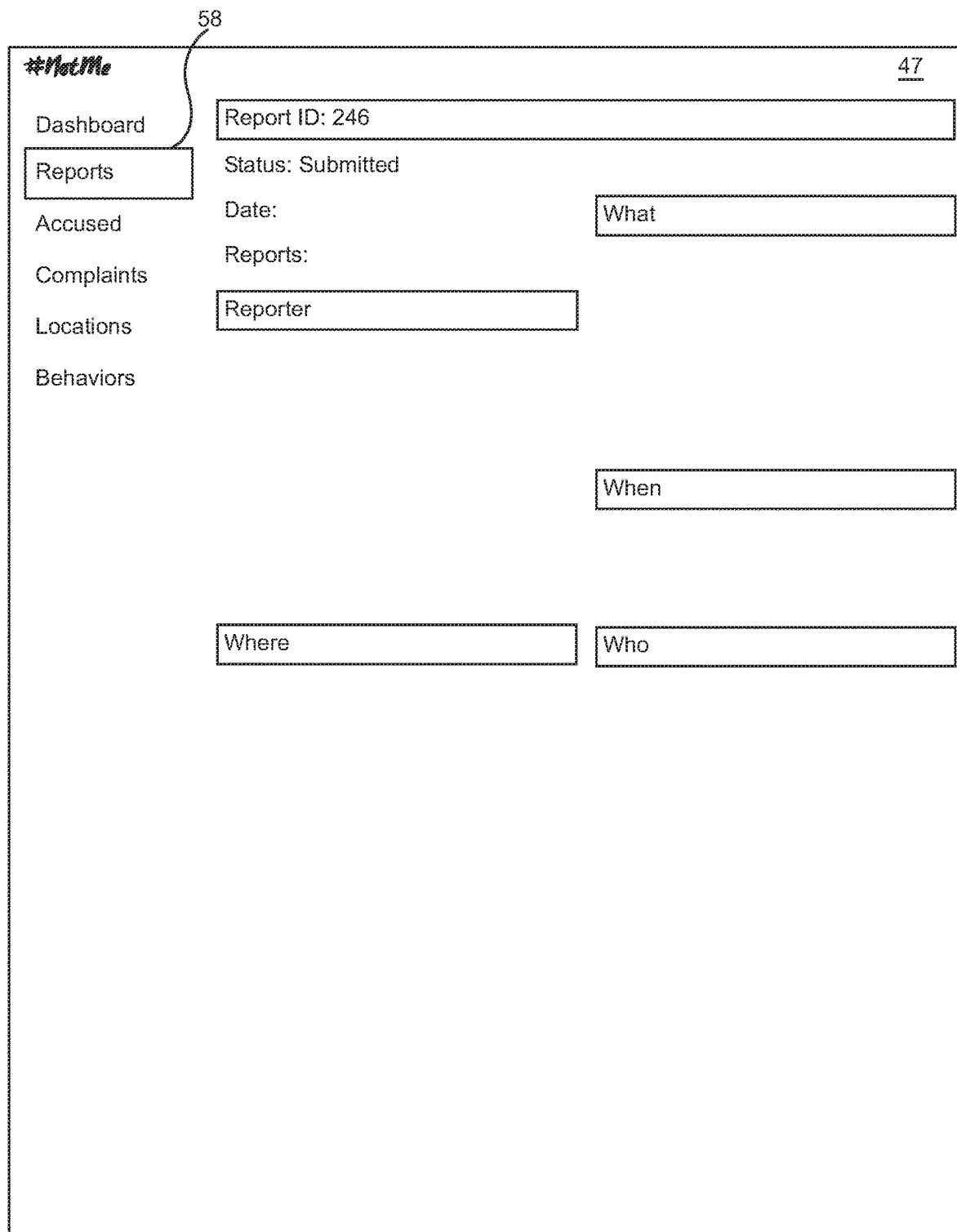
Figure 49:
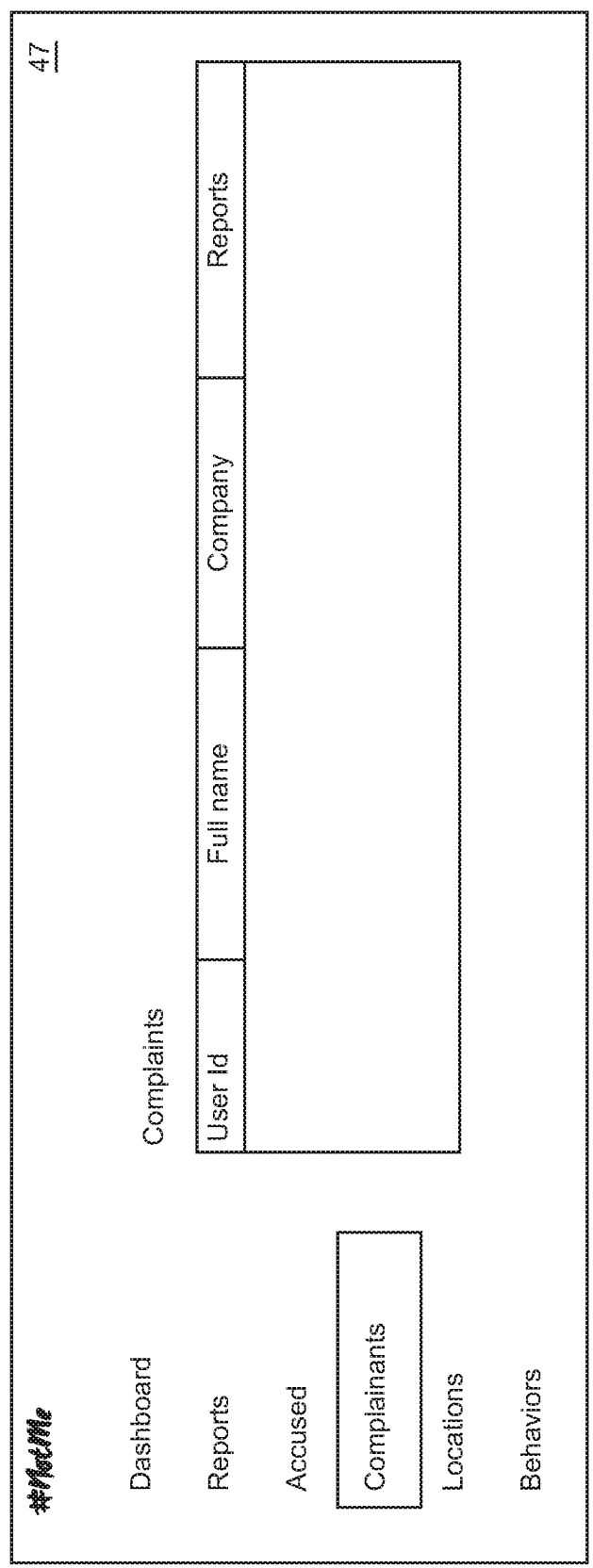

The graphical user interface 47 is further provided with various screens showing a listing of reports accessed via the "Reports" button 58 (see FIGS. 47 and 47, wherein FIG. 47 shows a listing of reports and and FIG. 48 shows the details of individual report), a listing of accused individuals accessed via the "Accused" button 60 (see FIG. 49), a listing of complaints accessed via the "Complaints" button 62, a map identifying the location of the reported activities accessed via the "Locations" button 64, and a cumulative graph of reported activities categorized by the type of behavior being reported accessed view the "Behavior" buttons 66. It is well appreciated that various windows with a variety of different information may be presented in the dashboard report 40 depending upon the needs of the employer 14. The various screens discussed above include links to additional information that may be accessed in ways well known to those skilled in the art.

In particular, the dashboard report 40 is linked to all reports filed by employees 12 at a particular employer (subscriber) 14, a listing of all employees 12 who have filed reports through the victim notification system 10, and information regarding specific reports (for example, (a) submitted by _____ on _____, 2018; (b) person being reported about; or (c) type of incident/behavior reported). For each report that is being filed through the victim notification system 10, the dashboard report 40 provides links to: (a) the status of the decision made by company (i.e., to investigate or not); (b) the status of the investigation (access of notes and interview notes, or other documents pertaining to the investigation); (c) the name of witnesses and persons interviewed during investigation; (d) the status of the case (pre-litigation, early resolution, litigation, mediation, arbitration) until resolution (settlement and amount if any, court decision and amount if any paid); (e) the name of in-house people in charge of report in question; (f) the name of plaintiffs lawyer if employee has retained one; (g) the name of counsel and contact information of lawyers/firms representing employer for that specific report; and (h) tracking information regarding open investigations, matters that have been resolved/closed, etc. we will be able to track status of all cases for the employers.

The dashboard report 40 also provides links for accessing reports categorized by those reports filed by same person/employee. Included with such a listing is information regarding all outcomes for all reports filed by same persons and all related data (for example, if lawyers were retained by employees, past resolution/outcome for each reports, etc.). In addition, the dashboard report 40 provides links to access reports categorized by those reports filed about or against same alleged perpetrator, including all related data that can extract through data mining. Further, the dashboard report 40 provides links to access reports categorized by those reports filed regarding the same behaviors/instances/incidents that are being reported, including all related data that can be extracted through data mining. Further still, the dashboard report 40 provides links to access reports categorized by reports filed within same business unit/team or reports filed by geographic locations. The dashboard report 40 also provides links to information regarding trends of behaviors/incidents reported, position/job title of alleged perpetrators, position/job title of alleged victims, salary of alleged victims and/or perpetrators, and demographics of victims and/or perpetrators.

In addition to the dashboard report 40, employers are provided with access to an employer alerting system 46 of the victim notification system 10. The employer alerting system provides employers 14 with real-time alerts regarding alleged unlawful and/or inappropriate behavior reported by employees 12 they believe constitutes harassment or discrimination. In accordance with a preferred embodiment, alerts are sent every time a report is filed—if and when—the report necessitates, based on what has been reported, the immediate or not so immediate intervention of the employer so that the employer or other organization can investigate, prevent, correct the behaviors reported, protect the victims, and make sure that the organization complies with its legal obligations. The alerts are sent via push notifications, emails, or phone (calls or text messages), or any other system or means of communication that may exist. This provides employers 14 with a real-time proactive tool to communicate with an employer's workforce, enabling the employer 14 to respond to specific employee questions and situations, and helps the employer 14 better understand, at any given time, the pulse of their organization.

In particular, the employer alerting system 46 provides employers 16 classified alerts based on their severity and pervasiveness of the reported conduct. As such, the employer alerting system 46 of the victim notification system 10 is an employer's data analysis system, or radar, that allows employers 14 to act swiftly and efficiently, either through their human resource department 42 or through other tools provided by the employer alerting system 46 of the victim notification system 10, if and when allegations of harassment and/or discrimination are reported.

With this in mind, the employer alerting system 46 of the victim notification system 10 helps employers 14 with early detection of (i) instances of harassment, discrimination and/or bullying and (ii) patterns of harassment, discrimination and/or bullying and/or cumulative "weak" signals (e.g., individual non-severe instances that are recurrent in an employer's workplace). This provides employers 14 with reporting that can be easily analyzed by experts and the scoring system and used as a critical aid in any subsequent investigation. As such, employer alerting system 46 of the victim notification system 10 provides valuable information, data and analysis early on (before harassment/discrimination charges (claims and lawsuits) are filed) and helps employers 14 proactively comply with corporate values, social responsibilities and legal obligations.

Ultimately, the employer alerting system 46 of the victim notification system 10 provides employers 14 with information creating a safe workplace for employees and a zero-tolerance environment for harassment or discrimination of any sort. As a result, the victim notification system 10 provides a critical early detection tool that restores the missing, but yet so much needed, balance in the workplace by allowing women and men to safely, easily and (if desired) anonymously report conduct that they believe might constitutes harassment or discrimination. The victim notification system 10 helps create an effective collaborative system among employees 12 and their employer 14 to protect employees 12 from harassment, discrimination and bullying. Through adoption of the victim notification system 10, employers 14 will be taking an important step towards eradicating harassment, or discrimination or bullying from their workplace.

The victim notification system 10 tracks all of the above information because the information is important and relevant for the employers (or organization) using the victim notification system 10. For example, it is important for the legal or HR department of an employer to, in a centralized manner, keep track of the status of the reports filed and claims made against it or against one of its employees. Employers must know whether claims/reports settled, what resolution/outcome was reached etc., so they can, over time, build data that can help maneuver future reports and perhaps predicts outcomes. Also, it is important for an employer to be able to track and see if an employee has field multiple reports, to see if there generally is merit in those reports, etc. If an employee has filed several reports that have concluded in high settlements, an employer will want to know that information in its future dealings with the employee. Similarly, employers must and should know if multiple reports have been filed against the same perpetrator. For each perpetrator, the employer should know the number of reports that have been filed, the types of behaviors/incidents that have been reported, and any other pertinent information pertaining to those reports, the perpetrator and victims. This information and data are also relevant because they may impact, influence the scoring system. Finally, the system will also be tracking demographic information such as date of birth and ethnicities of victims, perpetrators or accused perps and witnesses (if and when any).

With the foregoing in mind the victim reporting and notification system 10 ensures the collection of reported instances of harassment, discrimination and bullying and puts, under certain circumstances, the alleged victim of harassment and/or discrimination in touch with a team of experts, for example, lawyers, psychologists, etc., to help them deal with the situation. Further still, the victim notification system 10 helps the alleged victims of harassment and/or discrimination work with human resources department 20, the system administrator of the victim notification system 10, or third-part enforcement agencies 28 to remedy the situation. Over time, the victim notification system 10 will eliminate sexual harassment, discrimination and bullying from the workplace. The victim notification system 10 enables employers 14 to do a better job in monitoring instances of harassment and discrimination. Through the deployment of the victim notification system 10, an employer 14 can investigate promptly incidences, nip them in the bud, and use the victim notification system 10 as one of its defense mechanisms in the context of litigation.

While the victim notification system 10 provides a service to employees 12, it also provides a service to employer 14 that want to protect their employees as indeed by empowering employees and helping them easily and safely report harassment, discrimination, bullying and other unwanted behaviors 12, prevent and diminish instances of harassment and discrimination, improve monitoring of those instances, boost employee morale, and improve their legal and strategic arsenals in dealing with harassment and discrimination related litigation. From public a relations standpoint, subscribing to the victim notification system sends a strong message to a corporation's shareholders, customers, suppliers and employees that the company takes harassment, discrimination and bullying seriously. Ultimately, the victim notification system 10 will help substantially reduce the cost of litigation to an employer. Despite sexual harassment and sensitivity training, etc., employers 14 still are not able to effectively monitor and handle instances of harassment and discrimination. The victim notification system 10 remedies this inability and corrects the problem. Businesses face huge legal and reputational risk if they turn a blind eye to serial perpetrators at any level of the organization, but especially at the top. In today's climate, the wisest business practice is to proactively ferret out inappropriate behaviors and end them swiftly and decisively.

The present system 10 achieves this through the early detection of possible instances of harassment and discrimination and the provision of an early assessment tool. With this in mind, the victim notification system 10 enables employers to address false reporting and helps filter out meritless complaints and false accusations. It also helps employers identify people who have a tendency to report every and all work related interactions. The victim notification system 10 also assists with workplace related investigations, enables employers 14 to monitor situations, encourages and empowers employees 12 to come forward without fear of reprisal and retaliation, enables employers 14 to identify problematic managers and employees 12 that need to be kept on a tight leash, enables employers 14 to identify sexual harassers or perpetrators, and enables employers 14 to nip situations in the bud and terminate employees 12 that need to be disciplined/terminated. Still further, the victim notification system identifies vulnerabilities by harnessing both historical and current complaint data. The victim notification system 10 also helps identify trends by geographic location, business unit or job category, and allows employers 14 to establish and define an employee's approach to investing in responding to harassment and discrimination complaint. Further, the victim reporting and notification system enables the reporter to connect with legal representation to further understand their rights and counselors to deal with the unlawful conduct. Lastly, the system will enable the employer to determine if the reporter is making unlawful claims based on past unsubstantiated similar claims.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A method for victim notification, comprising in sequence, the steps of:
   providing a reporting app for use by an accuser that is a victim or witness of harassing, bullying and/or discriminating conduct by an accused, the reporting app is accessed via a smartphone, tablet, laptop, or other computer device, the accuser is an employee of an employer;
   receiving, via a graphical user interface (GUI) of the reporting app, a reporting process initiation request from the accuser;
   generating, via the reporting app, an API call via a public API to a central server to generate a report and to store the report in a central server database of the central server, the report including a report identifier, a report timestamp and the employer's identifier;
   providing, via the reporting app, a structured data reporting GUI comprising:
      a first GUI widget for initiating reporting of structured data related to Who is the perpetrator of the harassing, bullying and/or discriminating conduct, the first GUI widget associated with Who pillar of questions;
      a second GUI widget for initiating reporting of structured data related to What the harassing, bullying and/or discriminating conduct is, the second GUI widget associated with What pillar of questions;
      a third GUI widget for initiating reporting of structured data related to Where the harassing, bullying and/or discriminating conduct occurred, the third GUI widget associated with Where pillar of questions; and
      a fourth GUI widget for initiating reporting of structured data related to When the harassing, bullying and/or discriminating conduct occurred, the fourth GUI widget associated with When pillar of questions;
   receiving, via the structured data reporting GUI of the reporting app, a structured data reporting request from the accuser, the structured data reporting request identifying the pillar of questions to report;
   generating, via the reporting app, an API call via the public API to a central server to obtain questions associated with the identified pillar of questions;
   querying, via the central server, a Join table of the central server database to determine employer-specific questions associated with the identified pillar of questions, the Join table identifying questions from a questions table of the central server database associated with the employer's identifier from an employer table of the central server database;
   pushing, via the central server, the determined employer-specific questions associated with the identified pillar of questions to the reporting app, each employer-specific question that utilizes predefined answers pushed along with predefined answers associated with the respective question;
   providing, via the reporting app, the employer-specific questions associated with the identified pillar of questions for display to the accuser;
   storing, via the reporting app, the accuser's response to each provided employer-specific question associated with the identified pillar of questions in local storage of the accuser's device;
   transmitting, via the reporting app, using JavaScript Object Notation, a complete set of responses for the identified pillar of questions to the central server for storage in the central server database, the complete set of responses for the identified pillar of questions associated with the report identifier;
   labeling, via the central server, the report as finished in the central server database after receipt of a complete set of responses for each of the Who, What, Where and When pillars of questions and after receipt of a reporting process finalization indication from the accuser;
   retrieving, via a data analysis system with a scoring system having a scoring system database, the finished report from the central server via a private API secured with private authentication tokens;
   parsing, via the data analysis system, the finished report to determine the accused and the accuser associated with the finished report;
   retrieving, via the data analysis system, previous reports associated with the accused and the accuser from the central server via the private API, the previous reports having report timestamps within a specified time period;
   analyzing, via the data analysis system, the retrieved reports to categorize the conduct associated with the finished report as (1) Category 3 relating to behaviors or instances occurring on multiple occasions over time, (2) Category 2 relating to behavior or instance which involved a link of subordination between the victim and the accused, or (3) Category 1 relating to behavior or instance which occurs only on one occasion;
   transmitting, via the data analysis system, using the private API, the category associated with the finished report to the central server for storage in the central server database; and
   presenting a dashboard report providing access to the finished report, the finished report including a colored light, wherein the color of the colored light corresponds to the category associated with the finished report.

2. The method according to claim 1, further including generating a recommended action to address the conduct.

3. The method according to claim 1, wherein the structured data is limited to a predetermined list of specific conducts, behaviors, and/or locations.

4. The method according to claim 1, wherein the data analysis system is remote from the central server.

5. The method according to claim 4, wherein the data analysis system queries the central server as data is required for processing.

6. The method of claim 1, wherein the reporting process initiation request is received via a swipe of a swipe to report button.

7. The method of claim 1, wherein the specified time period is 3 years.

8. The method of claim 1, wherein the color of the colored light is one of: yellow, orange, red.

* * * * *